United States Patent
Thornton

(10) Patent No.: US 7,510,398 B1
(45) Date of Patent: Mar. 31, 2009

(54) APPARATUS FOR SIMULATING A PULSE AND HEART BEAT AND METHODS FOR USING SAME TO TRAIN MEDICAL PROFESSIONALS

(75) Inventor: William E. Thornton, Boerne, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 755 days.

(21) Appl. No.: 09/699,805

(22) Filed: Oct. 30, 2000

(51) Int. Cl.
*G09B 23/28* (2006.01)
*G09B 3/00* (2006.01)

(52) U.S. Cl. ............... 434/262; 434/265; 434/267; 434/268; 434/350

(58) Field of Classification Search ........... 434/262, 434/265–269, 350
See application file for complete search history.

(56) References Cited

U.S. PATENT DOCUMENTS

| | | | | |
|---|---|---|---|---|
| 3,298,132 A * | 1/1967 | Elwell | ............... | 446/295 |
| 3,399,467 A * | 9/1968 | Ravin | ............... | 434/266 |
| 3,520,071 A * | 7/1970 | Abrahamson et al. | ....... | 434/265 |
| 3,564,729 A * | 2/1971 | Ackerman | ............... | 434/266 |
| 3,662,076 A * | 5/1972 | Gordon et al. | ........... | 434/266 |
| 4,424,815 A * | 1/1984 | Kuntz | ............... | 600/528 |
| 4,594,731 A * | 6/1986 | Lewkowicz | ........... | 381/67 |
| 4,601,665 A * | 7/1986 | Messmore | ............ | 434/267 |
| 4,850,876 A * | 7/1989 | Lutaenko et al. | ........ | 434/265 |
| 4,932,879 A * | 6/1990 | Ingenito et al. | ........ | 434/262 |
| 5,025,809 A * | 6/1991 | Johnson et al. | ......... | 600/528 |
| 5,224,479 A * | 7/1993 | Sekine | ............... | 600/389 |
| 5,480,337 A * | 1/1996 | Baker | ............... | 446/100 |
| 5,769,641 A * | 6/1998 | Lampotang et al. | ...... | 434/272 |
| 6,007,342 A * | 12/1999 | Tjølsen | ............... | 434/265 |
| 6,193,519 B1 * | 2/2001 | Eggert et al. | .......... | 434/262 |
| 6,273,728 B1 * | 8/2001 | van Meurs et al. | ........ | 434/268 |
| 6,443,735 B1 * | 9/2002 | Eggert et al. | .......... | 434/262 |
| 6,461,165 B1 * | 10/2002 | Takashina et al. | ........ | 434/265 |

OTHER PUBLICATIONS

LifeGuard—A Wearable Vital Signs Monitoring System, Mundt, Nov. 17, 2002, pp. 1-5.*
Nonin Onyx 9500 Pulse Oximeter, Nonin Corp., 2000, p. 1.*

* cited by examiner

*Primary Examiner*—Robert E Pezzuto
*Assistant Examiner*—Binh-An D Nguyen
(74) *Attorney, Agent, or Firm*—Robert W Strozier

(57) ABSTRACT

A simulation apparatus and teaching system utilizing the apparatus are disclosed which includes a computer with input and output devices and a simulation apparatus including a housing, where the housing includes a tactile output subsystem for simulating pressure pulses corresponding to a pulse, an audio output subsystem for simulating heart sounds or other bodily sounds and a visual output subsystem for simulating visual attributes associated with a given condition. The output subsystem are under computer control and via interaction with a user, the computer will instruct the output subsystem to generate the symptoms associated with a given condition in a temporally correlated or simultaneous manner so that a user will be able to experience the visual, audio and tactile attributes associated with a given condition.

11 Claims, 26 Drawing Sheets

Contour of Carotid Pulse and Cardiac Impulse
A. Carotid Pulses
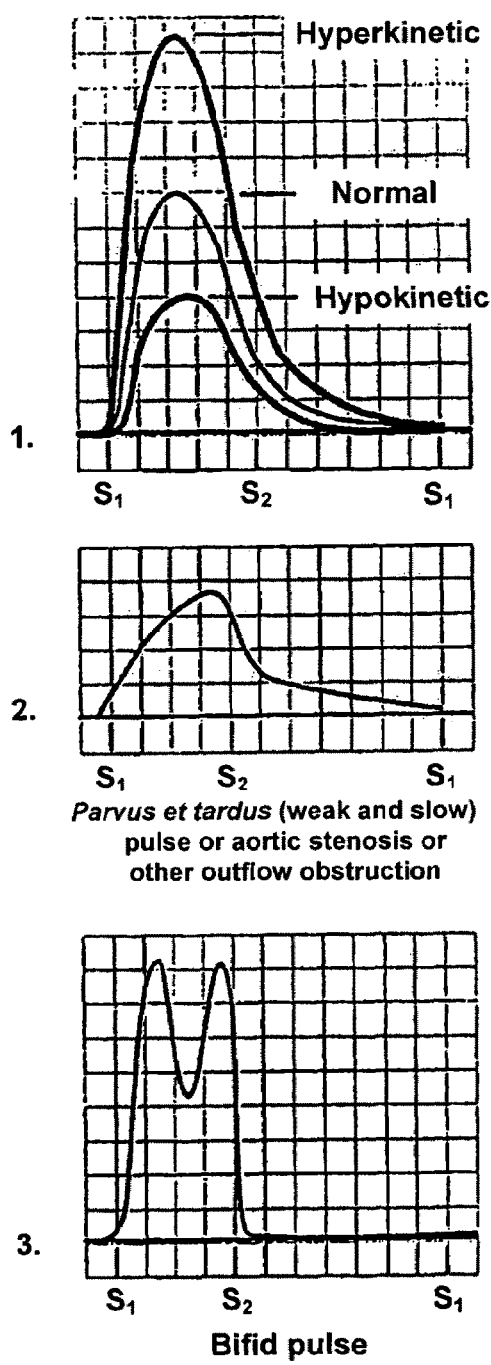
B. Location of carotid and jugular pulses
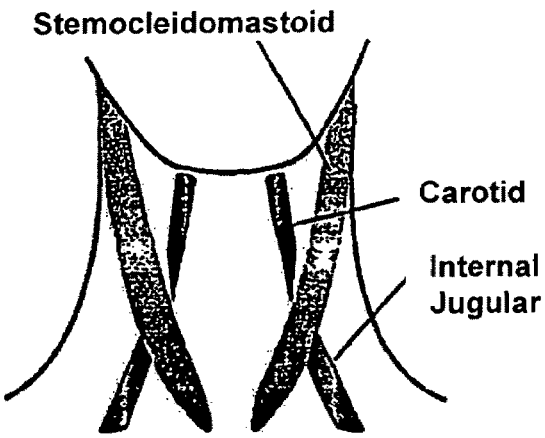
C. Jugular Venous Pulses
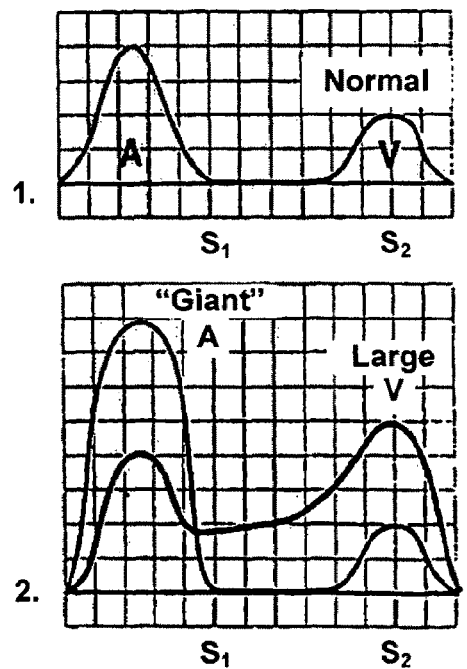
FIG. 4
PRIOR ART

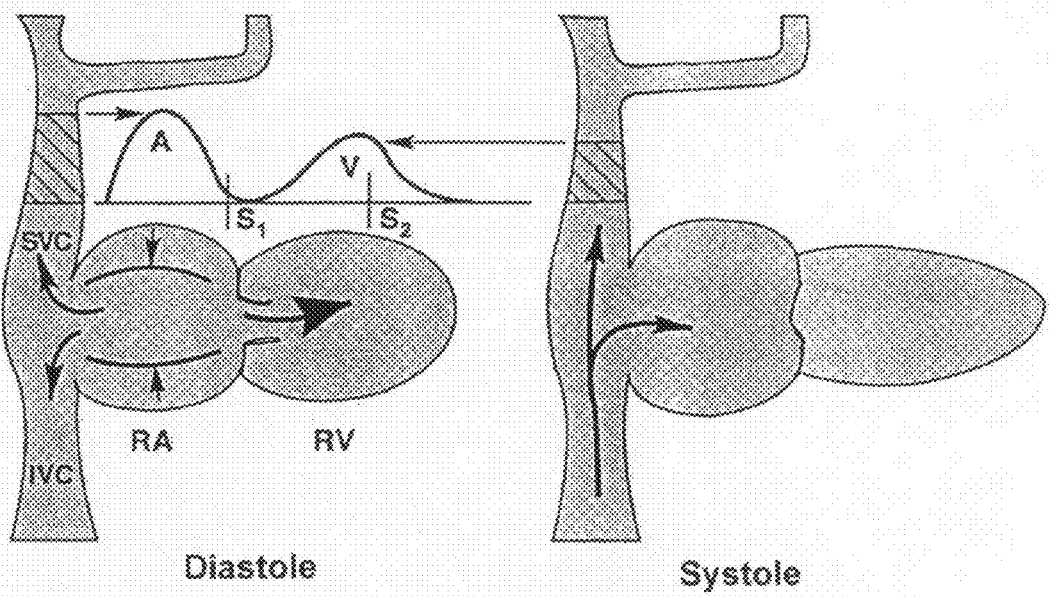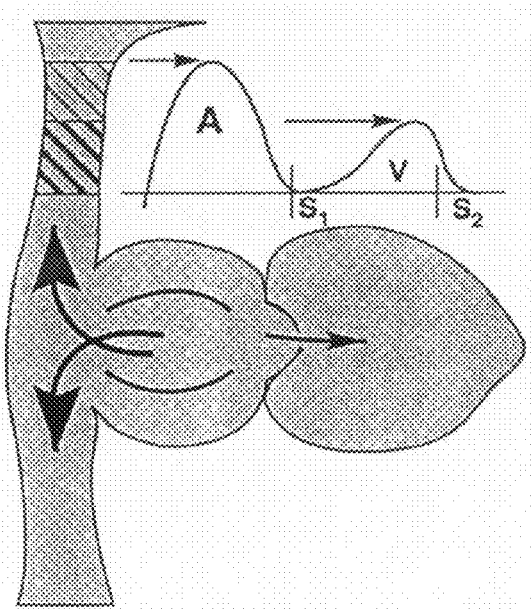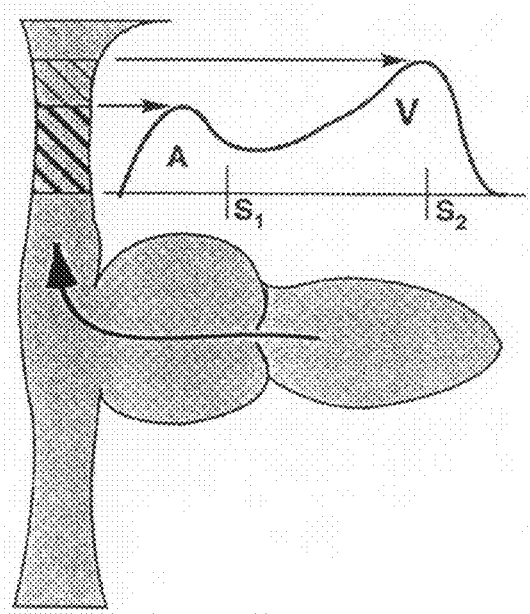
FIG. 5 PRIOR ART

Principal Areas of Cardiac Impulses

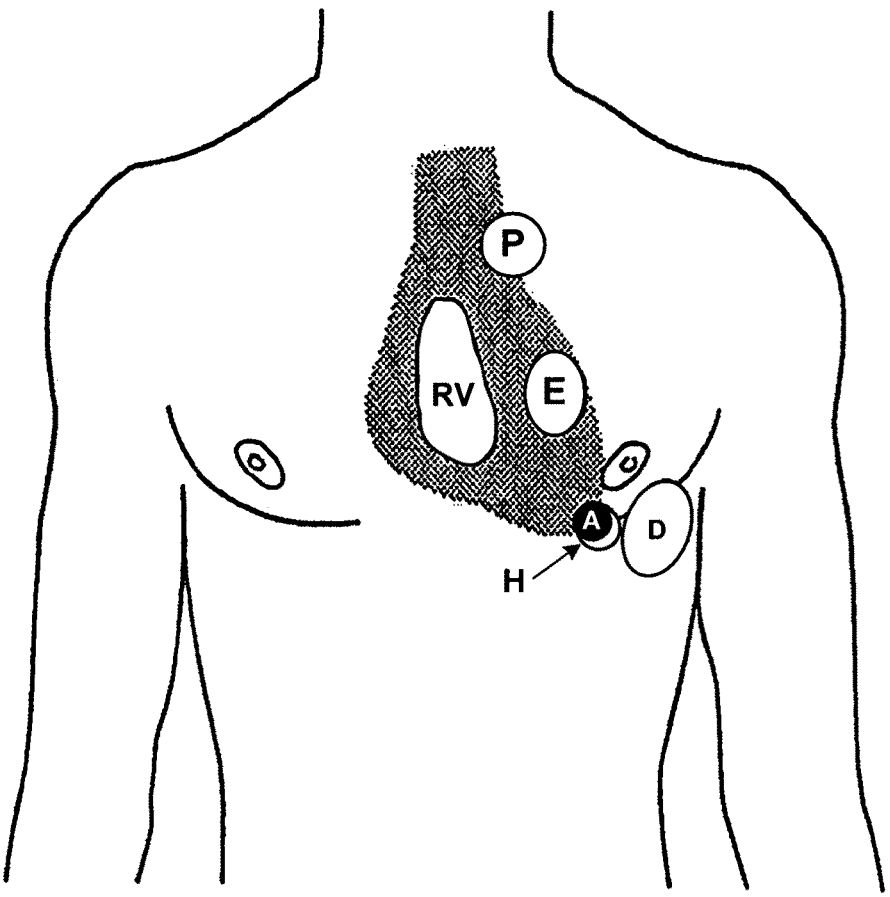

A Normal left ventricular apical area, "dime sized," 5LICS-MCL

H *"Hypertrophied"* left ventricular apical area, "quarter sized,"
May be *slightly* shifted inferiorly or laterally

D "Dilated" left ventricular apical area, marked size increase, shifted laterally

E Ectopic area of left ventricle

P Pulmonic area, 2LICS, parasternal

RV Right ventricle area along lower left sternal border

Primary areas of precordial pulstation: As you progress you will find that additional areas of abnormal pulsation may occasionally be found

**FIG. 7
PRIOR ART**

Generation of Normal Heart Sounds, S₁,

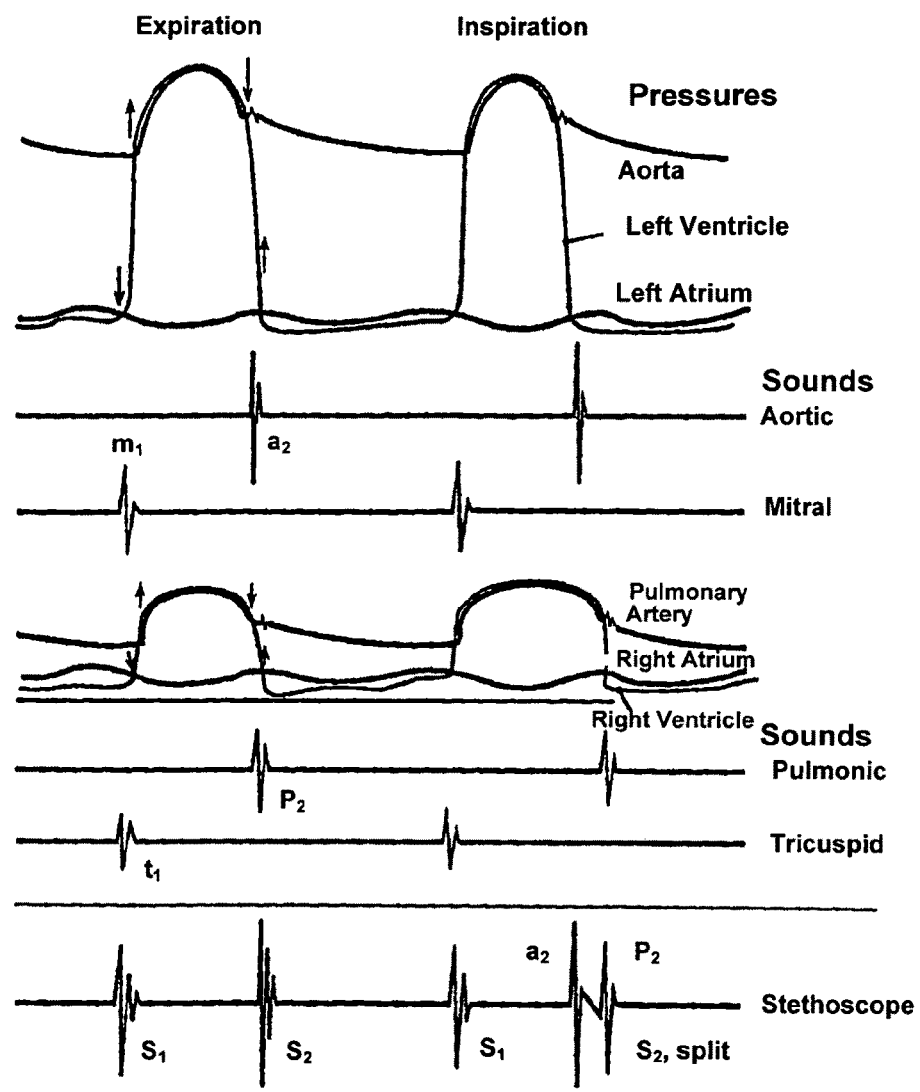

Normal valves open silently, indicated by ↑. Closing times, indicted by ↓, of mitral and tricuspid valves are typically so close that their individual sounds m1 and t1, merge to form S1. On expiration the same is true for aortic and pulmonic valves and their sounds, a2 and p2. With increased negative intrathoracic pressure on inspiration the right heart increase its volume and blood is retained in the lungs, reducing left heart volume. Consequently closure of the pulmonic valve is delayed by ejection of the larger volume while aortic valve closure occurs earlier than normal, thus "splitting" the usually merged second heart sounds. Respiratory splitting of the second heart sound occurs in some 30% of normal youth, but its prevalence is reduced by age until it is normally absent by age 60.

FIG. 11
PRIOR ART

Basic Heart Sounds
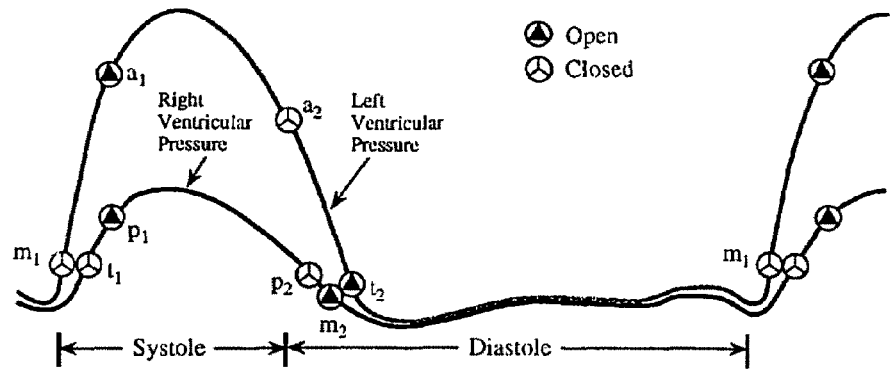
1. $S_{1,2}$ Valve closure and splitting
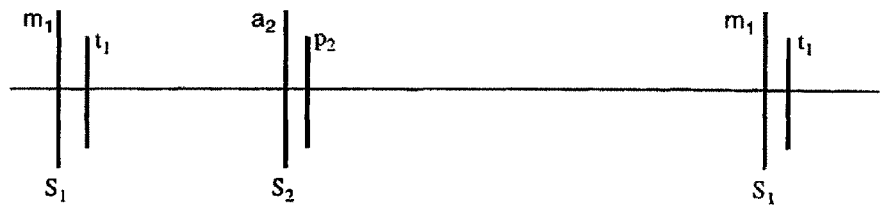
2. Abnormal Valve Opening
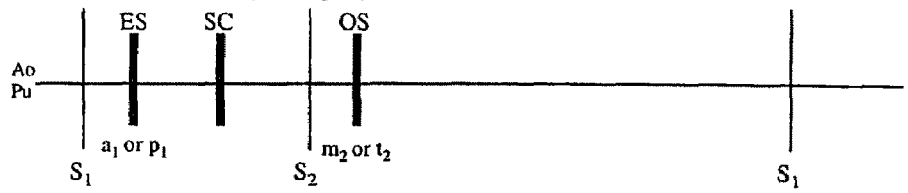
3. $S_{3,4}$ Ventricular Filling
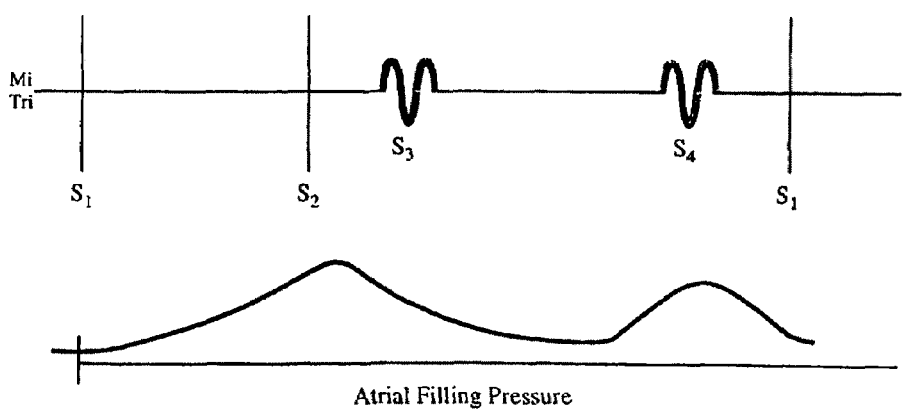
Atrial Filling Pressure
FIG. 13 - PRIOR ART

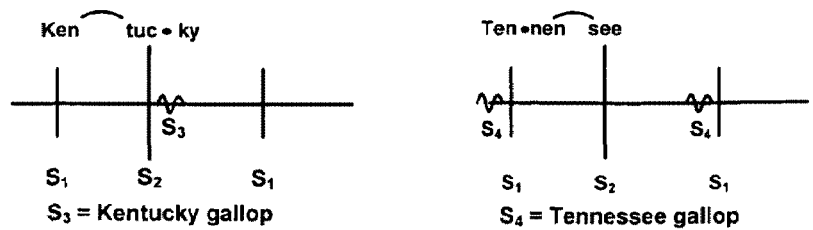
**FIG. 14
PRIOR ART**
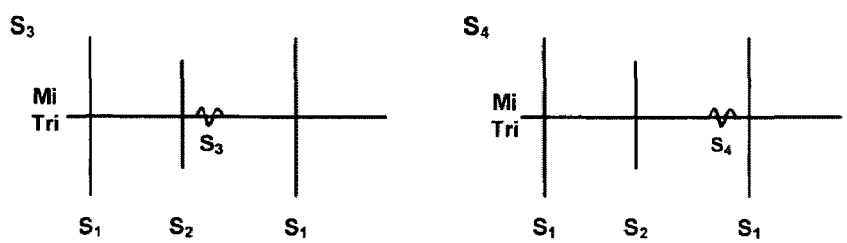
**FIG. 15
PRIOR ART**
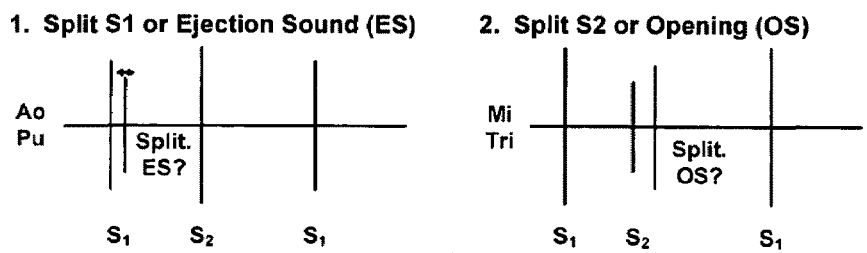
**FIG. 16
PRIOR ART**
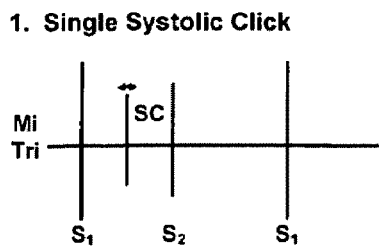 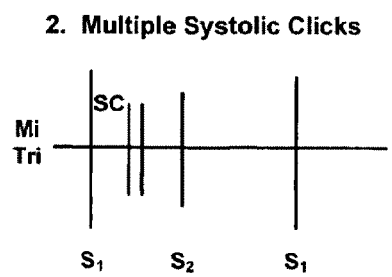
**FIG. 17
PRIOR ART**

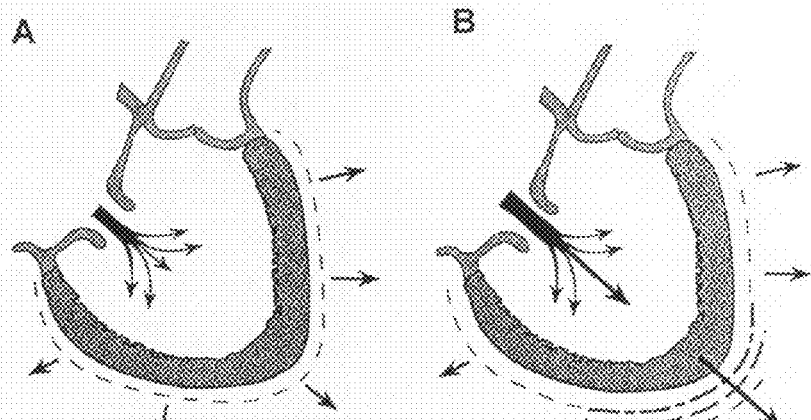
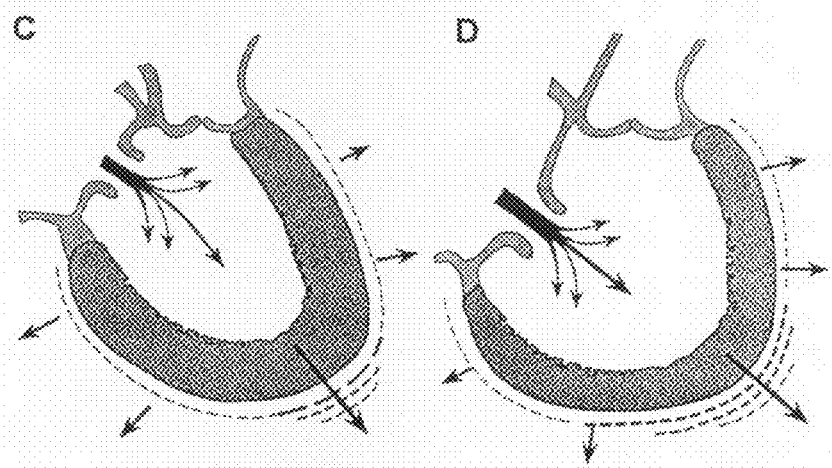
FIG. 18
PRIOR ART

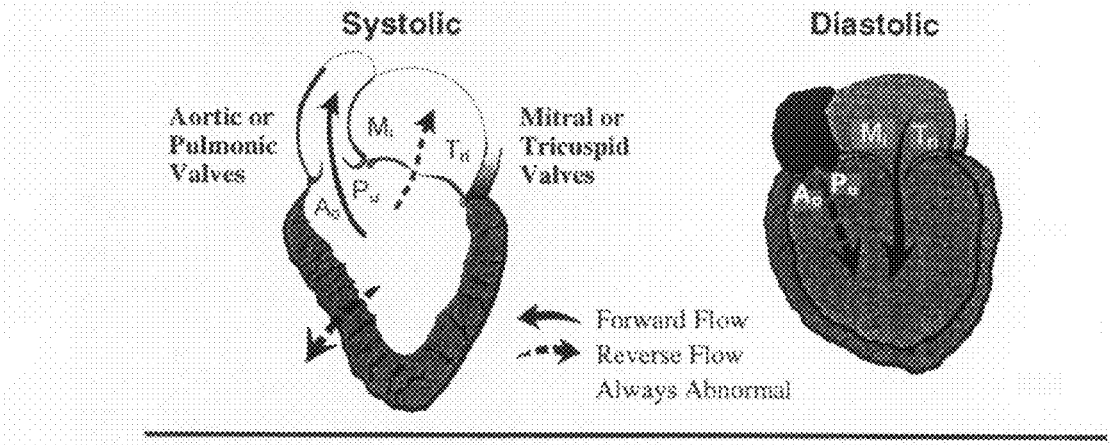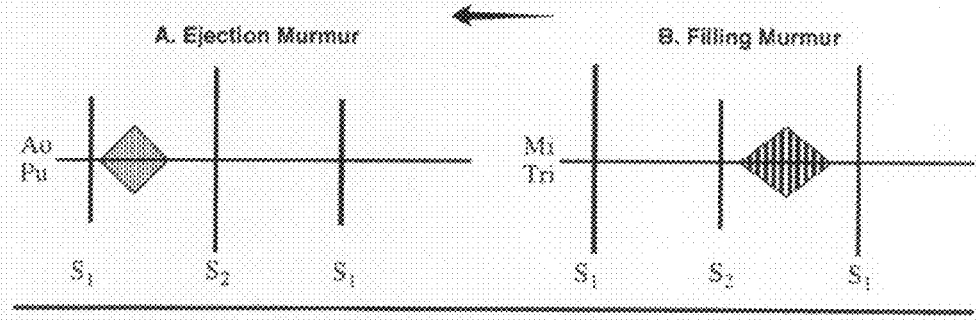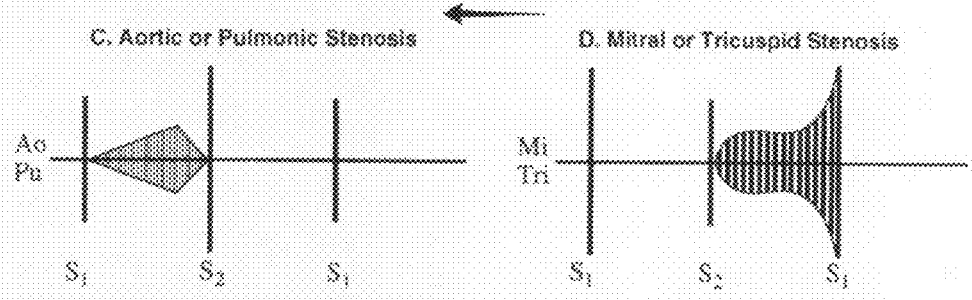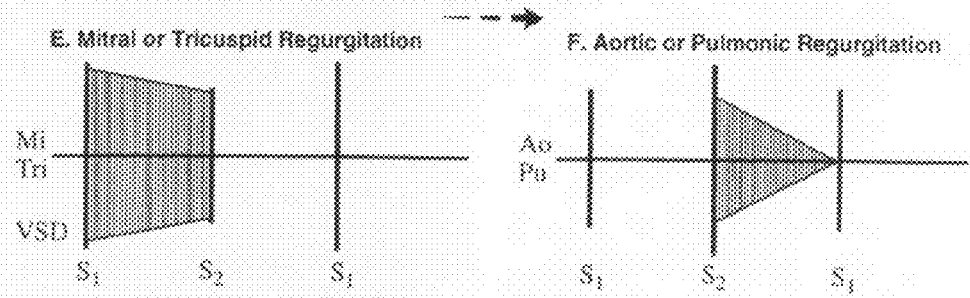
FIG. 19 - Prior Art

FIG. 20 PRIOR ART

Ejection Murmurs
A. Critical Points
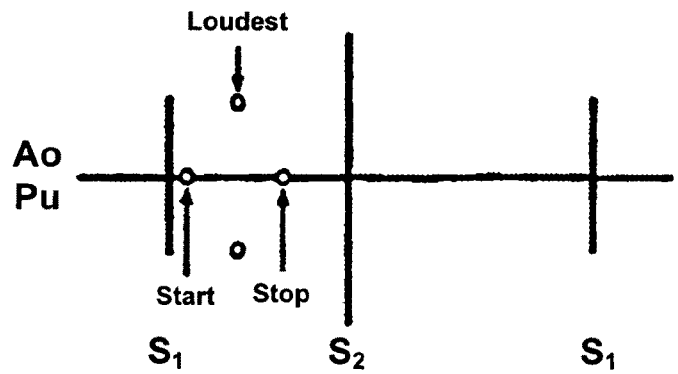
B. Profile
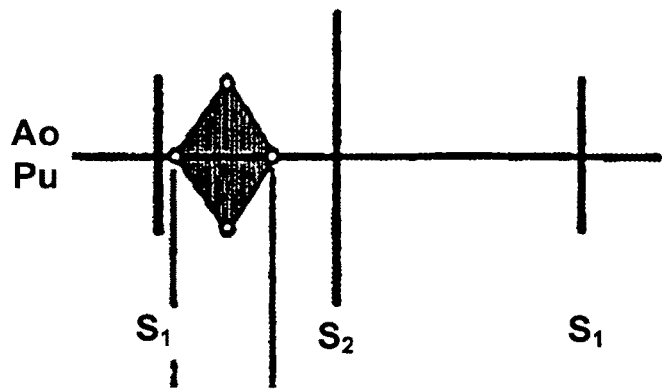
C. Velocity Profile
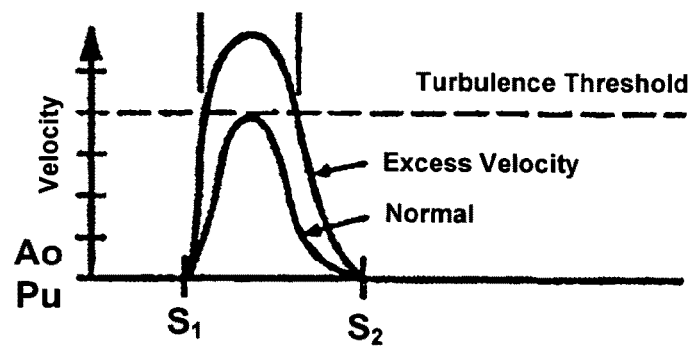
FIG. 21
PRIOR ART

Filling Murmurs
A. Critical Points
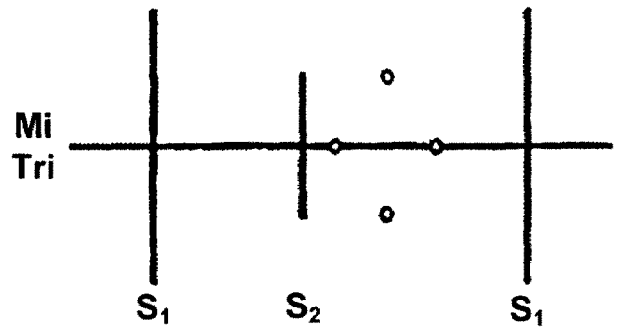
B. Sound Profile
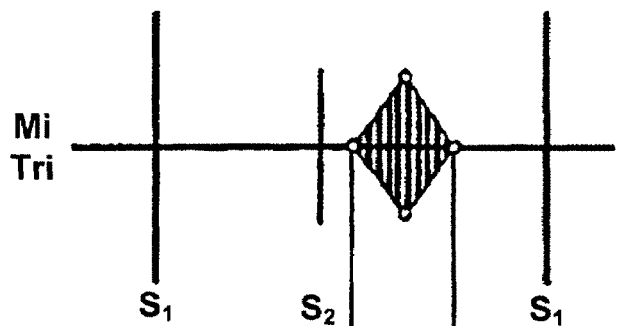
C. Velocity Profile
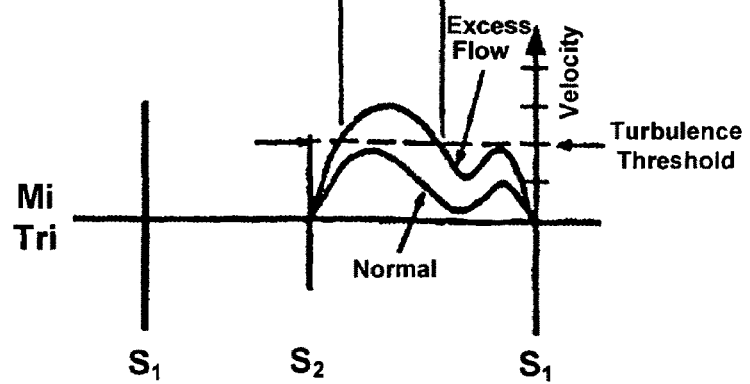
FIG. 22
PRIOR ART

A.
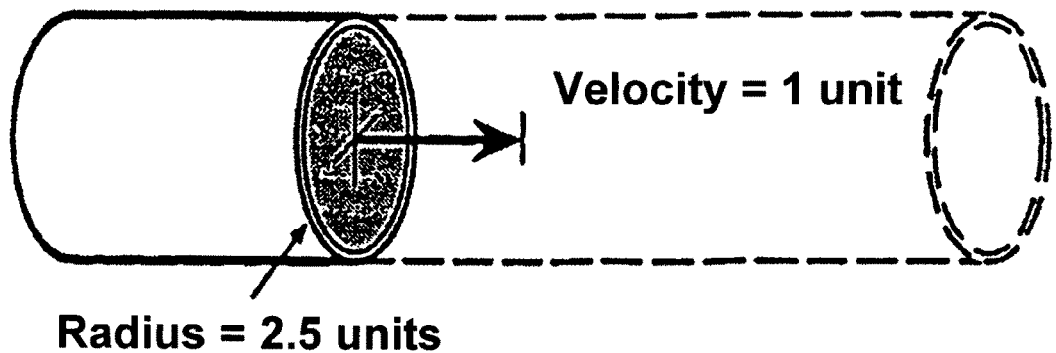
B.
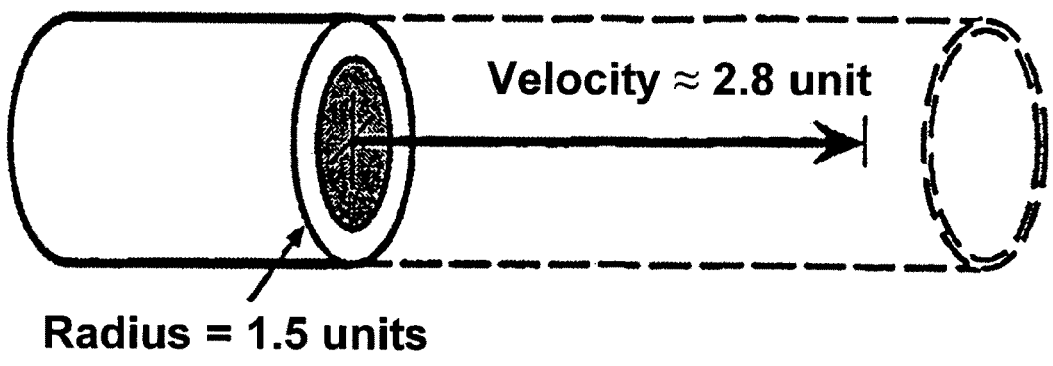
C.
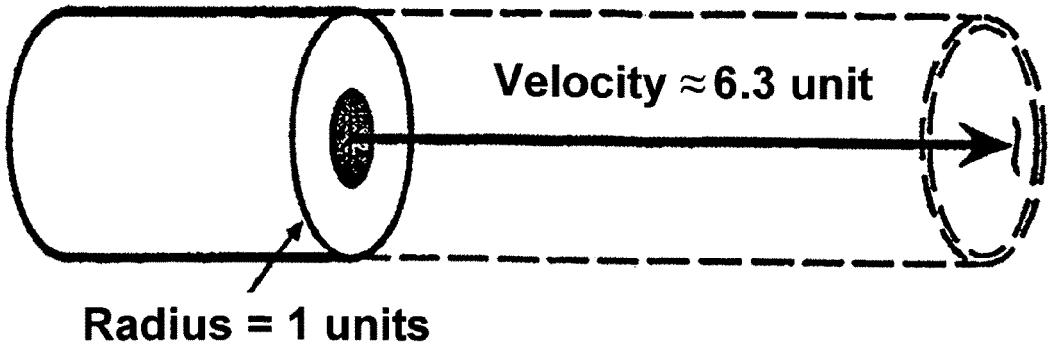
FIG. 23
PRIOR ART

**Peripheral Murmurs – *Bruits, Soufflés, etc.***
A. Right Carotid
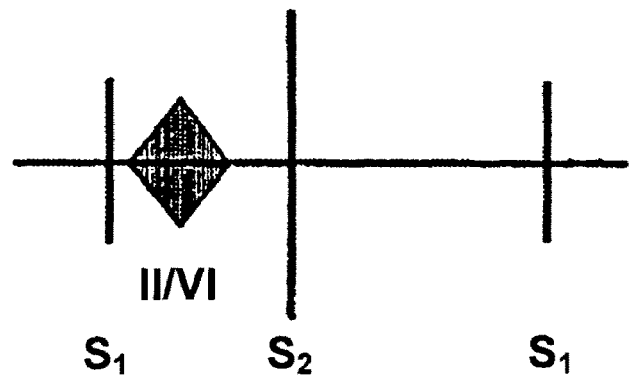
B. Left Carotid
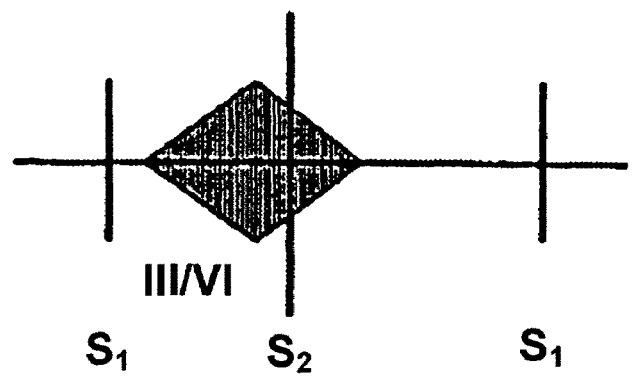
C. Abdomen
FIG. 24
PRIOR ART

APPARATUS FOR SIMULATING A PULSE AND HEART BEAT AND METHODS FOR USING SAME TO TRAIN MEDICAL PROFESSIONALS

BACKGROUND OF THE INVENTION

1. Field of the Invention

The present invention relates to a student training/teaching system and apparatus for simulating audio, visual, tactile and/or other bodily attributes such as pulse, heart and/or respiratory rhythms of animals including humans and methods for using the system and apparatus to train medical professionals.

More particularly, the present invention relates to student training/teaching system and apparatus for computer controlled simulations of audio attributes, visual attributes, tactile attributes and/or other bodily attributes including respiratory, pulse and/or heart rhythms, body coloring, temperature, and the like in a temporally correlated fashion and to methods for using the system and apparatus to train health care providers in the proper use of basic medical equipment for diagnosis such as a stethoscope.

2. Description of the Related Art

As medical science has progressed and medical schools are increasingly under pressure to train new doctors with limited resources, medical school are increasingly relying on non-human interactive formats to teach health care providers skills they will need to successfully treat and care for patient. However, because schools no longer include the degree of direct patient training/teaching, many health care providers are ill equip to utilize the more basic medical equipment like the stethoscope. A stethoscope is a well-known medical instrument for listening to and diagnosing cardiovascular disease, irregularities, or other cardiovascular abnormalities. In fact, many health care providers wear stethoscopes, but are not technically competent to effectively use the stethoscope to detect and diagnosis cardiovascular abnormalities, irregularities or diseases.

Devices have been constructed to simulate animal/human biological function such as simulated heart beats, but the simulations are generally disconnected from other bodily function. Thus, it would represent an advancement in the art to be able to construct a student training/teaching systems and apparatus that would allow for the simulation of many bodily functions in a temporally relevant and visually connected format such as coupling audio attributes such as heart rhythms and breathing patterns, with tactile attributes such as pulse rhythms, with visual attributes such as body coloring and bodily attributes such as temperatures.

SUMMARY OF THE INVENTION

The present invention provides a student training/teaching system and apparatus for simulating symptoms of animal including human conditions in a temporally relevant manner using audio, visual and/or tactile outputs controlled by a digital processing unit. The present invention also provides methods for using the system and apparatus for training/teaching users vital aspects of animal including human diagnosable conditions.

The present invention provides a system including a digital processing unit (DPU) subsystem having a user interface, bodily attribute generation software and an input apparatus and output apparatus for human-DPU interaction, a visual output subsystem, an acoustic output subsystem, and/or a tactile output subsystem, where the input and output apparatus, the generation software and the output subsystems operate to visually, acoustically and tactually simulate different animal including human conditions so that the visual, audio and tactile outputs are temporally coupled for a more realistic simulation of symptoms of a desired condition. Smell can also be temporally coupled with the other outputs using micro chemical pumps and aerosol devices that simulate a given order associated with the desired condition.

The present invention provides an apparatus including a digital processing unit (DPU) having a user interface, a bodily attribute generation software and an input device and output device for human-DPU interaction, a visual output device in communication with the DPU, an acoustic output device in communication with the DPU and/or a tactile output device in communication with the DPU, where the DPU, through interaction with a user via the input and output devices, the generation software and the output subsystems, visually, acoustically and/or tactually simulates different animal including human conditions so that the visual, audio and tactile outputs are temporally coupled for a more realistic simulation of symptoms of the desired condition.

The present invention provides a method for training/teaching a user, where the method includes interacting with a user interface of a DPU via an input apparatus and output apparatus and identifying a condition of an animal including a human from audio, visual and/or tactile output generated in the DPU and outputted to an audio output, a visual output and/or a tactile output which simulate symptoms of the condition from a list of conditions generated by the DPU.

The present invention provides a method for generating symptoms of a condition of an animal including a human, where the method includes generating temporally correlated audio, visual and/or tactile output attributes corresponding to symptoms of the condition.

The present invention provides a method for simulating symptoms of animal including human conditions, where the method includes generating temporally correlated audio, visual and/or tactile output attributes corresponding to symptoms of the condition and outputting the generated attributes to an audio, visual and/or tactile output device, where the outputs simulate symptoms of the condition.

Apparatus for Full Body Condition Simulations

The present invention provides a system for simulating symptoms of animal including human conditions using a full body simulation system, where the system includes an artificial body and a digital processing subsystem. The artificial body includes a tactile component designed to simulate tactually perceivable bodily functions, an audio or acoustic component designed to simulate acoustically perceivable bodily functions and/or a visual component designed to simulate visually perceivable bodily functions, where the simulated bodily functions are generated by the digital processing subsystem in a temporally correlated manner and correspond to symptoms of a desired condition.

The present invention provides an apparatus including a digital processing unit (DPU) having a user interface, bodily attribute or function generation software and an input device and an input device for user-DPU interaction and an artificial body having a visual output component in communication with the DPU, an acoustic output component in communication with the DPU and/or a tactile output component in communication with the DPU, where the DPU through user interaction with the input and output devices, the generation software and the output components simulates symptoms of different animal including human conditions so that the visual, audio and tactile outputs are temporally coupled for a more realistic simulation of symptoms of the desired condition.

The present invention provides a method for training/teaching health care providers including the steps of generating a plurality of attributes to simulate symptoms a desired condition using an apparatus described above and outputting the attributes to the artificial body which manifests the generated attributes as symptoms of the condition.

The present invention further provides a method for training/teaching health care providers including the steps of interacting with a user, generating a plurality of attributes to simulate symptoms of a desired condition from a set of conditions for which the user is being trained or taught to recognize, diagnose and/or identify using an apparatus described above, outputting the attributes to an artificial body which manifests the generated attributes as symptoms of the condition and identifying the simulated conditions from the list of conditions.

Apparatus for Partial Body Condition Simulations

The present invention provides a system apparatus for simulating animal including human conditions using a partial body simulation system including an artificial portion of an animal body and a digital processing subsystem. The artificial body part includes a tactile component designed to simulate tactually perceivable bodily functions, an audio or acoustic component designed to simulate acoustically perceivable bodily functions and/or a visual component designed to simulate visually perceivable bodily functions, where the simulated bodily functions are generated by the digital processing subsystem in a temporally correlated manner and correspond to symptoms of a desired condition.

The present invention provides an apparatus including a digital processing unit (DPU) having a user interface, bodily attribute or function generation software and an input device for human-DPU interaction and an artificial animal body part having a visual output component in communication with the DPU, an acoustic output component in communication with the DPU and/or a tactile output component in communication with the DPU, where the DPU, through user interaction with the input and output devices, the generation software and the output components, simulates symptoms of different animal including human conditions so that the visual, audio and tactile outputs are temporally coupled for a more realistic simulation of symptoms of the desired condition.

The present invention provides a method for training/teaching health care providers including the steps of generating a plurality of attributes to simulate a plurality of symptoms of a desired condition using an apparatus described above and outputting the attributes to the artificial body part which manifests the generated attributes as perceivable symptoms of the condition.

The present invention further provides a method for training/teaching health care providers including the steps of interacting with a user, generating a plurality of attributes to simulate symptoms of a desired condition selected from a set of conditions for which the user is being trained or taught to recognize, diagnose and/or identify, using an apparatus described above, outputting the attributes to an artificial body part which manifests the generated attributes as perceivable symptoms of the condition and identifying the simulated conditions from the list of conditions presented to the user.

Apparatus for Stethoscope Training/Teaching

The present invention provides an apparatus for simulating a right side pulse and a left side pulse and correlated heart beat of an animal including a human where the simulated pulses are designed to be felt through a finger of a user and the heart beat is designed to be heard through a stethoscope. The apparatus includes a playback device for generating a first electronic signal corresponding to the right side pulse, a second electronic signal corresponding to the left side pulse and a third electronic signal corresponding to a correlated heart beat, two tactile pulse simulators for receiving the first and second or pulse signals and generating pressure pulses discernible by touch and an audio simulator for receiving the third or heart beat signal and recreating the heart beat to be heard through a stethoscope.

The present invention provides a method for training/teaching health care provides in the proper use of a stethoscope including the steps of placing a user's finger on a tactile pulse simulator, placing a stethoscope listening end on an audio heart beat simulator, placing stethoscope ear pieces in a user's ear and sensing different cardiovascular conditions including normal and abnormal conditions.

The present invention further provides a method for training/teaching health care provides in the proper use of a stethoscope including the steps of placing a first finger on a right side tactile pulse simulator, placing a second finger on a left side pulse simulator, placing a stethoscope listening end on a audio heart beat simulator, placing stethoscope ear pieces in a user's ear, generating a pulse and correlated heart beat signal in a playback unit and sensing different cardiovascular conditions including normal and abnormal conditions.

DESCRIPTION OF THE DRAWINGS

The invention can be better understood with reference to the following detailed description together with the appended illustrative drawings in which like elements are numbered the same:

FIG. 4 depicts schematically and graphically contours of carotid pulse and cardiac impulse;

FIG. 5 depicts schematically and graphically jugular venous pulses;

FIG. 7 depicts schematically and graphically the principal areas of cardiac impulses;

FIG. 11 depicts schematically and graphically the generation of normal heart sounds, $S_1$ and $S_2$;

FIG. 13 depicts schematically and graphically the basic heart sounds including abnormal conditions;

FIG. 14 depicts schematically and graphically the origin of the heart sound classifications;

FIG. 15 depicts schematically and graphically $S_3$ and $S_4$ abnormal heart sounds relative to $S_1$ and $S_2$ heart sounds;

FIG. 16 depicts schematically and graphically split $S_1$ and $S_2$ heart sounds;

FIG. 17 depicts schematically and graphically a single systolic click and multiple systolic clicks, side-by-side;

FIG. 18 depicts schematically and graphically the generation of $S_3$ and $S_4$ heart sounds;

FIG. 19 depicts schematically and graphically basic cardiac murmurs in both the right and left ventricle;

FIG. 20 depicts schematically and graphically diagrammatic and descriptive features of heart sounds/murmurs;

FIG. 21 depicts schematically and graphically ejection murmurs;

FIG. 22 depicts schematically and graphically filling murmurs;

FIG. 23 depicts schematically and graphically velocity vs. area in constant flow conditions;

FIG. 24 depicts schematically and graphically peripheral murmurs, Bruits, Soufflés, etc.;

DETAILED DESCRIPTION OF THE INVENTION

Figure 1:
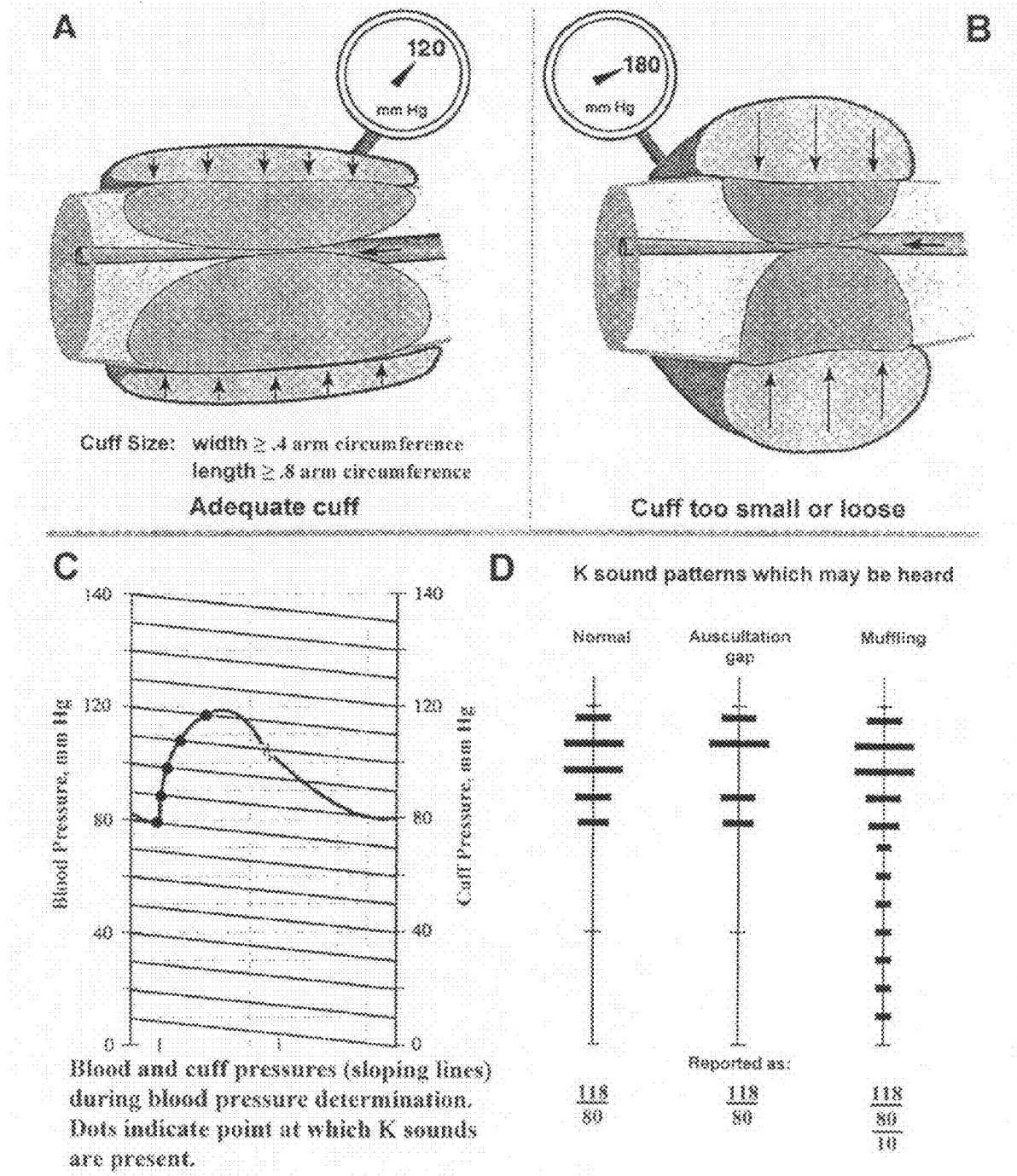
FIG. 1 depicts schematically and graphically the proper method of measuring arterial blood pressure.

The inventor has found that a training/teaching apparatus and system can be constructed that allows a user to be trained to diagnosis conditions from one or more symptoms simulated on an apparatus where the symptoms can include visual, acoustic and/or tactile. The symptoms are simulated using visual, audio and/or tactile output devices such as mechanical, electrical, optical, electromechanical or other output devices housed in a housing that may be constructed to resemble an animal body including a human body or body part. The inventor has also found that by coupling the output to the housing to computer generated images of the anatomical attributes of the condition, one can device a more powerful teaching/training system.

The inventor has also found that a simple, cost effective stethoscope training/teaching apparatus can be constructed to allow proper training/teaching of health care providers in the use of a stethoscope to detect and diagnosis various cardiovascular abnormalities and diseases. The apparatus is preferably housed in a housing having a pulse simulator designed to receive a finger of a user and an correlated audio heart beat simulator designed to receive a stethoscope. The inventor has found that by coupling a pulse and a heart beat simulator together, a health care provider can be effectively and efficient trained in detecting and diagnosing cardiovascular abnormalities and disease using a stethoscope.

The inventor has found that health care provider become more versatile with a stethoscope when trained on the apparatus of the present invention because the apparatus of the present invention utilizes both touch and hearing to more accurately simulate a living animal including a human. The pulse provides a temporal background against which the heart beat can be monitored. Thus, subtle abnormalities can be more easily simulated and recognized by the health care provider during simulation training/teaching. The inventor has also found that by incorporating two tactile pulse simulators, one for the right side pulse and one for the left side pulse along with the correlated heart beat, health care providers can be effectively and efficiently trained to recognize out of phase pulses characteristic of vascular obstructions. The inventor has also found that the pulse and heart beat signal can be recordings from humans or animals or can be computer generated. Preferably, the pulse and heart beat signals for driving the pulse and heart beat simulators are recordings of living humans or animals.

The present invention broadly relates to a student training/teaching system for simulating symptoms of animal including human conditions in a temporally relevant manner using audio, visual and/or tactile outputs controlled by a digital processing unit.

The present invention broadly relates to a student training/teaching apparatus for simulating symptoms of animal including human conditions in a temporally relevant manner using audio, visual and/or tactile outputs controlled by a digital processing unit.

The present invention also broadly relates to methods for using the system and apparatus for training/teaching users vital aspects of animal including human diagnosable conditions.

In particular, the system of this invention includes a digital processing unit (DPU) subsystem having a user interface, bodily attribute generation software and an input apparatus and output apparatus for human-DPU interaction. The system also includes a visual output subsystem, an acoustic output subsystem, and/or a tactile output subsystem housed in a housing. A user interacts with the DPU via the user interface using the input and output apparatuses and selected a particle training exercise or a particular condition.

The system then generates the necessary output to simulate symptoms of a selected conditions. The generation software and the output subsystems operate to visually, acoustically and/or tactually simulate symptoms of different animal including human conditions by activating visual, acoustic and/or tactile output devices located in the housing and/or on surfaces of the housing. The visual, audio and tactile outputs are temporally coupled or correlated for a more realistic simulation of symptoms of a desired condition. Smell can also be temporally coupled with the other outputs using micro chemical pumps and aerosol devices that simulate a given order associated with the desired condition.

The system can also include, and in a preferred embodiment does include, a correlated visual display of the internal anatomical attributes of the condition on a display device which may be the same as the output device for interaction with the user.

In particular, the apparatus of this invention includes a digital processing unit (DPU) having a user interface, a bodily attribute or symptom generation software and an input device and output device for human-DPU interaction. The apparatus also includes a housing having a visual output component in communication with the DPU, an acoustic output component in communication with the DPU and/or a tactile output component in communication with the DPU.

The user interacts with the DPU via the user interface using the input and output devices to invoke a training exercise or to select a given condition for simulation. If the user selects a training exercise, then the exercise will generally randomly select a condition for simulation. Once a condition has been selected, the DPU causes the generation software to generate the output necessary for causing the output subsystems to visually, acoustically and/or tactually to simulate various symptoms of the conditions.

The simulated symptoms are the outputted so that the visual, audio and tactile outputs are temporally coupled for a more realistic simulation of symptoms of the condition. The housing of the visual, audio and tactile output can be of any desired shape, but preferably, the housing is either an artificial body or body part that allows the user to experience the symptoms associated with a given condition in a more realistic and relevant manner.

For example, if the condition were cardiovascular in nature, then heart beat (audio) output and pulse (tactile) output devices would be housed in a body part including the chest and neck or arms. If the condition included cardiovascular and respiratory symptoms, then the housing would include the same body part, but the housing would also include mechanical devices to simulate breathing rhythms. If the condition also included coloring and/or temperature, then the housing could be the same body part, but the outer covering of the housing would include material that can change color/hue and material that can change temperature. It should be recognized that for different conditions the housing can be designed in any desired to achieve a training/teaching environment that would improve diagnosis by using visual, audio and/or tactile sensory input through simulated visual, audio and tactile symptoms of the condition on and/or in the housing.

In particular, the methods of this invention relate broadly to the use of the system and apparatus to improve health care provider training by providing a more realistic and sensory rich interface where the user can see, hear and feel the symptoms of an abnormal condition in relationship to a normal condition or relative to other abnormal conditions.

One preferred embodiment of this invention relates to a medical training/teaching apparatus including a tactile pulse simulator designed to be felt by a user's finger, an audio correlated heart beat simulator designed to interface with a listening end of a stethoscope and a recording/playback unit in communication with the simulators for generating a pulse signal and a correlated heart beat signal. The apparatus preferably also includes a housing. The apparatus can also include a power source such as a battery, an ON/OFF switch, a tactile simulator intensity control and a volume control. The apparatus can also include a pulse and heart beat selector for selecting different pulse and correlated heart beat recording for playback in the playback unit. The apparatus can also include a second pulse simulator and the recording/playback unit can generate a second pulse signal so that a right and left pulse with correlated heart beat can be simulated on the apparatus.

One preferred method of this invention relates a method for training/teaching health care providers in the proper use of a stethoscope without the need for using actual humans suffering from a given cardiovascular abnormality, dysfunction or disease. The method includes placing a user's finger on the pulse simulator of the apparatus of the present invention, placing a listening end of a stethoscope on the audio heart beat simulator of the apparatus of this invention, placing an ear piece of the stethoscope in each of the user's ears, generating a pulse and correlated heart beat signal and sensing, touch and hearing, different cardiovascular states normal or abnormal.

One key aspect of this invention is the correlation of visual, audio and/or tactile symptoms of a given condition in a temporally relevant and realistic manner such as temporally correlating a simulate heart beat of an animal with a corresponding simulated pulse so that the heart beat can be heard and the pulse felt in a temporally relevant manner. Thus, for a device of the present invention that simply simulates a heart beat rhythm and a pulse rhythm, the housing would include a playback device for generating a first electronic signal corresponding to a pulse and a second electronic signal corresponding to a correlate heart beat, a tactile pulse simulator for receiving the pulse signal and generating a pressure pulse discernible by touch and an audio simulator for receiving the heart beat signal and recreating the heart beat to be heard through a stethoscope.

The audio attributes include temporally correlated pulse, heart, respiratory and/or other acoustically perceivable bodily sounds and/or rhythms. The visual attributes include temporally correlated coloring, texturing, motion and/or other visually perceivable body attributes. The tactile attributes including pulse, respiratory, heart, thermal and/or other tactually perceivable body attributes.

Suitable digital process subsystems or units (DPUs) capable of being used with the present invention include, without limitation, any apparatus capable of inputting, manipulating, altering and/or changing and outputting digital and/or analog data, e.g., personal computers, laptop computers, desktop computers, palm computers, mainframe computers, minimainframe computers or any other digital and/or analog processing device that can receive data input, act on the data input via software and/or hardware and generate a corresponding output based on the input data and the internal hardware and/or software. Generally, the devices include a processing unit, a memory, e.g., on the processing unit or on electronically connected memory chips, a mass storage device, e.g., hard disks, solid state disks, tapes or the like, buses for interconnecting components, peripherals, e.g., a display, a speaker, a mouse, a keyboard, a touch pad, a eye tracking device, a VR device, or the like, communication hardware and all necessary software including the generating software of the present invention. The necessary software will generally include, without limitation, a windowing operating system, communication software, driver software for all peripherals and the like.

Suitable tactile simulator can be any device that generates a pressure pulse to an electrical signal corresponding to a pulse. Preferred simulators include a thin resilient cover and a tactile switch that springs out in response to an electric pulse signal. By placing a finger on the cover, a user can feel with the tactile switch changes from its retracted position to its extended position. Other devices include a resilient cover and a collapsible tube attached to a reservoir filled with fluid with a compression device surrounding a portion of the reservoir which in response to a pulse signal compresses the reservoir forcing fluid into the tube causing into inflate while the compressive force is applied and to deflate after the compressive force is removed. Any other device such as a piezoelectric transducer can be used to generate a pressure pulse that can be sensed by the touch of a humans finger.

Suitable heart beat simulators include any audio device capable of generating sound corresponding to the frequency range of an animal including a human heart beat. Of course, for different animals, the device many be different so that it more effectively reproduce that recorded heart beat.

Suitable respiratory simulators include, without limitation, any mechanical, electrical, electromechanical device that can simulate respiratory motion of the outer material of a housing.

Suitable devices to simulate chest motion during breathing include, without limitation, proportional solenoids, solenoids, or the like and other devices used in animaltronics devices to simulate animal or human movement.

Suitable visual display devices for use in the artificial bodies or body parts include, without limitation, LED, LCD or other flat screen devices or rear screen projection devices where the surface of the artificial body or body part is made of a screen to rear screen projection. Additionally, the surface material used in the artificial bodies or body parts can be thermally sensitive polymeric material that changes color with changes in temperature. Of course, when using polymeric materials that change color with temperature, the body or body parts would have to have heating and cooling devices associated with the thermochromic polymer materials.

Suitable recording/playback units include any device that can record and/or playback a recording of an animal's including an human's pulse and correlated heart beat. The inventor has found that for apparatus that use a single pulse simulator that a standard stereo signal can be recorded with one track recording the pulse and the other track recording the heart beat so that the pulse track is directed to the pulse simulator and the heart beat track is directed to the heart beat simulator. For apparatus that have two pulse simulators, pulse can be recorded on single stereo track while the heart beat can be recorded on a separate mono or stereo track. Suitable recording/playback units include, without limitation, cassette tape recording/playback, CD recording/playback, DVD recording/playback or other similar devices.

The Self Teaching System (STS) system of this inventions can include simple device that simulate a variety of pulses and correlated heart beats to more comprehensive "multisensory training system" that use artificial body constructs to simulate information for sight, sound and touch sensory input. The rationale for such a system in medicine is that neither patients nor instructors are available for teaching physical diagnosis. The system provides a high fidelity simulation of the various visual, audible and tactile signs. Formerly provided by patients, and interactive instructions, formerly provided by instructors, for self education of students either individually or in small groups. CD's will be produced of appropriate course material and may be replayed on standard PCs. Relatively low cost transducers must be added to reproduce the sensory signal and complete the system.

Various Modes of the STS

Although focused on training health care providers, the system of this invention could be used for self-teaching wherever familiarity simulated with physical properties are important.

In teaching medicine, the system can range from a highly-realistic entire body with multiple transducers through segments of the body, down to the sub-segments such as a chest segment, or single arm for pulses or pressures. Also, in situations where physical form is not considered essential, simple bare transducers can be used and the relation to the body shown by a mouse-controlled pointer on a video display associated with a digital processing unit, which can be a PC or a lap tops or palm computer. The flexibility to have the system installable on PCs, lap tops and/or palm computers, allows many of the programs to be taken home for use as well as some of the smaller simulators.

In embodiment, the audio and tactile devices such as a transducer and a speaker can be used in a stand-alone mode with computer control being replace by a simple miniature smart keyboard. For example, an arm segment can contain a pulse generator with various rates and rhythms operated by an associated simple processing unit and a keyboard user interface.

Unique Features of the STS

Currently, computer teaching systems are limited to video and sound with one exception, which is a huge separate, independent and expensive (80K) partial mechanical mannequin and a conventional computer display. The following aspects of the present invention make the system lower cost and yet of greater flexibility: (1) addition of haptic signals to an integrated teaching system is unique; (2) addition of variable temperature, color, and mechanical resonance is also unique; (3) a stand-alone pulse system, the device is unique in that pulses and impulses can be varied in rate, rhythm, and profile; (4) a system which can utilize existing PC's as the most expensive component allows a great cost savings; (5) a system using laptop computers for portability is unique; and (6) use of a mouse controlled pointer to define the signs present in a given area is unique.

Use of the System in Teaching the Cardiovascular Physical Exam

The system and the passive and dynamic patient simulator apparatus of this invention along with the student's own body are used to train the student's visual, tactile and auditory sensibilities. The system and apparatus are designed to supply the student with a dynamic self-learning environment combining computer generated lectures, graphics and text in conjunction with the passive and dynamic simulators of this invention to provide the necessary background to understand and interpret the physical findings. The system and associated simulators are integrated with the following course on recognizing, diagnosing, and interpreting audio, visual and tactile data associated with various cardiovascular conditions, both normal and abnormal. The simulators of the present invention can be used to demonstrate the progression of a condition from its early stages through its latter stages by continuously augmenting the control signals going to the simulator devices so that the audio, visual and tactile simulated data corresponds to the changing conditions. The simulators of the present invention can also be used to simulate a normal condition and an abnormal conditions simultaneously on two different simulators or in any given sequence on a single simulator.

The system and apparatus associated therewith are ideally suited for training health care providers in the performing physicals examinations utilizing their eyes, ears and hands to identify and diagnosis cardiovascular abnormalities. The following illustrate the a teaching format for training medical personnel in performing the proper techniques for performing a cardiovascular examination and using the information for diagnosis a condition. The format utilized apparatus of this invention which simulate normal and abnormal cardiovascular conditions as the students are being taught either in a lecture or in a self-study format where the computer the controls the simulators also administers the self-study coarse. Thus, the student will be able to experience the various conditions on the simulators while learning about the conditions on the computer either in the form of an auditory lecture or an audio-visual lecture where the condition is also shown using videos of real patients or visuals that show that internal phenomena that cause the sounds, motions and/or feelings simulated by the simulators.

Cardiovascular Physical Examinations

A cardiovascular exam should have two major goals; to determine how well your patients' nominal 5 liters of blood is being circulated to maintain all body tissues and functions, and to detect any abnormalities which might be interfering with this circulation. While the cardiovascular is only one of several systems evaluated in the general physical examination, cardiovascular disease is by far the most prevalent disease in this country and kills more than the next two combined. This makes the cardiovascular a critical part of any physical exam. In addition, a limited physical examination focused on the cardiovascular system is frequently required in many circumstances.

Overview, Protocol and Observation

Elements of the Exam

A physical exam should be the confirmation of a valid history, but patient histories can be incomplete or misleading so one must be alert for signs which are unexpected or inconsistent with the history. Document your findings in simple, descriptive and usually non-diagnostic terms, for diagnosis is a process which must include history, physical examination and laboratory results.

Your primary instruments in the cardiovascular physical examination are visual inspection and observation, tactile palpation, percussion and auscultation. A few mechanical instruments are used such as the blood pressure apparatus, a watch or other timing device, opthalmoscope, stethoscope, a pen light and scale.

Normally, examination of any area begins with visual inspection followed by palpation, sometimes percussion, and then auscultation.

One of the most important features of any physical exam is a consistent approach, to ensure that nothing is missed. A checklist is provided for the focused cardiovascular exam taught here—use it. For efficiency, performance of the cardiovascular physical exam must be integrated with other examination procedures, often in the same body area when a general exam is done, and this will be a challenge for each student.

Caution: The most common cause of an inadequate exam is failure to proceed in an orderly fashion. While there will be many temptations and apparent reasons for skipping about, to feel an obvious pulsation or to chase a murmur before palpation, this will guarantee that some feature, oftentimes crucial, will be missed. Use the checklist until an orderly process becomes second nature.

The exam begins with a general observation and proceeds with a search for vascular signs in the limbs, head and neck, and then in the trunk. Bates limited its description of the "peripheral" vascular system to limbs. The arrangement used here is based on anatomy and the usual order of conduct of the exam. Vital signs are discussed separately here.

Initial Observation

The first step of the exam begins the moment one sees a patient, whether walking into your office in apparent good health or moribund in the ED or CCU, and is primarily a general observation and visual inspection. This initial observation may include tactile contact, both deliberate and coincidental, during introduction, taking of blood pressure, etc. The initial observation should 1) seek to identify any genetic conditions know to be associated with cardiovascular disease, 2) identify any of the many acquired conditions which may produce cardiovascular disease, 3) identify evidence of habits and life styles known to predispose patients to cardiovascular disease, and 4) identify any signs of existing cardiac disease including an estimate of the general status of circulation.

Table 1 lists some of the genetic diseases with obvious expression that most often have cardiovascular components. An appropriate text and your lectures should be used to learn the signs of these genetic disorders, such as the long thin limbs and other aspects of a Marfan's syndrome, which also typically has a defective aortic structure that usually leads to aneurysm and premature death unless treated.

There is also a variety of acquired diseases, often affecting the cardiovascular system, and a few examples of these are listed in Table 2. Again, this list is not comprehensive. Not included here, for example, are respiratory diseases which can produce a wide range of cardiovascular problems. A text should be consulted for the pertinent signs and details. Lifestyles are the most common cause of cardiovascular disease, and evidence of this is frequently obvious; in obesity, tobacco stains, the flush of "good living" with excess alcohol and rich food, or the stigmata of drug abuse. Don't forget that the third trimester of pregnancy produces cardiovascular stress with tachycardia and a variety of murmurs.

TABLE 1

Some Genetic Diseases That May Be Visibly Obvious and Often Have Cardiovascular Components

| Disease | Prominent Signs | Cardiovascular Component |
|---|---|---|
| Marfan's syndrome | Increased stature, long limbs, especially arms, finger joint laxity | Degeneration of aorta and valve, mitral valve prolapse |
| Klinefelter's syndrome | Tall with long extremities, eunuchoid, gynecomastia | Atrial and ventricular septal defects, patent ductus arteriosus, occasional tetraology of Fallot |
| Homocystinuria | Long extremities, kyphoscoliosis pectus carinatum | Thrombosis of intermediate arteries |
| Acromegaly | Increased stature, "spade" hands, enlarged nose, ears | Hypertension, conduction defects, cardiomyopathy and cardiac hypertrophy |
| Turner's syndrome | Dwarfism | Females - Goarctation of aorta Males - Valvular pulmonic stenosis |
| Scleroderma | Thick, leathery skin which may become tight and shiny with ulceration of finger joints or tips | Pulmonary hypertension, myocardial, pericardial and valvular disease |
| Hurler's syndrome (mucopolysaccharoidosis) | "Gargoylism", large protruding tongue, short neck, depressed nasal bridge | Stenosis or regurgitation of mitral aortic valves, hypertension, coronary artery disease |

TABLE 1-continued

Some Genetic Diseases That May Be Visibly
Obvious and Often Have Cardiovascular Components

| Disease | Prominent Signs | Cardiovascular Component |
|---|---|---|
| Down's syndrome (Mongolism) | Reduced cranium, short nose and neck, reduced jaw | Endocardial cushion defect |

TABLE 2

Some Acquired Diseases That May Be Visibly
Obvious and Often Have Cardiovascular Components

| Disease | Prominent Signs | Cardiovascular Component |
|---|---|---|
| Obesity, extreme - Pickwickian syndrome | Obvious Somnolence, obesity, hypoventilation | Biventricular hypertrophy and failure Pulmonary hypertension hypoxemia, hypercapnia |
| Gushing's syndrome | "Buffalo hump, truncal obesity | Coronary artery disease, atherosclerosis, hypertension |
| Hyperthyroidism | Exopthalmous, hyperactivity, perspiration | Tachycardia secondary to increased cardiac output, atrial fibrillation, cardiac failure |
| Hypothyroidism | Reduced or slowed activity, coarse skin, missing lateral third of eyebrows | Pericardial effusion, coronary atherosclerosis and myocardial infarction |
| Infection | Increased temperature, various signs depending on microorganisms | Increased heart rate, pulse pressure may increase, and election murmurs may be present. A variety of other cartiovascular signs such as murmurs may be present if the cardiovascular system itself if infected. |

Cardiovascular disease itself can produce a variety of visible signs and symptoms including clubbing of the fingers, swollen, discolored or ulcerated feet and ankles, etc. General observations, especially of patient activity, can often provide information on the functional status of the circulatory system. This will obviously be restricted to the conditions under which the observation is made, usually brief ambulation or at rest, and does not ensure that circulation is adequate for the other, more vigorous activities nor does it exclude a serious problem. A patient who has pink warm hands and walks briskly without difficulty has, in all probability, adequate circulation for that activity, in contrast to an individual with a severely compromised circulation who can only lie quietly, with cold pale or cyanotic skin. Posture and respiratory effort can provide additional information on the state of pulmonary circulation.

The foregoing are limited examples of some obvious signs that should be sought routinely, and you should add a great many more as you become familiar with an increasing number of diseases in the various specialties. Signs of local vascular insufficiency may often be obvious, and these signs are discussed under the peripheral examination. Even this limited list may be causing you concern especially when it should take only 1 to 2 minutes to make this observation. The answer is experience, and experience of this sort can be gained by observation of your peers, people on the street, and especially in the patients around the hospital. I can promise you that continued observation of ambulatory patients as you enter and leave the hospital every day will provide opportunities to see most of the signs just described.

Vital Signs

These signs have the importance implied by their name. Unfortunately these measurements are often delegated, carelessly or even erroneously done, and at best their significance is only partially appreciated. Traditionally they include temperature, T, arterial blood pressure, pulse rate and rhythm, P, and respiration, R,—TPR. Never forget that if you delegate the collection of this data you remain responsible for its validity. Moreover you will be considered the responsible expert in both its acquisition and interpretation—especially by the legal profession. These data may be collected at various times or locations in the examination.

Temperature

Temperature is now typically taken by an instrument which measures infrared radiation from an artery of the ear canal and is generally reliable. The physician must also be familiar with the older oral and rectal mercury thermometers and their electronic counterparts. One of the skills to be acquired by a physician is a sense of temperature, and of temperature differences in various cutaneous areas. Any time the sensed temperature seems at variance with that which is measured, it should be re-measured.

Warning! The "white coat" is a potent sympathetic stimulation for some individuals and may elevate both BP and KR, potentially producing false diagnoses.

Heart (Pulse) Rate

Pulse or bean rate is measured by counting the pulse for one minute at any easily accessible point, usually by palpating the radial artery in a wrist. If shorter periods am used there is a probability of error which increases inversely with sampling time2 or with arrhythmias. Authors express differing opinions about relative sensitivity of the various areas of the hand when used in palpation, a question frequently raised by students. Neurosensory studies demonstrate that for variation in pressure such as occurs in evaluating pulses or impulses, there is little difference between palmar surfaces of thumb, finger or palm; however, two point discrimination is much higher in fingers and thumb. With a 30 sec sample period an actual rate of 72 beats per minute (BPM) could be counted as 71-73 and with a 10 sec sample. 66-78 BPM Rhythm A normal pulse is often slightly irregular, especially in youth, and may also vary with respiration (sinus arrhythmia). Abnormal rhythms with regularly or irregularly absent or added beats may be found. One of the few pathognomonic anhythmic pulses is the "irregular irregularity" of atrial fibrillation. Any arrhythmia of the pulse should be recorded with the rate and some form of electrical abnormality assumed. An EKG taken during the arrhythmia will usually allow diagnosis of the problem.

There are cases where every contraction of the heart does not produce a palpable pulse. This difference between heart rate, usually detectable by auscultation and pulse rate is the pulse deficit and should be recorded. A common mistake made by students is to report the rate of every pulse and impulse examined. Report only the pulse rate and rhythm detected at your initial point of measurement unless you detect a difference in heart rate/rhythm by auscultation, where both pulse and heart rate are recorded.

Blood Pressure

Arterial blood pressure is taken by placing a pneumatic cuff snugly around the arm and inflating it above systolic blood pressure with measured pressure, to occlude the artery as shown in FIG. 1A. This is the Rivi-Rocci technique almost universally used for manual and many automated BP measurements. If the cuff is too small or is loose, much higher pressure is required to place the same force on the artery, and this will falsely elevate readings as shown in FIG. 1B.

With a proper cuff, when cuff pressure is lowered at a constant rate (3-4 mm Hg/sec), at some point proximal arterial pressure will exceed cuff pressure and force a jet of blood into the artery downstream setting up oscillations which may now be heard with a stethoscope, the K (for Korotolcoft) sounds. As reduction of cuff pressure continues, blood will flow over more of each cycle, but will still be stopped for a part of it, and the opening jet will still induce sounds at each cycle until cuff pressure falls below diastolic and blood flows continuously and quietly, as shown schematically in FIG. 1C.

Normally K sounds and a palpable pulse4 appear abruptly at systolic pressure and continue until diastolic pressure is approached where the sounds become fainter or "muffled" and fade completely at diastolic level as shown in FIG. 1D. The level at which fading occurs is taken as a diastolic pressure, but sometimes there may be only a change in sounds at diastole and the changed sounds may persist to almost zero pressure. Another variant is for sounds to disappear in mid range and reappear, producing an "auscultatory gap? Systolic pressure is normally recorded in mm Hg as the cuff pressure where sounds are first heard, and diastolic as the level where they disappear. If a gap is present it is ignored5, and only first and last pressures heard are recorded. In cases of "muffling" which continues below diastolic pressure, both the pressure at which a change in sound occurs and the pressure at which they disappear are recorded. Posture of the patient should also be noted for this can produce significant changes in pressure.

Respiration

This sign is too often ignored, possibly because it requires more time and care in measurement and often requires removal of clothes for adequate observation. Measurement consists of counting the number of respiratory cycles per minute as indicated by chest wall or abdominal excursions. A minimum of 30 secs. counting time should be used.

The usual normal rate is 16 cycles/mm. Respiratory rate is normally driven by metabolic demands, and the increase with exercise or fever is commonly recognized. Respiratory rate is also sensitive to a variety of psychological and physiological drives, and is sensitive to the "white coat."

Significance of Vital Signs

Vital signs can only be understood and applied if their origins are understood. While this syllabus cannot begin to provide the necessary descriptions of pathophysiology, a few basics of particular clinical relevance will be reviewed here and elsewhere, and should be redundant to your basic sciences.

A surprising amount of diagnostic data is available from vital signs especially when correlated and properly understood. The general direction of diagnosis is frequently indicated by these data and may alert one to findings during the remainder of the exam. A very brief review follows.

Temperature

An increased temperature indicates either some pathological process, most commonly infection, or increased physical activity. In any event when metabolic rate is increased there is demand for increased blood flow so a tachycardia, possibly increased pulse pressure and often ejection murmurs are found with fever, especially in children. If the infection does not involve the cardiovascular system these signs will disappear with resolution of the fever.

Heart Rate and Rhythm

Heart rate alone is an invaluable indicator of cardiovascular function. Unfortunately the current criteria for "normal" heart rates of 60-100 beats per minute are potentially very misleading.

Individual heart rates vary and must be individually considered. Patients who perform significant aerobic exercise regularly and have increased stroke volume often have resting rates in the SOs, while the "couch potato" with a de-conditioned heart and low stroke volume may have a resting rate of 80, but without an obvious cause, resting heart rates of 80 beats per minute should raise the question of an underlying problem, or anxiety.

After allowance for the person's physical condition and for any psychological effects, an increased heart rate indicates an increased demand for blood. This may be from two causes:

1) a pump problem in which the stroke volume is reduced, or
2) an increased demand produced by increased metabolic activity, or in rare cases by an AM shunt.

True bradycardias are usually an intrinsic heart problem, often in the electrophysiological system.

Arterial Pulse/Blood Pressure

Figure 2:
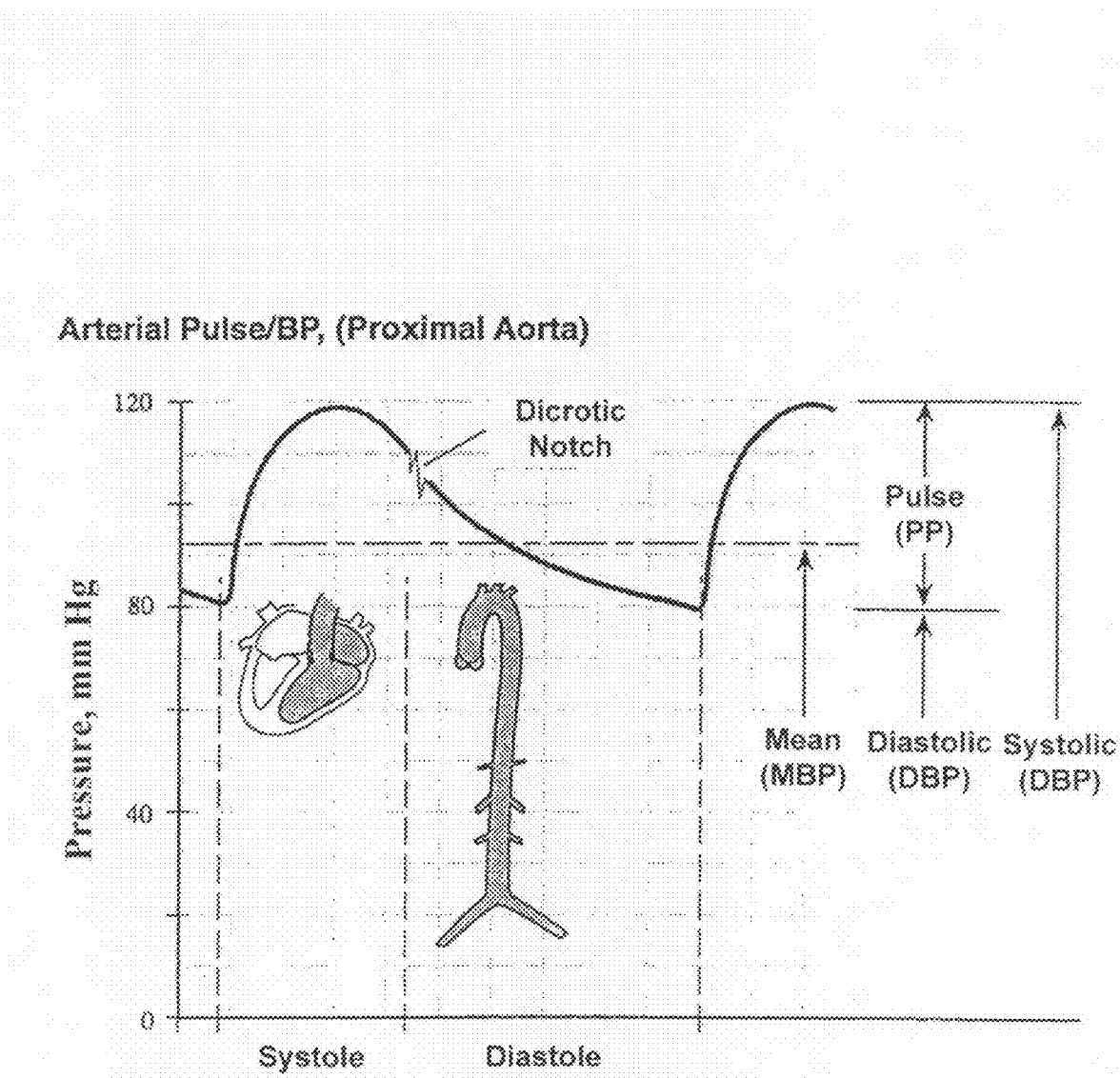
FIG. 2 depicts graphically the arterial pulse/BP (Proximal Aorta)

Interpretation of the values of arterial BP and heart rate is absolutely dependent upon an elemental understanding of and continued reference to action of heart and vasculature as shown in FIG. 2. When combined these values can provide invaluable additional information as follows.

Note: Character of the arterial pulse, its strength and profile, was once a crucial part of the vital signs, but this aspect of the pulse will be treated as part of the peripheral exam.

Remember that the heart is connected to the arterial system for only a fraction of the cardiac cycle during systole, and that systolic blood pressure (SBP) represents the peak ventricular pressure. For clinical purposes this may be considered the afterload of the heart. When ventricular pressure falls, the aortic valve closes, normally completely isolating the ventricle from the aorta. In diastole, which begins with closure of the aortic valve, pressure and flow are maintained only by passive elastic elements in the aorta. Under these conditions, pressure falls reaching its lowest level, diastolic blood pressure (DBP), when the ventricle begins to contract on the next cardiac cycle and pressure is again rapidly increased to its peak systolic value. This increase in pressure, the difference between systolic and diastolic pressure, is pulse pressure (PP), an important but often ignored quantity:

$$SBP-DBP=PP \qquad \text{Eqn. 2.1}$$

where SBP means Systolic Blood Pressure, DBP means Diastolic Blood Pressure and PP means Pulse Pressure.

Pulse pressure is determined primarily by 1) the volume of blood ejected by the heart into the aorta and 2) the elasticity of the aorta. In some older, otherwise normal individuals whose aortas lose elasticity and become stiff, systolic blood pressure may be high and diastolic low, creating a "wide" pulse pressure. More importantly, in the typical patient with a normal aorta, pulse pressure is often a useful indication of stroke volume (SV). There are individual variables that prevent derivation of a quantitative stroke volume from pulse pressure.

Based on long clinical experience, the current normal range of blood pressure is 90-140 systolic/60-90 diastolic, with 120/80 mm Hg the normal mode. Individuals with pressures well below the usual should be questioned about symptoms associated with hypotension, because many patients function normally with low pressures.

Another all too seldom used derivative of measured arterial blood pressure is mean blood pressure (MBP). This is the effective pressure which, when combined with systemic resistance, determines blood flow. MBP is calculated by;

$$PP/3+DBP=MPB \qquad \text{Eqn. 2.2}$$

where PP is pulse pressure, DBP is diastolic pressure and MBP is mean blood pressure.

The median value is (120-80)/3+80=93 mm Hg, and the normal range of MBP is >70 to <107 mm Hg.

Use of mean blood pressure to determine hypertension, instead of isolated systolic or diastolic values, will often resolve diagnostic dilemmas. However it is now common practice to treat systolic hypertension even when mean blood pressure is normal, to prevent left ventricular hypertrophy.

Cardiac output (CO), which is also the sum of blood flow through the body's tissues, is arguably the most important indicator of circulatory system performance. It is the product of:

$$SV \times HR=CO \qquad \text{Eqn. 2.3}$$

wherer SV means Stroke Volume and HR means Heart Rate and CO means Cardiac Output.

Typically in a young person at rest istt is: 70 ml/beat×70 beats/min=4,900 ml/min or approximately 5 L per min. This means that the usual blood volume of 5 L is circulated once per minute.

Magnitude of the second factor in cardiac output, stroke volume, is often indicated by pulse pressure, and heart rate and pulse pressure should be considered together see equation 2.3. For example, tachycardia and low pulse pressure are consistent with pumping problems, low preload or problems in the heart, while a normal or wide pulse pressure and tachycardia may indicate an increased cardiac output in response to increased tissue demand, such as occurs in the third trimester of pregnancy, and in fever or thyrotoxicosis.

Although not part of the traditional vital signs, height and weight have long been part of a general exam. At last their significance to the cardiovascular system has been "officially" recognized with the recent addition of obesity to the American Heart Association list of cardiovascular risk factors. Obesity is currently defined by the relation of height and weight called Body Mass Index (BMI).

$$BMI = \frac{\text{mass in kilograms}}{(\text{height in meters})^2}$$

1 pound=0.454 kilograms and 1 inch=0.025 meters.

The various categories are defined as follows:

| | | |
|---|---|---|
| Normal Weight | BMI | 18.5-24.9 kg/m² |
| Overweight | BMI | 25-29.9 kg/m² |
| Obese | BMI | ≧30 kg/m² |

This is an objective measurement which can be as significant in a physical exam as the finding of and $S_3$ or elevated blood pressure. The importance of detecting this risk factor is that it is often reversible.

Measurement of height and weight are simple procedures but are often inaccurate for two reasons: 1) height is obtained by history not measurement, and 2) weight of clothing is estimated, i.e., the person is virtually never undressed. Errors from the latter can easily amount to several kilograms.

Examination of the Limbs, Head and Neck

Since cardiac pumping action is phasic and the human body and its blood vessels are elastic, a series of impulses, pulsations, vibrations, and sounds is generated by each beat. By location and evaluation of these byproducts of the heart's pumping action, an understanding of a patient's circulation, its abnormalities and their location and nature may often be obtained. One training tool we use to demonstrate these signs is a mechanical patient simulator. "Harvey," which can be programmed to produce many impulses, pulses and sounds which mimic those found in normal and a variety of pathological conditions.

Anatomical areas of the circulatory system may be categorized as follows, and the exam is done in this order.

1. Limb, head and neck or periphery
2. Precordium (anterior chest over the heart)
3. Chest
4. Abdomen A circulatory problem is often manifest in more than one of these areas, and identification of a defect often depends on integration of various findings from several areas.

Examination of the arms, legs, head and neck by inspection, palpation and auscultation provides information on the status of distribution and return of blood (and lymph) to and from these regions. Examination of the neck also gives unique information on input and output of the heart.

Arterial Distribution of Peripheral Blood Flow

Normal blood pressure and heart rate do not guarantee adequate circulation. Blood is normally conducted from the heart/aorta to the various tissues by a branching arterial system with little loss of mean blood pressure. Any obstruction to this flow can cause impaired function of the tissue involved, which can range from pain and fatigue with continued muscle activity (intermittent claudication), to death of the tissue. If flow to the brain is disrupted, mental function can be affected, sometimes intermittently. Syncope may occur. Disruption of flow to other tissues may produce a variety of signs, which will be evaluated in the this step of the examination.

Peripheral Pulse

Figure 3:
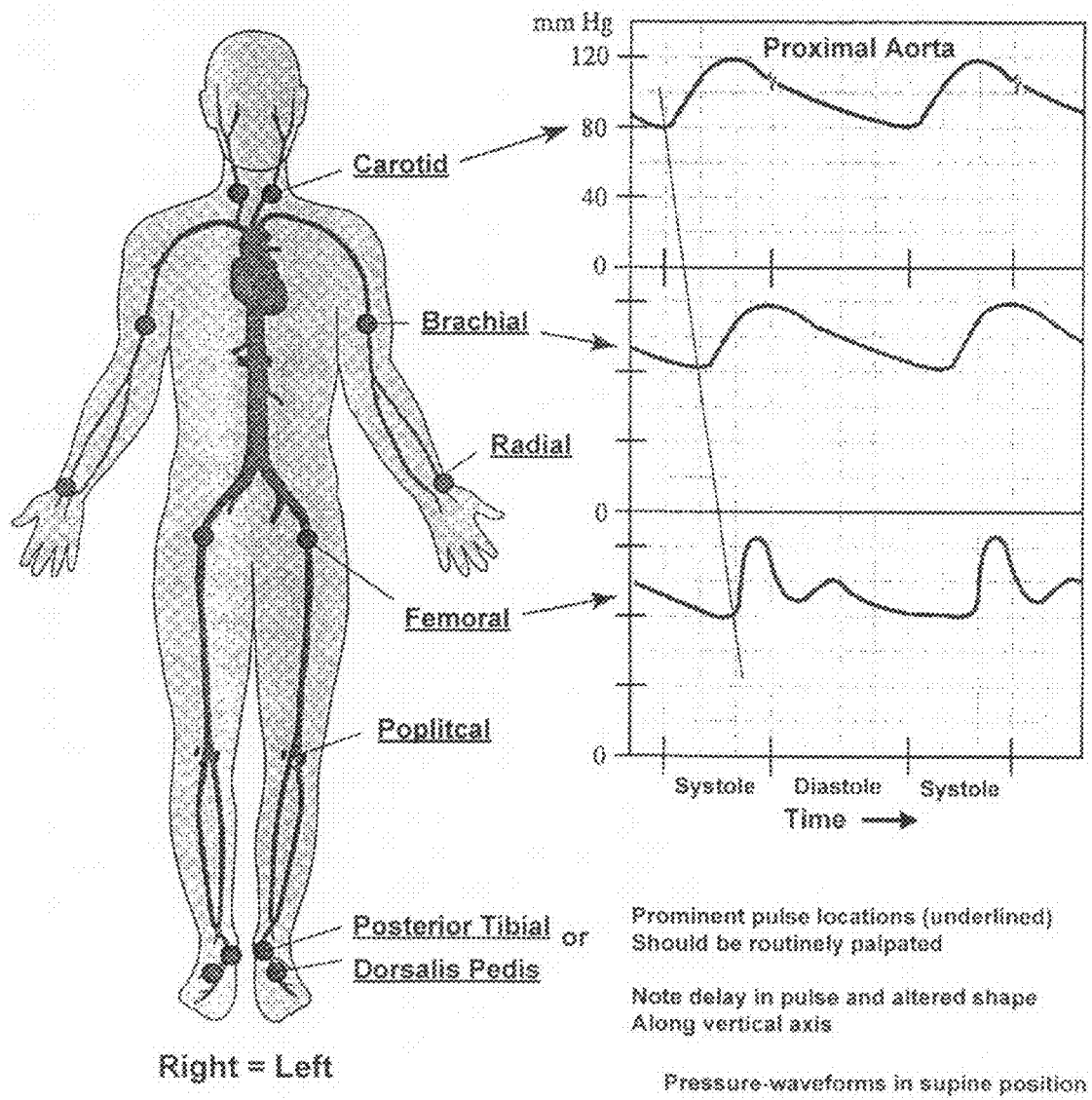
FIG. 3 depicts schematically and graphically peripheral pulses.

Ejection of blood into the aorta produces a wave or pulse of pressure which rapidly spreads from heart to distal arteries and arterioles. Arterial pulses are normally palpable at the major points as shown in FIG. 3. Variation in the character of a peripheral pulse is a primary sign of obstruction. Typically only the radial and pedal pulses are now routinely examined, but any indication of abnormality demands that the more proximal pulses also be examined.

Trophic Changes

Arterial obstruction, stenosis, produces a wide variety of visible and palpable signs and various symptoms depending on location, degree of obstruction and elapsed time. The extent of involvement depends on site of the occlusion. A lesion at say the bifurcation of aorta would involve both legs. Chronic moderate stenosis often produces a loss of hair over the area effected, while an unrelieved occlusion may proceed to blackening and often gangrene. Chronic severe reduction in flow frequently produces a superficial hard dark area (eschar) surrounded by pallor, often with a chronic central ulcer. If a large area is involved an ordinarily palpable artery serving the effected region will be diminished and delayed, or absent if the stenosis is complete. Depending on artery size and degree of stenosis, a murmur (bruit) may be present.

Palpation

Propagation (as shown in FIG. 3) of the pulse must be evaluated at several points, in contrast to rate and rhythm, which may be determined by palpation of a single artery. Obstruction of an artery produces two characteristic changes in the pulse distal to the point of obstruction.

Abnormal delay in the rise of the pulse

Diminution of pulse amplitude.

The first step in this evaluation is simultaneous comparison bilaterally (using both hands) of the critical pulse points—radial, pedal and carotid. 12 Dorsalis pedis or posterior tibial pulses are especially important because of their path length and ▼consequent susceptibility to disease process such as atherosclerosis, in spite of frequent difficulty in finding them. Dorsalis pedis pulses are missing 10-12% of the population, but posterior tibial pulse should always be present in normals Carotid pulses must be palpated individually and with care to avoid occlusion. Bilateral equality is the norm for the same pulse location.

Any difference in amplitude or rise time between the pulses demands bilateral pressure measurement (pressures should be within 5-10 mm Hg of each other) and palpation of more proximal pulses, such as popliteals and femorals in the case of differing pedal pulses.

Next in order of examination is evaluation of longitudinal pulse propagation as shown in FIG. 3. This is done by palpating a carotid with one hand for reference while the other hand palpates radial, femoral, and pedal in order, looking for unusual delays or change in character. Normally there is a just perceptible delay between carotid and femoral/pedal pulses. Any significant obstruction to arterial flow will produce a delayed distal pulse with reduced amplitude.

A variety of lesions, such as atherosclerosis or aortic dissection, may cause unilateral or bilateral obstruction. Coarctation of the aorta is rare but a classic cause of bilaterally delayed and reduced femoral/pedal pulses.

Many classic descriptions have been made of peripheral arterial pulse contour, its rise, amplitude, duration and fall. Except for the carotid, current description of pulse is usually limited to normal, increased as commonly found in thyrotoxicosis or derotoxicosis, or decreased as is usually found in low output states such as heart failure.

Functional Tests

Applying hydrostatic counter pressure by raising or lowering limbs, or by manual occlusion, frequently aids evaluation of arterial perfusion. In the case of either arm or leg 13, passive elevation to 60 í for 10 seconds will typically reduce the color of hand or foot and empty the visible veins. Lowering it below the heart should result in a return of color in a few seconds and filling of the veins in 10-15 seconds. This must be done one limb at a time to allow comparison. A delayed return of usual color or of normal filling of veins indicates inadequate perfusion.

Venous/Lymphatic Return

Anything which elevates venous pressures, even mildly, can shift the delicate balance of capillary/interstitial fluid exchange and produce edema, an excess of fluid in the tissue. Venous lymphatic and interstitial pressures are small and typically given in the smaller units of cm $H_2O$ instead of mm Hg. One mm Hg~1.34 cm $H_2O$. Chronic edema may result in a variety of tissue changes. Elevation of venous pressure may be produced by functional causes, such as congestive heart failure or by relatively minor degrees of external compression of major veins, which may occur from the weight of the uterus in pregnancy, or by pathologic changes such as occlusion of a major vein. Another cause of edema, which is not usually dealt with in cardiology, is lymphatic obstruction, which interferes with the normal scavenging of osmotically active fluid from interstitial spaces to the blood stream. This is lymphedema, which can be confused with edema of circulatory origin.

Signs of Inadequate Return

Diffuse swelling of tissue is an initial cardinal sign of excess tissue fluid. Such edema is more likely to occur in dependent regions, usually of the legs, beginning with feet and ankles. It is bilateral in heart failure or obstruction of the vena cava but may be unilateral with venous obstruction. In bedridden patients, the sacral region may be the first to become edematous. A first and early sign is pitting, which can be produced with firm pressure by a thumb on the affected area for 5-6 seconds or more. On removal of the thumb, a transient dent or pit remains, and the depth and extent of the pit is traditionally graded on a four level scale or, rarely, the pit depth is reported in mm.

Other early signs are venous distension and bluish discoloration. Suspicion of venous obstruction, especially in the lower limbs should be followed by deep palpation of the posterior muscle compartments in a search for tenderness or the presence of cord like thrombosed veins, produced by thromobphlebitis.

If such fluid accumulation continues, tissues may become fibrous and non yielding or brawny. Venous obstruction, or insufficiency from failure of venous valves, can produce insufficiency from failure of venous valves, can produce similar changes which, with time, can produce darkened, fibrous skin and ulceration, often over the medial malleoli. Failure of venovalves also often lead to varicosities, a condition not usually dealt with in cardiology.

Lymphedema from lymphatic obstruction may be bilateral but is often unilateral, as for example in an arm after mastectomy with unilateral removal of lymphatics and nodes. It can occur in any extremity for a variety or reasons, is typically non pitting, and may p extremity for a variety or reasons, is typically non pitting, and may piety or reasons, is typically non pitting, and may produce permanent tissue change.

Nail Clubbing

With prolonged cyanosis such as occurs in right to left shunting, tips of the fingers are enlarged, the margins of the nail become flattened and nail beds are cyanotic. Clubbing also occurs in other diseases.

Head and Neck

Head and Neck are examined next. The eye is the only area in the human body that allows vasculature to be directly observed, and a fundoscopic exam is an essential part of this examination. Opthalmoscopy, like auscultation, is an essential skill which only comes with practice.

The neck is of particular importance for several reasons. Diseases of the thyroid have many cardiovascular effects and occur frequently enough that the thyroid gland should be routinely palpated as part of any cardiovascular exam. Examination of both carotid arteries and jugular veins are of importance because of the close, relatively direct, connection to the output and jugular veins are of importance because of the close, relatively direct connection to the output and input of the heart and to the brain.

Note: In practice auscultation of the neck would also be done at this time, but description of this is delayed until later sections for didactic purposes.

Carotid Pulse

Only in exceptional circumstance is the character of the pulse in an extremity recorded, but character of the carotid pulse should always be recorded. This pulse is also a critical time reference for other pulses of the body, and for routine verification of systole/diastole in every auscultatory exam.

The carotid pulse is in the superior neck, anterior to the sternocleidomastoid muscles, as shown in FIG. 4B. Normally it is single, rises rapidly immediately after the first heart sound, $S_1$, and falls before the second sound, $S_2$, as shown in FIGS. 4A-1. Its force and amplitude are typically related to stroke volume and may be normal, hypokinetic in situations such as hypovolemia and heart failure, or hyperkinetic with increased cardiac output.

In occasional cases of severe left ventricular failure, each beat of a normal pulse regularly alternates with a hypokinetic pulse producing pulsus alterans.

Any significant obstruction in the cardiac outflow tract may produce a slowly rising, "delayed" pulse of reduced amplitude, as shown in FIG. 4B2.

A carotid pulse with two beats in a single cardiac cycle is dicrotic or "double beating," and is always abnormal. The classic dicrotic pulse with one impulse in systole and another in diastole indicates severe left ventricular dysfunction and is seldom seen. A more common dicrotic pulse is "split" in systole, the bifid pulse, as may be seen in Hypertrophic Obstructive Cardiomyopathy, as shown in FIGS. 4A-3. Aortic regurgitation often produces a hyperkinetic bifid pulse called bisferiens. Any carotid pulse with other than normal quick rise and smooth fall indicates a problem somewhere in the system.

Jugular Venous Pulses

Jugular veins can provide two important pieces of information T venous pulses and filling pressure of the right heart.

Internal jugular venous pulses are multi-phasic, normally with the larger "A wave" produced by atrial contraction prior to the carotid pulse followed by a smaller "V wave" from passive atrial filling late in systole with its peak at, $S_2$, as shown in FIG. 4C. They are, in spite of what many texts imply, seldom seen in healthy adults with firm neck tissue, but are often seen in older individuals and in some diseases. When present they are valuable signs which should be observed.

Caution: Venous pulses cannot be palpated because of low pressures. If you can feel a pulse it is unlikely to be venous. Harvey is mechanical and its jugular venous pulses are palpable, but this is an artifact. Don't waste your time on it.

Venous pulses must be observed, either by sighting across the vein against a contrasting background, or by shining a beam of light obliquely across it to cast a shadow which amplifies the pulse's movement. These pulses must be timed by simultaneous palpation of the carotid pulse.

FIG. 5 shows the generation of normal and abnormal pulses. The normal pulses are generated by atrial contraction, "A," and passive filling, "V." If there is any obstruction to active filling from atrial contraction, the A wave will be exaggerated, often into a "giant A wave," as shown in FIG. 5B. This obstruction may be mechanical, such as a stenotic tricuspid valve, or hemodynamic as in congestive heart failure. If there is regurgitant flow from a tricuspid valve the V wave will be exaggerated as shown in FIG. 5C.

Note: Pulse waves, often in distorted form, are sometimes seen in the external jugular veins but should be used with caution sine the external jugular vein has a valve between it and the vena cava, unlike the internal jugular veins.

Jugular Venous Pressure

Jugular venous pressure is a reliable means of measuring right ventricular filling pressure and is a valuable data point in heart failure and other conditions. In the majority of patients, the external jugular will have to be used for pressure measurement since the internal vein is not visible. These external veins are variable in location but are usually on the lateral aspect of the neck.

Figure 6:
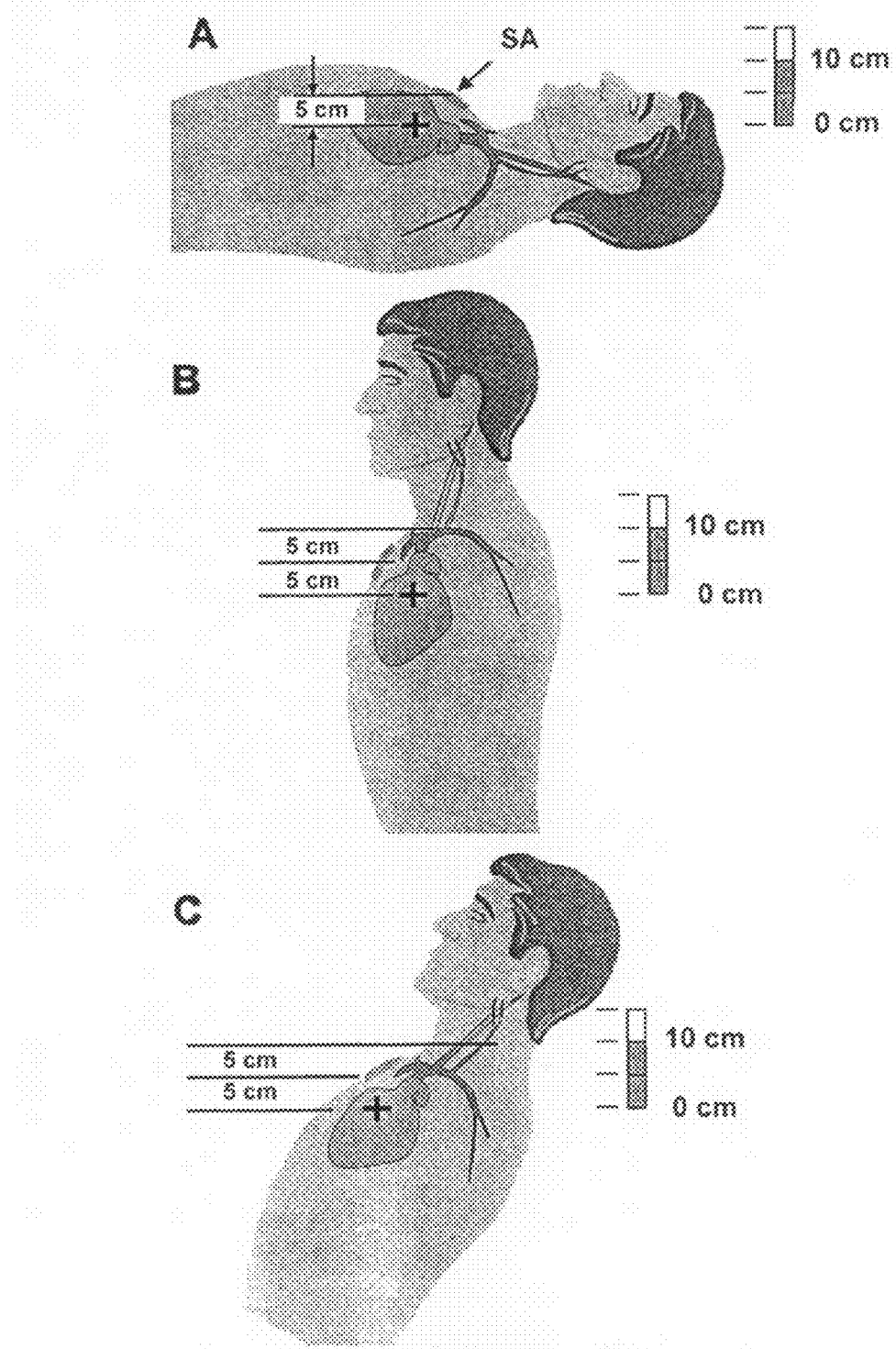
FIG. 6 depicts schematically and graphically a determination of right atrial mean pressure.

Determination of right atrial pressure as shown in FIG. 6. The right atrium (RA), indicated by the cross, is always approximately 5 cm below the sternal angle (SA) in supine to upright posture: A, B, C. This allows the SA to be used as a reference for the height of the blood column above the RA. The top of this blood column is the upper level of the pulse in the internal jugular vein or the upper limit of distension of the external jugular. With the patient supine, A, both jugulars are below the level of the blood column and completely filled, while normally in upright posture, B, the level does not extend into the neck, so the patient must be tilted as in C until the upper level of the blood column is clearly seen in one of the jugular veins. This vertical level of venous filling above the SA is then measured and added to 5 cm (height of SA above RA), or if the jugular blood level should be below the SA, the level below SA is ▼subtracted from 5 cm. In the case shown, the blood column is 5 cm above the SA so RA pressure is 10 cm H2O. Normal jugular venous pressures are less than 7 cm H2O, a mean blood column level ~2 cm above the sternal angle. Normal pressures can be quite low in healthy young people, on the order of 2 cm H2O, but such low filling pressures raise the question of hypovolemia.

Clinical Practice

Your ultimate ability in clinical skills will depend on practice. It is a fact of life that patients are not going to be available to meet all your practice needs at this time, which explains the use of expensive models and patient simulators (Harvey costs $125,000). A valuable training asset in the most basic element of training, the normal, is constantly available to you, your own body. The extent of such training can be expanded by examination of friends and colleagues. You should not come to class for this session without measuring your own BP/HR, palpating (bilaterally and longitudinally) your pedal pulses, other major pulses including carotids and your thyroid. You should have observed the effects of raising your arms to 60 ì and lowering them, have practiced the Allen test and palpate your apical impulse.

Hopefully, you will have practiced opthalmoscopy, examination of the jugular venous pulse and measurement of jugular pressure with a friend.

Examining the Precordium

Examination of the cardiovascular system in the trunk logically divides into 3 regions; precordium, chest and abdomen. The precordium, that region of the anterior chest overlying the heart and its connection to the great vessels, is of particular importance to the cardiovascular exam for some anatomic and functional characteristics of the heart, especially a diseased heart, may be detected here.

Precordium

This examination still consists of visual inspection, palpation, occasionally percussion, and auscultation, in that order, and usually begins with the patient sitting, but the supine position, which is often more convenient, may be employed at any time. Description of both palpation for thrills and of auscultation is delayed to the later sections of this booklet and classroom teaching delayed accordingly. Visual scrutiny of the bare chest can often give a considerable amount of information about genetic or acquired illness; the buffalo hump of a Cushinoid patient, the elevated shoulders and barrel chest of emphysema, various skeletal deformities, hypertrophic musculature, obesity, or wasting. All of these not only have significance to the final diagnosis, but also affect your physical findings, and as such, must be considered in the interpretation of your findings.

Also observe specific areas for visual signs before you palpate, for visual signs can often support your palpatory findings; for example a right ventricular "heave" along the sternal border, or displaced and enlarged apical impulse in the left lateral chest.

Caution: Even though some fascinating or striking activity is visible, do not begin your examination with such a finding but follow an established order such as given here.

Left Ventricular Apical Impulse

Examination of the precordium begins with inspection and palpation of the left ventricular apical impulse, which is generated by systolic contraction with elongation of the left ventricle. Point of maximum impulse (PMI) was the former term for this and is still sometimes used, and the other period, sounds not initially heard often become apparent. In the normal heart, an area near the apex is thrust against the chest wall but falls away rapidly as blood is ejected from the ventricle. Three characteristics of such apical impulses can reveal a surprising amount about structure and condition of a heart, and should be recorded. They are:

Location
Profile
Size (area)

Note: The apical impulse cannot be found in many normal and abnormal patients, but patient maneuvers can improve detection. If upright, lean the patient forward with full exhalation, or if supine, roll the patient on the left side to an angle of approximately 45°, again with exhalation.

Location

A normal or purely hypertrophic left ventricular apical impulse is typically found in the fifth left intercostal space, mid-clavicular line (5LICS, MCL) as shown in FIG. 7. If a left ventricle increases in external size, its impulse shifts laterally left and to a lesser extent, inferiorly. Structural change external to the heart may also shift its position and its apical impulse. For example, with a mediastinal shift, the impulse may move laterally, while in emphysema sufficient to depress the diaphragm, the impulse may move inferiorly. An aerobic athlete's left ventricle typically adapts by enlarging slightly, or the ventricle of a heart in early failure may simply dilate, and either of these two very different conditions may shift the apical impulse as much as a few cm left, and slightly inferiorly. Gross dilation of the left ventricle, such as occurs with compensation or adaptation to volume overload or decompensated heart failure, may shift the impulse farther left, as far as the anterior axillary line or beyond, and move it inferiorly to the 6th or 7th LICS as shown in FIG. 7.

Shape or Profile of the Impulse

Figure 8:
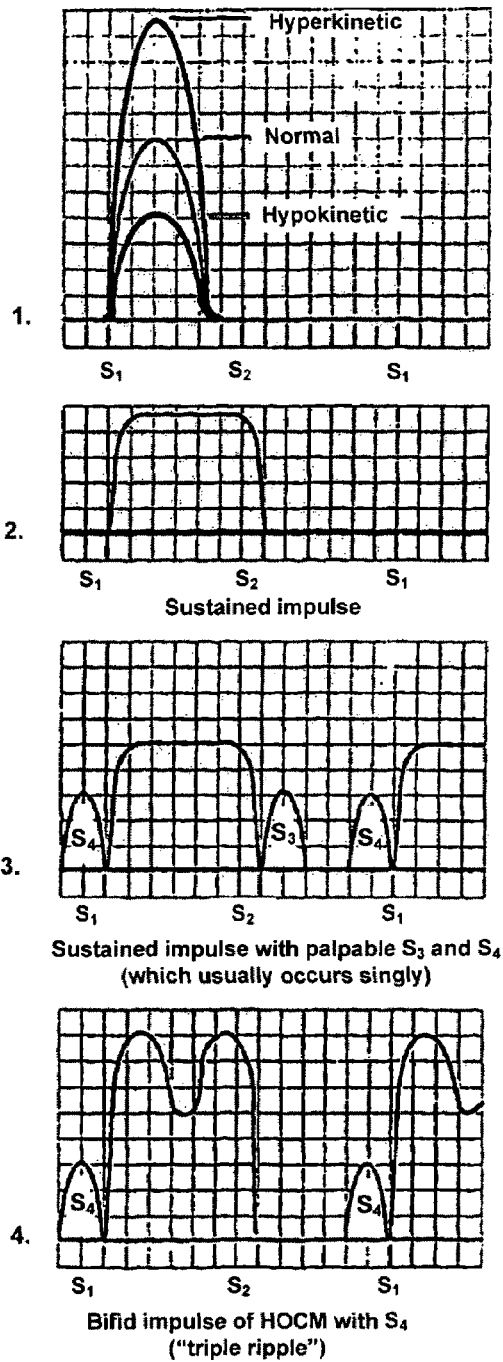
FIG. 8 depicts graphically contours of precordial ventricular impulses.

Shape or profile of the impulse, as shown in FIG. 8, can provide important functional information. The normal apical impulse has a quick rise, immediately followed by a rapid falling away as the normal heart at rest ejects two thirds of its stroke volume in the first third of systole. If ventricular pressure is increased for any reason, hypertension, aortic stenosis, or whatever, the myocardium cannot contract as rapidly3, and the impulse lasts longer or is sustained. The myocardium's force and velocity are inversely related as may be seen from a muscle force velocity curve. Thus, a normal heart may have a sustained impulse with a pressure overload. However, a heart with a weakened myocardium, for example a cardiomyopathy, may also have a sustained impulse with normal systolic pressure.

A bifid systolic apical impulse can occur rarely in hypertrophic obstructive cardiomyopathy.

Diastolic apical impulses, palpable $S_3$ and $S_4$, may occur with an imbalance between rate of filling and compliance of the ventricles. Palpable $S_{3,4}$s may or may not be heard on auscultation, and vice versa. They may occur in either ventricle, and are discussed in more detail under auscultation.

Size of Impulse

Size of the impulse can give information on heart structure. A normal impulse area is "dime sized" or approximately 1½ cm diameter, while the impulse of a hypertrophic heart may occupy an area equal to a quarter or more, or $\geqq 2.5$ cm diameter. When a ventricle dilates, its greater radius of curvature may extend the apical impulse to several interspaces.

Ectopic Area

Another precordial region of importance in inar evaluation is the ectopic area, as shown in FIG. 7, a larger region superior and medial to the site of the normal apical impulse, an area which overlies the left ventricle. With a large left anterior ventricular infarction, the affected myocardium may not contract, may become akinetic, and then dyskinetic, moving abnormally outward under ventricular pressure during contraction. This produces a sustained ventricular impulse of the ectopic area whose size depends on the amount of muscle infracted. If the patient recovers, this area may become an aneurysm with a sustained systolic impulse.

Right Ventricle

After examination of the apical and ectopic areas investigate the region of the left sternal border with the patient supine. In normals, no cardiac motion will be found in this region, but right ventricular hypertrophy or dilation may produce a diffuse ventricular impulse along the lower left sternal border. Since the right ventricle is much nearer the chest wall, area of this impulse is usually larger and in many cases is marked enough to be referred to as a right ventricular lift or a heave. Shape of the impulse is more likely to be sustained. Palpable $S_{3,4}$ may be present. Rarely, a left atrium, grossly dilated from mitral regurgitation, may produce motion along the upper left sternum late in systole.

Pulmonic/Aortic Areas

The only other precordial area likely to be involved in cardiac action is the pulmonic (2LICS-LSB) with a palpable systolic pulse from a dilated pulmonic artery. Aortic dilation is seldom sufficient to produce a palpable pulse in the aortic area.

Unusual conditions may occasionally cause pulses or impulses outside the areas described here, but the precordial areas described are basic to a complete exam.

Percussion

Percussion, if carefully done, can roughly outline interfaces of differing density. Vibrations are induced through the finger of one hand held lightly against the body ₋s surface by striking it sharply with the end of a curved finger of the other hand4. If solid tissue or liquid underlines finger and surface, only low frequency, quickly damped vibrations will be induced, while gas or a gas filled viscus in the same position will produce a higher pitched, longer lasting vibration, which may be felt and heard with practice. Right and left borders of the heart can usually be outlined by repeatedly percussing across the precordium in horizontal parallel lines and noting where the percussion tone changes.

As usual, auscultation of the precordium is the last step in the examination and is described in chapters 4, 5 and 6.

Preparation for Class

Many of the features of the exam can be performed by you on your own body and are considered preparation for the class. These include palpation of the apical impulse and percussion of the anterior chest and liver. If you are not familiar with percussion a good place to start is your anterior thigh and anterior right chest. The thigh gives an example of extreme dullness while the chest is resonant. There are wide ranges of sounds from percussion that require practice to evaluate.

Getting Started in Cardiovascular Auscultation, Normal Heart Sounds

Introduction

Auscultation is the practice of listening to, and identifying the cause of sounds in the cardiovascular system; the science and technique of listening to the sounds, and the process of understanding and identifying them. This chapter is a brief introduction and the first in a series on auscultation. Auscultation remains a difficult, but still essential, part of physician training and practice and this is recognized at UTMB by special opportunities to learn the skill: basic didactics on auscultation, unique opportunities to learn the fundamental cardiovascular sounds with text, teaching and practice using a synthetic programmable patient, opportunities to listen to recorded sounds, including assigned studies of high-fidelity sounds and pulse in a take home study system; and, most important, access to patients who exhibit many basic sounds and murmurs. "Harvey" is an electromechanical anthropomorphic simulator with all of the fundamental heart sounds and murmurs. Your auscultatory ability will be evaluated.

In the not so distant past, when a phonocardiogram was the nearest equivalent of today's echocardiogram, many hours were spent listening to patients' chests, learning by individual pattern not only the basic heart sounds and murmurs, but virtually endless variations. Moreover one was frequently expected to use only the sound or sounds for diagnosis. There is no longer the time nor necessity to concentrate on such detail.

The methods used here to simplify learning auscultation take advantage of our current knowledge of sounds and murmurs and rely on proven teaching methods. This includes:
Separate treatment of sounds and murmurs
Routine use of the carotid pulse to positively distinguish systole and diastole
Routine use of sound diagrams
Concentration on the relatively few basic sounds and murmurs, which are characterized by function rather than sound.

Few students remember the details of sound spectra, hearing thresholds, etc. which are customarily presented in auscultatory texts. Conversely, without a minimal understanding of the nature of the sounds, the stethoscope, and perception of the sounds, few students can acquire the ability to hear many of the important sounds, say a quiet $S_3$ or $S_4$. Therefore, we begin with a brief introduction to the nature of clinical cardiovascular sound, the stethoscope and its use, and practical factors affecting one's perception of the sound. Techniques in practical listening will follow with special emphasis on timing and diagramming. You will then be guided through an actual session on auscultation of the most important of all cardiovascular sounds, normal (an obviously a presumption) heart sounds using the most important (to you) cardiovascular system in the world, your own. This introduction and exercise is only a first and basic step, however, it is a step you will or should use every time you examine a patient's cardiovascular system for the rest of your career. Introduction to abnormal sounds and murmurs is done in an accompanying chapters.

Cardiovascular Sounds

All physiologic sounds begin as vibrations of tissue within the body, which are selectively transmitted to various areas of the body's surface where they can produce sound. Virtually all cardiovascular vibrations and sounds are generated by disturbances in blood flow, either sudden deceleration or abnormal velocities which produce turbulence. Sudden decelerations set up transient oscillations, some of which are heard as brief audible events, the heart sounds. Current use of the word sound in auscultation is frequently confusing. As used here: Sound refers to any and all sounds. Cardiovascular sound refers to any sound in the cardiovascular system; heart sounds, murmurs, bruits, hums, etc. Heart sounds are murmurs, bruits, hums, etc. Heart sounds are brief, cyclic auditory events. A range of audible vibrations is associated with turbulence and produce the longer more complex events called murmurs. These are diverse phenomena with very different significance and while they are often intimately related, they are listened to individually; first heart sounds and then murmurs for heart sounds provide the skeleton or basis for correlation and identification of murmurs.

Figure 9:
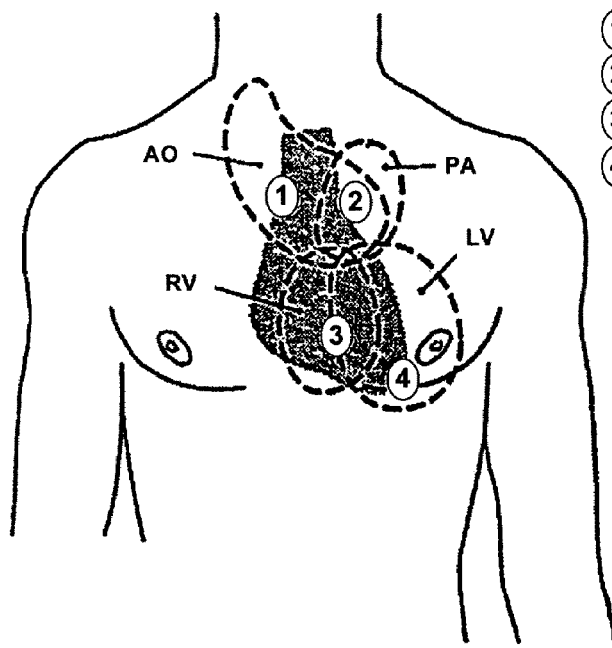
FIG. 9 depicts schematically and graphically the primary areas of cardiac auscultation.

Most of the precordial heart sounds and murmurs are associated with the four valves of the heart and associated tissue. Other tissues selectively transmit vibrations from regions of these valves to specific areas of the body's surface, which are identified by the associated valves; Aortic, Pulmonic, Tricuspid and Mitral, sometimes called Apical, auscultatory areas as shown in FIG. 9. These areas are now commonly referred to in anatomical terms, but traditional terminology is retained here for its diagnostic value. This distribution of sound is determined, in part, by proximity to the source and also by the nature and distribution of the tissue. For example, between source and skin, a column of blood such as the aorta transmits audible vibrations far better than a lung, especially a hyper-inflated lung. Another important aspect of tissue transmission is that certain frequencies of vibration are transmitted better than others. The tense aorta, pulmonary artery and ventricles in systole all selectively convey higher frequencies. Thus, an aortic ejection murmur is heard as a blowing sound higher in pitch, say, than a murmur of mitral stenosis transmitted to the mitral area by the relaxed left ventricle where only the lower frequencies are heard as a rumbling sound.

These physical effects are of clinical importance. If one hears a sound best at a particular auscultatory area, the odds are that it was generated by blood or tissue associated with the valve for which the area is named, thus indicating location. These areas are now commonly referred to in anatomical terms, but traditional terminology is retained here for its diagnostic value. One can vary anatomical relations and improve sound transmission. For example, by having a patient lean forward, the heart is brought nearer the precordium, often increasing the intensity of a given sound at the chest wall. In the same way, if a patient exhales, the heart may come forward and lung tissue becomes a better conductor, often enhancing sounds. By recognizing the characteristic sounds from a relaxed ventricle one immediately establishes a likely source.

Hearing

On reaching the body's surface, a few vibrations, such as those from severe aortic stenosis, are intense enough to be felt as a "thrill." This is the exception, for the hand does not compare in sensitivity to the ear. Chest wall vibrations produce pressure waves in air that may be transmitted to the ear, which is thousands of times more sensitive to pressure variations than the hand. In addition, the auditory system has great discrimination in time, in frequency, and in intensity.

Figure 10:
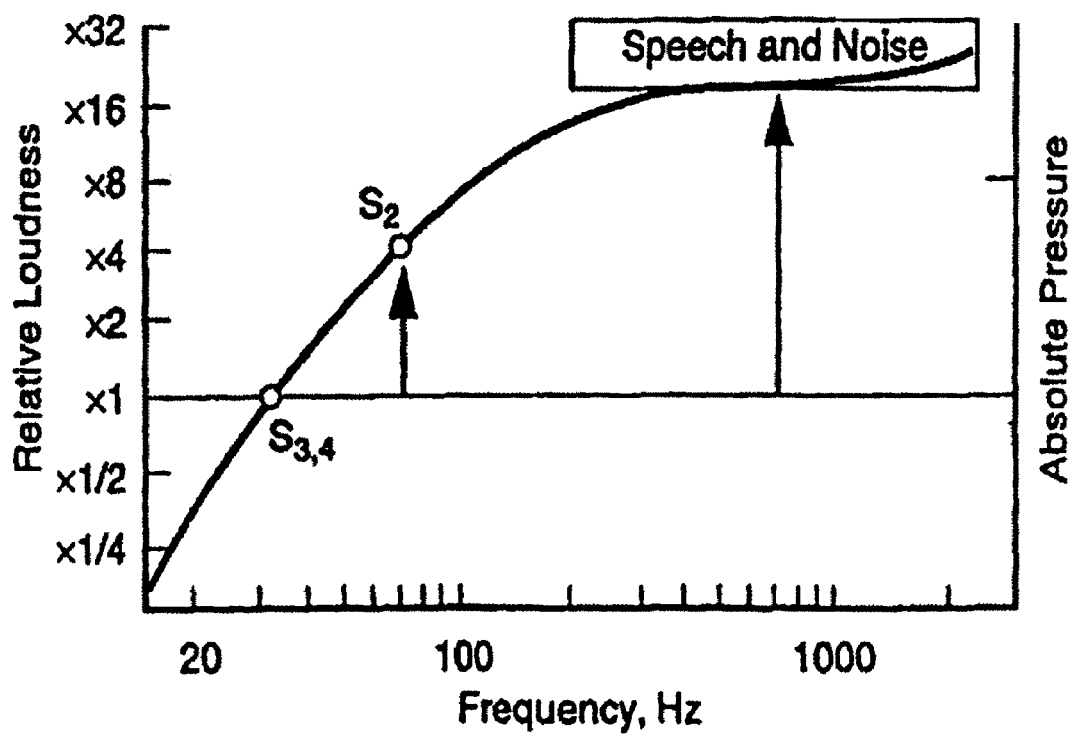
FIG. 10 depicts graphically perceived loudness of heart sounds and quiet speech at same sound level (~50 dB SPL)

Although cardiovascular sounds are relatively loud in absolute terms, they are near the lower frequency of the limits of hearing. Moreover, the apparent loudness of sounds at the same intensity changes rapidly with frequency in this region as shown in FIG. 10.

This has several implications. First it is difficult to hear many of the low frequency cardiovascular sounds, two of which, $S_3$, and $S_4$ are indicated on the frequency scale as shown in FIG. 10. A typical second sound of the heart, $S_2$ at the same intensity as an $S_3$ or $S_4$ will be perceived as almost 4 times louder. Speech, or ordinary office sounds at the same level will be 4 times as loud as the $S_2$ and 16 times as loud as the $S_3$ and completely obscure it.

Stethoscope

A stethoscope for cardiovascular use has several functions including:
  Convenience—Actually, one can hear body sounds quite well by placing one's ear directly on the patient's skin
  Transmission of all relevant cardiovascular sounds to the ears
  Selective transmission of certain ranges of sound by means of bell and diaphragm or multiple diaphragms In addition, the stethoscope should not pick up extraneous sounds through its own structure.

Ideally, one would not purchase a stethoscope until several have been used, but most of you will have already made the purchase. Fortunately, virtually any stethoscope is usable with the normal hearing of youth—if it is properly and persistently used. For reasons that may become apparent, the standard for comparison is a good quality, single-tube unit with a deep bell and a diaphragm of approximately 2 inches in diameter, such as the Littman Cardiology II.

Probably the most important feature of any stethoscope is that the ear pieces are comfortable when sealed in the ear canal, so that listening is not distracted by discomfort.

The stethoscope's bell transmits sounds over the entire range of cardiovascular sound but has some discrimination against higher frequency sounds such as speech and noise. The human body is a good "receiver" of extraneous speech and noise which if present will be mixed with cardiovascular sounds. A conventional stethoscope does not amplify. The bell should initially be used for listening to any new sound. Seal the bell completely to the skin with light pressure; without such a complete seal, many cardiovascular sounds will not be heard. Listen to the sounds of interest with light pressure, and then apply increased pressure, which will typically seem to raise the pitch of sounds, but actually reduces lower frequencies by tightening the skin producing the sound. This is what a diaphragm does, effectively becoming a "stiff" skin surface. By reducing the intensity of lower frequencies, a sound of higher pitch may be heard more clearly. Typically diaphragms slightly decrease transmission of all sound but especially low frequencies. An increasing variety of diaphragms are available, including one expensive unit with only dual diaphragms. These deserve comment, but I am prejudiced and until we complete some objective measurements on them, comments on such units will be withheld. However, if your conventional bell has a removable diaphragm covering it, I would recommend that you listen to some faint low frequency sounds and murmurs with and without it, and then use it accordingly. One must use the bell with light pressure whenever listening to faint sounds and especially to quiet, low frequency sods such as diastolic murmurs in the mitral and tricuspid areas and $S_{3,4}$. Conversely, a diaphragm can often be used to good advantage with heart sounds other than $S_{3,4}$ and with most systolic murmurs of reasonable intensity.

Stethoscopes are prone to develop leaks, which destroy their ability to convey low frequencies, and the traditional way to assess this is by placing the bell firmly on a smooth area of skin, the thenar eminence will serve, and suddenly pulling the bell away. This should produce a "pop" in one's ear. Some authorities feel this could damage hearing. A better, but less elegant, method is to hold the bell against the skin, occlude one earpiece with a finger and suck on the other (after due cleaning of course!). Leaks will be evident and maybe stopped with an application of waterproof grease which should be available from medical supply houses.

Listening to Cardiovascular Sound

Inching

Whereas the exact locations shown for the auscultatory areas, as shown in FIG. 9, are typical, this may not be optimum for a given sound or murmur. A sound may tracked to the optimum location by slowly moving the stethoscope over the skin while listening. This is called "inching" and should routinely be used.

Timing

There are techniques to identify sounds and murmurs that must be used for adequate results in auscultation. None is more crucial than timing. A common mistake is trying to distinguish systole from diastole by sound alone. This greatly complicates the learning process and there are too many cases when it is simply impossible. This problem and its inevitable errors can be avoided by simultaneously palpating a carotid pulse when first listening to any new sound until $S_1$ and $S_2$ are identified. A carotid pulse upstroke immediately follows $S_1$ and downstroke precedes $S_2$ Systole is defined as the period between $S_1$ and $S_2$ and diastole as time between $S_2$ and $S_1$. A second important aspect of timing is focusing on a limited recurrent period of time in each cycle while trying to ignore all other sounds. This is analogous to autocorrelation, a powerful technique used in detection of weak or noisy electrical signals. For example, by such focused listening to the period around $S_1$ or $S_2$ or any other period, sounds not initially heard often become apparent.

Diagrams

A powerful tool in understanding sounds and describing what you hear is the sound diagram, a simple representation that does not require artistic abilities.

Begin by drawing a horizontal line, which represents time, and label it with the area being listened to, thus:

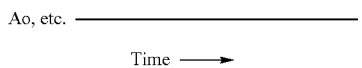

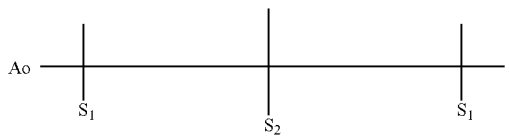

First and second heart sounds are then added as vertical lines proportional to perceived intensity and in time sequence.

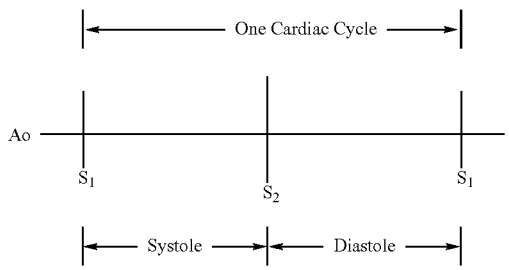

This represents the basic cardiac cycle: and provides a framework for any other sound and for the murmurs, which will be discussed later.

You will learn other techniques, but millions of words cannot be substituted for experience. Now, let us experience the most important sounds you will ever learn—normal heart sounds.

First, carefully study and commit to memory the major events as shown in FIG. 11. Note that $S_1$ and $S_2$ will be heard as varying combinations of $m_1$, $t_1$ and $a_2$, $p_2$ at the different auscultatory areas.

Normal Heart Sounds

Auscultatory examination should be performed in the quietest possible environment, so find such a place with a comfortable seat or place to lie supine, close the door and remove enough clothes so that your auscultatory areas may be reached without interference. To block exterior noise and for patient privacy.

Caution—Do not even think of trying to listen to physiological sound from any surface other than bare skin. This is especially true with blood pressure determination.

Now, sit comfortably and place one hand on a carotid artery and acquire the pulse. Continue to palpate the pulse, place the bell of the stethoscope lightly on the aortic area, and identify $S_1$, which occurs just prior to upstroke of the pulse, and then $S_2$ which occurs after the down stroke. Once $S_1$, $S_2$ have been unequivocally identified, palpation can be stopped but should be repeated when there is the slightest doubt of systole/diastole and $S_1$, $S_2$. Now, "inch" the stethoscope over the area until $S_1$ is best heard and then concentrate on $S_1$ and the period just before and just after it, while ignoring all other sound. In few normals the tricuspid sound, $t_1$, may be heard immediately following the mitral sound, $m_1$; i.e., the normal patient may have a faintly split $S_1$ in this area. Now, listen selectively to the $S_2$ period and then to the $S_2$-$S_1$, or diastolic period, and to the $S_1$-$S_2$, or systolic period. A normal variant, especially in youth, is a soft, early systolic innocent murmur in the aortic or pulmonic areas.

Compare relative amplitudes and pitch of $S_1$, $S_2$. Place increasing pressure on the bell, noting changes in quality or pitch of the sounds you are hearing. Next place the stethoscope diaphragm in the same spot and listen for any differences in quality of the sound from that heard with the bell. At this point diagram what you have heard by placing two vertical lines representing two consecutive $S_1$s on the horizontal line below labeled Ao. Next, place another vertical line on the horizontal representing $S_2$ with estimated relative amplitude and spacing. If the tricuspid component was heard, add an appropriate line to represent it. We will discuss your findings on following pages.

Move to the pulmonic area and repeat the procedure. Listen carefully to the second sound through several respiratory cycles and if it splits, becomes two sounds, note the phase of respiration when splitting occurred, and the relative amplitude of the components of the split. Indicate this on the pulmonary area diagram. Respiratory splitting is frequently not present in normals and is not heard after approximately 60 years of age.

Move to the tricuspid area and repeat the above process, but this time pay special attention to $S_1$. It is not uncommon to hear the tricuspid component in this area where sounds from the tricuspid region are better conducted, i.e., $S_1$ may be closely split. Again, diagram what you hear. Note and diagram the relative amplitudes of $S_1$ and $S_2$.

Go to the mitral area, normally the 5 LICS, MCL where the left ventricular apical impulse should be located, and repeat the auscultatory exam paying careful attention to the early diastolic period where a third sound $S_3$ may occur in normals to 40 years of age. Diagram your findings, noting the relative amplitude of $S_1$ and $S_2$.

Repeat the entire previous sequence while leaning forward, and also exhale while listening carefully for any differences in sounds, which should be noted on the diagrams. Such a change in posture will often make a previously undetectable sound or murmur audible or enhance barely audible sounds. Some of the same effect can be achieved with bedridden patients by placing them in the left lateral decubitus position.

Note: There is great individual variation in normal heart sounds, and these must be learned with experience. Never miss an opportunity to listen to normal sounds.ory splitting is indicated on this diagram.

Figure 12:
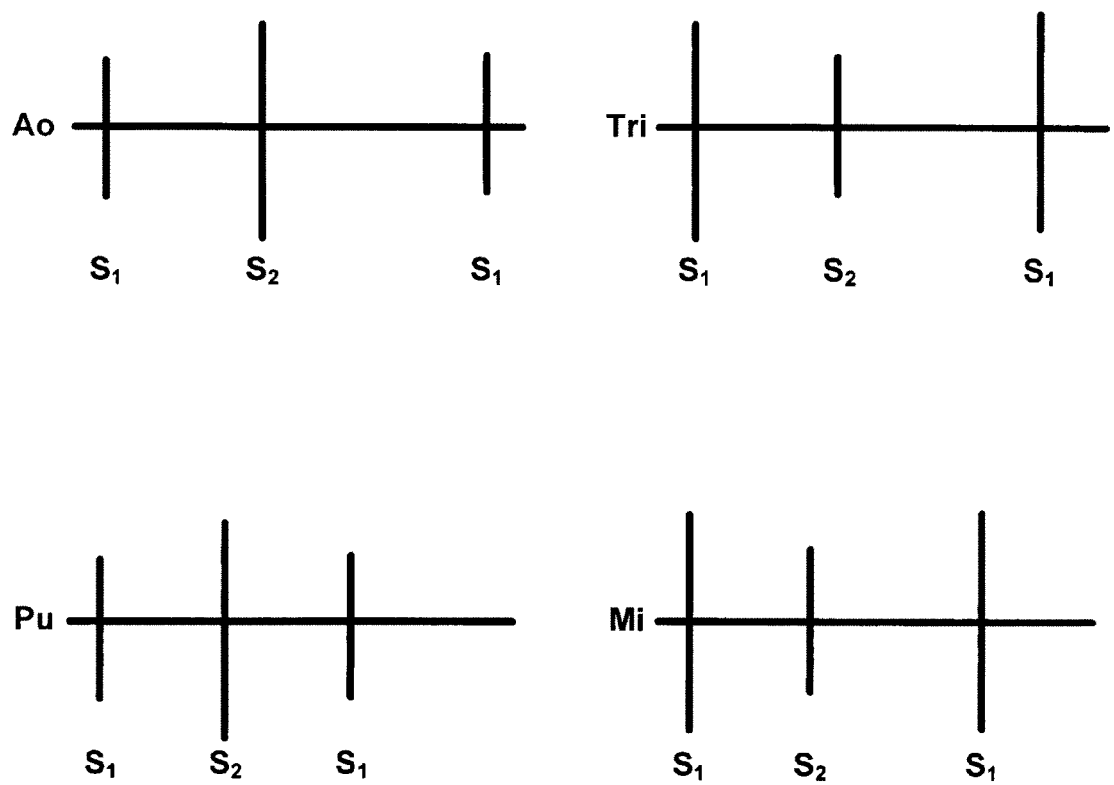
FIG. 12 depicts schematically and graphically normal heart sounds vs. auscultatory areas in a typical case.

Now let us review the expected normal findings and their diagrams and findings with your own diagrams as shown in FIGS. 11 and 12.

Aortic Area

This area is dominated by aortic and mitral valve sounds, and of these two, the aortic sound is loudest and best transmitted to this area. Rates of pressure change in the left ventricle are much larger than in the right and mitral/aortic sounds are louder than tricuspid/pulmonic. Also the rate of ventricular pressure change is greater at the end of systole than at its beginning so aortic is louder than mitral closure. Thus, normally $S_2$ is louder than $S_1$. Also, the pitch of $S_2$ is slightly higher than that of $S_1$. At normal heart rates $S_1$ to $S_2$, or systolic interval, is shorter than $S_2$ to $S_1$, or diastolic interval. These features are noted in the diagram.

Pulmonic Area

At the pulmonic area, amplitudes of $S_2$ remain louder than $S_1$. $S_2$ is often split into its component sounds on inspiration in this area, but such splitting decreases with age. The pulmonic component, p2, is still not as loud as the aortic component, a2, despite preferential transmission of p2 to this area. A patient's abdomen should be observed to insure that splitting of $S_2$ occurs on inspiration, not expiration. Reverse "paradoxical" splitting denotes serious abnormality. Inspiratory splitting is indicated on this diagram.

Tricuspid Area $S_1$ is normally louder than $S_2$ in both the tricuspid and mitral areas as mitral and tricuspid sounds are preferentially transmitted in these areas. In the tricuspid area, the tricuspid sound is not infrequently heard closely following the mitral sound to form a closely split $S_1$, a normal variant.

Usually only two heart sounds can be heard in a normal cardiovascular system. Any time more than two heart sounds are heard, the extra heart sound may indicate the presence of pathology. There are three exceptions to this rule in the normal variants which will be discussed in the next chapter. Abnormal heart sounds and murmurs will be introduced later in your courses.

Mitral Area

Mitral sounds are well transmitted to the mitral area making $S_1$ louder than $S_2$.

Normally, $S_1$ and $S_2$ are the only sounds heard and they are not usually split by sounds from the right heart. As noted, normal $S_3$s may be heard in this area following $S_2$, as indicated on this diagram.

Significance of Normal Heart Sounds

These auditory events are produced by the effects of normal closure of the four valves of the heart to stop the beginning reverse flow of blood, as pressures rise and fall with ventricular contraction and relaxation. Coaptation of valve leaflets is not heart in normal valves, rather the stoppage of moving blood displaces the suddenly closed valves and elastic supporting structure which then recoil in a brief oscillation. This produces the vibrations in surrounding tissue which are preferentially carried to the auscultatory areas where they may be heard as heart sounds.

As might be expected from the great anatomical and physiological variations in normal people, there is great normal variation in heart sounds, which can overlap the range of abnormal heart sounds. This variation results primarily in different relative amplitude, pitches and character of sounds, and the typical relative amplitude of the heart sounds you hear may be reversed in some normals as well as in abnormals.

Heart Sounds, Variant and Abnormal

Normal and Abnormal Heart Sounds

You are now acquainted with the most important heart sounds of all, normal heart sounds, which are produced by sequential closure of the four cardiac valves to prevent reverse flow of blood, once every cardiac cycle. When any valve is snapped shut by a beginning reverse flow, sudden obstruction of the moving blood displaces the closed valve and supporting tissue, which then recoils in a brief oscillation, that we hear as a heart sound There is a common misconception that coaptation, contact of the valve edges, produces these sounds, but this is not true unless the valve leaflets are classified.

Note: you must know the cardiac cycle with its sequence of pressures and valve openings and closing as shown in FIG. 13 to understand either heart sounds or murmurs.

Typically, one hears only tow normal heart sounds, $S_1$, which consists of sounds from closure of the mitral and tricuspid valves, and $S_2$ which is composed of aortic and pulmonic valve closure as shown in FIG. 13.1. Any time that more than two sounds are heard, there is a strong possibility that an abnormality is present, so any extra sound must be detected and identified.

You have seen that a normal $S_2$ may sometimes be "split" into aortic and pulmonic components by respiration. Such splitting occurs in a sizeable fraction of youth but disappears by age 60. Also, you have seen that $S_1$ may closely split in a few normals. Any other splitting of $S_1$ and $S_2$ is abnormal, and may be caused by a variety of functional and pathological conditions. Other indications of abnormal heart functions are changes in quality of intensity of $S_1$ and $S_2$, but discussion on this well be deferred.

A second source of heart sounds is also a valvular in origin—Abnormal Valve Opening sounds as shown in FIG. 13.2. Normal valves always open silently, but if a valve is flexible but stenotic; i.e., its opening is restricted, it may begin to open normally and silently, but the restriction brings it to a sudden stop before full opening, more or less obstructing the normal blood stream. This produces a displacement and oscillation of valve, supporting tissue and blood. The resulting sound is not that dissimilar from normal valve closing sounds. If this abnormal opening sound is from an aortic or pulmonic valve it is called an ejection sound. An ejection sound from an entirely different source occurs when blood is rapidly ejected into a dilated aorta or pulmonary artery. It also closely follows $S_1$. However, if it is from opening of an abnormal mitral or tricuspid valve it is an opening snap.

A final abnormal valve opening sound is the systolic click which occurs in mitral valve prolapse, or rarely in tricuspid prolapse. The mitral valve is large and complex with edges of interdigitating scallops which are held against the high ventricular pressures in systole by chordae tendinae and contracted papillary muscles. If either associated tendinae or muscle fails, one or more scallops may pop open but be suddenly stopped by the rest of the valve still in place. This partial opening tugbhs and displaces the entire valve which recoils and socillates briefly producing a systolic heart sound, often near mid systole, hence mid systolic click.

While it is often difficult, by sound alone, to distinguish between splits, ejection sounds, opening snaps, and systolic clicks, there is another clasz of heart sounds from a different source that can and must be distinguished by their sound: the third and fourth heart sounds, $S_3$ and $S_4$ as shown in FIG. 13.3. $S_3$ or $S_4$ can occur wherever the rate of ventricular filling exceeds the capacity of the ventricle to expand and accommodate the blood. $S_3$s may occur during early diastole with rapid passive filling and $S_4$s may be produced during the peack of atrial filling lat in diastole. When filling exceeds ventricular accommodation, blood momentum shoves the ventricle longitudinally. This is followed by a brief low frequency oscillation of the entire ventricle which is often difficult to hear because of its low frequency. Abnormal filling of either right or left ventricle may produce $S_3$ or $S_4$.

Detection and Identification of Heart Sounds

Detection and identification begins with $S_1$ and $S_2$. Once this is tentatively established a systematic search for more than the usual tow sounds begins, bu a psychoacousitcs phenomenon often makes hearing additional sounds difficult. When a sound is heard, any similar sound; i.e., those near it in frequency and time, are suppressed, hence one must listen carefully before and after any obvious sound or murmur to ensure that another sound or murmur is not missed. A mechanism to overcome this suppression is to force oneself to listen to a particular period of time for several cycles. By listening to region in time for several cycles, an auto correlation process apparently occurs om which the sound is summated. This often causes previously unheard sounds to become obvious. Such concentrated listening should be focused on the regions around $S_1$ and $S_2$ and finally in systole for any extra sounds. Also if you "think" you hear such a sound, "inching" of the stethoscope should be done to attempt to increase the intensity.

When extra sounds are detected they must be identified. While exact identification from sound alone, especially from a single area is often impossible, the following procedures will often allow an identification or at least classification to be done.

Identification of $S_3$, $S_4$

As a practical matter, if an "extra" sound is heard one should first try to immediately determine if it is an $S_3$ or $S_4$ using the following criteria:

I. Is it diastolic, an $S_3$ following $S_2$, or an $S_4$ occurring prior to $S_1$?

II. Is it low in frequency with a dull thudding or thumping sound?

III. Is it fixed and relatively widely separated from its $S_1$ or $S_2$?

IV. Does the wide splitting develop a gallop rhythm?

If the extra sound(s) have the above characteristics it almost surely an $S_3$ or $S_4$. In a few cases both $S_3$ and $S_4$ are present, and in such cases if a trachydardia develops the $S_3$ and $S_4$ may merge to become a single loud summation sound.

Looking at FIG. 13.1 and relating $S_3$ and $S_4$ to the atrial filling pressures and opening of mitral and tricuspid valves, it is obvious that an $S_3$ must occur well after $S_2$, and $S_4$ well before $S_1$. Since the entire ventricle, right or left, oscillates to produce $S_3$ and $S_4$, frequency is much lower than that of the valvular sounds. The human ear and mind tend to identify regular sequences, and spacing of $S_1$-$S_2$·$S_3$ or $S_4$·$S_1$-$S_2$ caused this sequence of sounds to be known as gallops. Horse and buggy doctors named these gallops after their horse gaits as shown in FIG. 14. $S_4$s are still frequently referred to as atrial gallops.

The bell of the stethoscope, lightly applied but completely seated to the skin, should always be used in listening for $S_3$ and $S_4$. By pressing on the bell, or listening with the diaphragm vs. the bell, any $S_3$ or $S_4$, may be obliterated or greatly reduced in intensity. Right ventricular $S_{3,4}$ are typically best heard in the tricuspid area and left ventricular $S_{3,4}$ are best heard in the mitral area but may occasionally be heard in the pulmonic. Once positively identified, an $S_3$ or an $S_4$ should be indicated on our diagram by a "squiggle" as shown in FIG. 15. This is used to convey the fact that $S_{3,4}$ have a low frequency and unique origin.

Split $S_1$ and Ejection Sound

If the extra sound is not an $S_{3,4}$, then it is either a split $S_{1,2}$ or an abnormal valve opening sound. If an extra sound is heard in the region of $S_1$, remember that $S_1$ may be closely split in some normals, but if it is appreciably split it is probably abnormal. Another event which may be heard near $S_1$ and confused with a split is the abnormal opening of aortic or pulmonic valves, an ejection sound (ES). See FIG. 13.2. Thus, if an extra sound is heard in the region of $S_1$ and it is not an $S_4$, indicate it as a split $S_1$ or ejection sound. Later you will be taught additional means of identification.

Split $S_2$ and Opening Snap

Ventricular ejection and aortic/pulmonic valve closure may be delayed by a number of electrical or hemodynamic factors producing a variety of split second sounds. Table 3. In addition, opening of mitral and tricuspid valves closely follows $S_2$, as shown in FIG. 13.1, and if either of these are stenotic, an opening snap (OS) may be produced. Thus, if an extra sound is heard in the region of $S_2$ and its is not an $S_3$, indicate it on the diagram as a vertical line as shown in FIG. 16 and identify it as a split $S_2$ or opening snap.

Caution: Students frequently confuse the terms ejection sounds and opening snap and while a common phenomenon produces both, they signify very different clinical situations or conditions.

Systolic Clicks and MVP

The last of the heart sounds, systolic clicks (SC) can cause almost as much trouble in identification as $S_{3,4}$ sounds. These sounds occur when one or more mitral valve scallops fail under systolic pressure, often well into systole, but they can occur anywhere in systole, and they may be single, double or even triple. In spite of being called clicks, they often sound like a repeated closing of mitral or tricuspid valves, like a repeated $S_1$. They are best heard in the mitral area but may be heard elsewhere. When such clicks are heard, indicate them on the diagram as shown in FIG. 17.

Significance of Heart Sounds

The whole purpose of auscultation is detection of abnormal sounds and understanding of their pathophysiology. Each heart sound carries individual significance in its loudness, pitch, and quality, but we are going to defer that aspect and first concentrate on the timing, i.e., the relation of the sounds to each other.

Split $S_1$

Normal splitting of $S_1$ is produced by the lower rate of right ventricular pressure rise, and the split is small. Abnormal splitting of $S_1$ is caused by delay in ventricular pressure rise, and the most common cause is an electrical delay, either a right bundle branch block (RBBB) which produces a fixed split or a premature ventricle contraction (PVC) whose initiating focus is well away from the right ventricle. The latter split depends on the presence of the PVC and is usually intermittent. There are other rare causes of $S_1$ splitting such as a congenital Ebstein's defect.

Split $S_2$ $S_2$s may be split by anything which delays start of contraction of either ventricle or delays ejection of blood from it, and a list of the most common abnormal causes are given in Table 3 Normal intrathoracic pressure variation may producee a physiologic split in inspiration as shown in FIG. 16, and some pathologic conditions may cause abnormal or reversed splitting, i.e., splitting on expiration. This is why the phase of respiratory splitting should be recorded. Any other condition which increases blood volume in one ventricle, such as atrial septal defects or a regurgitant valve, can cause prolonged ejection, delayed valve closure and splitting. In the same way a restriction such as a stenotic valve may prolong ejection of a normal ventricular volume and produce a split $S_2$.

ventricle is excessive, such as in congestive failure, then compliance is reduced and filling is resisted as shown in FIG. 18D. This most often produces $S_3$, but an $S_4$ from atrial filling may also be present. The ventricle itself may become stiff, i.e., compliance reduced, in hypertrophy or with reduced myocardial occlusion, and resistant to normal filling. This is usually produces an $S_4$, but depending on degree of stiffness and other factors an $S_3$ may be present.

Valve Openings

Ejection sounds and opening snaps denote stenosis of a still flexible valve and depending on the degree of stenosis cause more or less, but very different symptoms, as in aortic vs.

TABLE 3

| Split Second Heart Sounds | |
| --- | --- |
| Electrical Second Heart Sounds | Characteristic |
| Complete RBBB | May be split in expiration and split further in inspiration |
| PVCs of left ventricular origin | May be split in expiration and split further in inspiration |
| Pacing using LV epicardium | May be split in expiration and split further in inspiration |
| LBBB - Left bundle branch block | May be split in expiration and split may decrease with inspiration, i.e., a paradoxical split |
| Mechanical (Hemodynamic) Origin of Split | Characteristic |
| Moderate to severe pulmonary stenosis | May be split in expiration with increase on inspiration |
| Atrial septal defect | Fixed split (persists through expiration) |
| Pulmonic Hypertension | Narrow expiratory split unless right heart failure occurs and split widens |
| Pulmonic regurgitation | May have expiratory split |
| Right ventricular failure | Fixed split without respiratory change |
| Acute and chronic pulmonary embolization | Fixed split without respiratory change |

$S_3$ and $S_4$

As noted, the basic cause of all $S_{3,4}$s from either ventricle is a discrepancy between rate of blood flow into a ventricle and ability of the ventricle to expand rapidly enough to accommodate the inflow without significant increase in back pressure as shown in FIG. 18A. Such increases in back pressure cause the entire ventricle to be displaced by increased force of the entering blood, and to recoil with a brief oscillation which may be heard as an $S_3$ or $S_4$. Either excess flow into the ventricle, or inability of the ventricle to expand, i.e., reduced compliance, can produce a palpable $S_3$ or $S_4$ by displacement of the ventricle, or an audible $S_3$ or $S_4$ from the resulting oscillation. A palpable $S_{3,4}$ may or may not be audible and vice versa. Compliance is given by the formula:

$$\text{compliance} = \frac{\Delta V}{\Delta P}$$

where $\Delta V$ is the change in volume and $\Delta P$ is the change in pressure. The three conditions that can cause this are shown in FIG. 18.

Many children and some adults, to age 40, have normal hearts but hyperdynamic filling of the heart with an innocent $S_3$ as shown in FIG. 18B. Any condition which increases blood flow such as the third trimester in pregnancy, thyrotoxicosis, etc., can produce similar physiologic $S_3$s which disappear when flow return to normal. If blood volume in the mitral stenosis. In addition they often produce other sounds such as typical murmurs, or may prolong ejection and produce a split $S_2$.

Systolic clicks indicate MVP and always have some degree of regurgitant flow so a systolic murmur may or may not be present, and depending on amount of regurgitation, the resulting symptoms and effects may range from none to deadly.

Abnormal heart sounds are frequently associated with murmurs which often arise from problems in areas other than the one being listened to. Ejection sounds, opening snaps or systolic clicks in an are area frequently followed by murmurs in the same area since ejection sounds and opening snaps are produced by stenotic valves which also may increase blood velocity, and systolic clicks are produced by abnormal partial opening of a valve which allows reversed jet flow. Both of these flow phenomena produce murmurs, as we shall see in the next chapter on murmurs.

SUMMARY

In summary, the detection and identification of heart sounds begins with listening with the bell while palpating the carotid pulse to identify $S_1$, $S_2$ and establish systole and diastole. The diagram may be used to discriminate higher pitched sounds such as splits, clicks, etc., but the staring point is the bell. If an abnormal or extra sound is heard, determine if it is an $S_3$ and $S_4$. If it is not an $S_{3,4}$ and the sound is in the immediate region of an $S_1$, it is a split $S_1$ or ejection sound; if in the region of $S_2$, it is either a split $S_2$ or opening snap.

Finally, if there is an extra sound in systole well separated from $S_1$ and $S_2$, it is a systolic click. Add these to your diagram and proceed to detection and identification of murmur.

Murmurs

Origins

While both heart sounds and murmurs are produced by disturbances in blood flow, the nature of the disturbance and resulting sounds are very different, although the pathology involved is often the same or related. For example a stenotic mitral valve may cause an opening snap, a heart sound, and also the long rumbling murmur of mitral stenosis. Heart sounds are brief events caused by sudden transient deceleration, sudden slowing or stoppage of blood, while murmurs are caused by an almost opposite phenomenon, blood which has been accelerated to a velocity which produces turbulent flow. A minimum understanding of some features of turbulence is essential to interpretation and clinical relevance of the murmurs you hear.

Like the heart sounds, precordial murmurs are associated with the valve regions and auscultatory areas, but murmurs may also occur over much of the body, where they are often referred to as bruits or some other term. Bruit is a French word for murmur. Cause and significance of peripheral murmurs are the same as precordial murmurs.

Turbulent flow is a chaotic mixture of linear blood flow and a complex series of diminishing eddies, and occurs whenever the velocity of blood flow reaches a critical value for a given situation. Vessel (or valve) area and blood viscosity are major factors which determine the velocity at which turbulence/murmurs begin. The larger the vessel the lower the critical velocity for turbulence. Normal peak blood velocity in the proximal aorta and pulmonary artery are near turbulent levels, and indeed many children and young adults have "innocent" aortic or pulmonic murmurs at the peak of ejection. A number of other normal individuals have life long innocent aortic or pulmonic ejection murmurs from slightly undersize aortas or pulmonary arteries or valves. Blood viscosity is sensitive to hematocrit, and patients with significant anemia frequently have a variety of murmurs which disappear when the anemia is corrected.

As noted, turbulent flow contains a series of whirlpools or eddies of diminishing size. When such eddies strike the vessel walls, a spectrum of vibrations are induced and preferentially transmitted to the body's surface where they are heard as murmurs for as long as the turbulent flow continues.

In general these preferential pathways to the body's surface are the same as for the vibrations of heart sounds, and the various auscultatory areas are valuable indicators of the source of the murmurs. For example, a murmur best heard in the aortic area will most likely be associated with the aortic valve or outflow tract, but like heart sounds, this murmur may be heard elsewhere as well. In some cases the murmur may be heard very well or even best in areas outside the precordium. A mitral regurgitation may also be heard in the left axilla, but such examples are exceptions.

Pitch and quality of the murmur are primarily determined by the tissue through which the vibrations pass. Any murmur transmitted through the walls of a relaxed ventricle will be stripped of its higher frequencies such that only low frequencies are heard, as for example in the grumble of a mitral stenosis or rumble of a filling flow murmur. In contrast the aorta transmits both low and high frequencies to the aortic area. This can be a significant aid in identification and diagnosis.

Intensity or loudness of a murmur is proportional to the instantaneous velocity of blood, thus the shape of the murmur reflects the blood velocity profile. Knowledge of the shape of a murmur, plus knowing that in normal hearts ⅔ of the blood is ejected in the first ⅓ of systole, and that ⅔ of the filling of the ventricles occurs in the first ⅓ of diastole, allow diagnosis of more than 90% of all murmurs. This is all murmurs in a general population.

Figure 20:
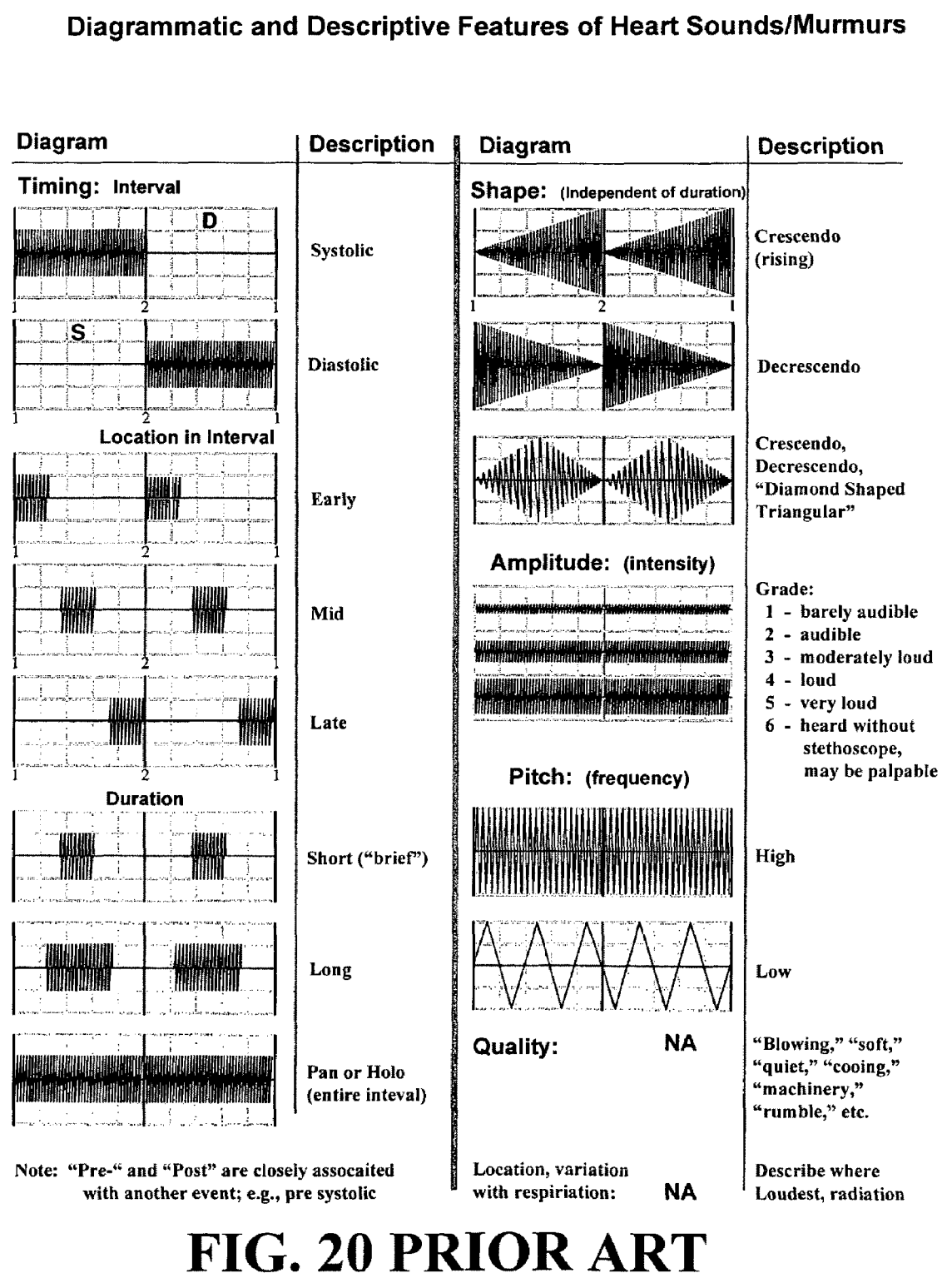

Other facts about murmurs that are of clinical importance include:
    90% of all murmurs are not associated with cardiovascular pathology
    Any diastolic murmur must be considered pathologic
    Loud murmurs are more likely to be associated with pathology. Any murmur louder than grade II/IV must be suspected and any murmur louder than II/VI is pathological. This grading system for loudness is shown in FIG. 20, but since perceived loudness is a psychoacoustic phenomena there will be large intraobserver variation.

Classification

There are many and varied classifications of murmurs all based on sound characteristics, for example in Bates, Table 9-9 through 9-12, incorporated herein by reference. Murmurs which can be simulated by the apparatus of the present invention include, without limitation, Accessory murmur; Accidental murmur; Adventitious murmur; Anemic murmur; Anorganic murmur; Apical innocent murmur; Atonic murmur; Basal ejection murmur; Basal ejection vibrations; Basilar innocent murmur; Benign murmur; Benign murmur of no consequence; Benign "physiologic" bruit; Benign prrecordial, systolic murmur of unknown origin; Benign systolic ejection murmur; Benign systolic murmur; Completely benign murmur; Dynamic murmur; Ejection systolic murmur of innocent nature; Ejection vibratory sound; Entirely insignificant murmur; Fiddle-stringgg murmur; Flow murmur; Functional benign murmur; Functional murmur; Functional (innocent) murmur; Functional (physiologic murmur); Functional systolic ejection murmur; Functional systolic murmur; Functional vibratory murmur; Groaning murmur; Harmless murmur; Hemic murmur; Hemodynamically insignificant systolic murmur; Incidental murmur; Innocent adventitious cardiac sound; Innocent apical systolic murmur; Innocent early systolic ejection murmur; Innocent ejection murmur; Innocent functional ejection systolic murmur; Innocent functional murmur; Innocent (functional) murmur; Innocent left parasternal murmur; Innocent mitral murmur; Innocent parasternal precordial murmur; Innocent parasternal systolic murmur; Innocent physiologic murmur; Innocent precordial murmur, coarse variety, fine variety Innocent pulmonic systolic murmur; Innocent pulmonic ejection murmur; Innocent pulmonic murmur; Innocent systolic murmur; Innocent systolic murmur over the pulmonary area; Innocent systolic parasternal-precordial murmur; olic parasternal-precordial murmur; -precordial murmur; Nonorganic murmur; Nonpathologic vibratory murmur; Nonpathologic murmur; Nonsignificant murmur; Normal ejection vibrations; Normal heart murmur; Normal pulmonary artery murmur; Normal systolic murmur; Normal vascular hemodynamic noises; Normally occurring murmur; Innocent vibratory ejection murmur Innocent vibratory murmur; Innocuous murmur; Inorganic murmur; Insignificant murmur; Isolated minor cardiac murmur; Left sternal border vibratory murmur; Murmur of uncertain origin; Murmur of unknown origin; Musical apical systolic murmur; Musical murmur; Musical normal systolic murmur; Musical precordial systolic murmur; Myotonic murmur; Nonblowing (innocent) murmur; Nonblowing precordial and apical systolic murmur; Nondisease murmur of normal children; Nonmusical apical systolic murmur; Nonblowing precordial and apical systolic murmur; Nondisease murmur of normal children; Nonmusical apical systolic murmur; Not significant murmur; Occasional murmur; Parasternal-precordial murmur; Physiologic murmur; Physiologic systolic murmur; Physiologic ejection murmur; Precordial systolic murmur; Precordial vibratory murmur; Pulmonary blowing ejection murmur; Pulmonary ejection systolic murmur; Pulmonary innocent murmur; Pulmonic ejection murmur; Pulmonic systolic murmur; Pulmonic systolic murmur of functional nature; "S" murmur; Simple murmur; Sinus-shaped murmur; So-called functional murmur; Still's murmur; Systolic murmur of no signal nature; "S" murmur; Simple murmur; Sinus-shaped murmur; So-called functional murmur; Still's murmur; Systolic murmur of no significance; Systolic vibratory murmur; Temporary murmur; Tinny murmur; Transient systolic murmur; Truly innocent systolic murmur; Twanging murmur; Twanging string murmur; "Twangy" murmur; Uncomplicated innocent systolic murmur; Unexplained murmur; Unimportant murmur; Universal systolic murmur; Unknown murmur; Vibratory murmur; Vibratory nonblowing murmur; Vibratory parasternal-precordial murmur; "Vibratory" systolic murmur; or the like.

A simpler classification based on pathophysiology is used here as shown in FIG. 19. Further simplification is made by combining murmurs from the right and left heart. While there are subtle differences between murmurs of right and left heart, the basic characteristics for a murmur of a given cause are similar. There are three basic causes of abnormally increased blood velocity, each of which produces a characteristic murmur profile:

1) excess blood flow
2) obstruction to blood flow
3) reverse blood flow.

Such a classification results in the 6 basic murmurs shown in as shown in FIG. 19. For completeness, a table of traditional descriptive terms is shown in FIG. 20.

Detection and Identification

The first step in detection of murmurs is detection/identification of heart sounds, for this is the essential point of departure for any study of murmurs. Systole and diastole must be absolutely identified by carotid palpation. Procedures used in listening for extra heart sounds are equally important here. Listen at specific periods over several cycles including the regions around $S_1$ and $S_2$ and especially after any extra sounds, and then in systole and diastole. If you "think" you may hear something, inch the stethoscope to try to make it audible. Start listening with the bell, and then use the diaphragm for it will sometimes reduce low pitch interference and allow high pitched murmurs to be better heard. Be sure whether the murmur is systolic or diastolic.

While detection of a murmur is arguably the most important step in auscultation, to complete the diagnostic task (and add 50% to your grade), it must be identified. Understanding of the basic systolic events shown in FIG. 19 is essential to identification and understanding of systolic murmurs. In systole the mitral/tricuspid valves are closed and normally flow is only through the aortic/pulmonic valves.

Flow Murmurs—Ejection Murmurs

We will begin with identification of the most common murmur, ejection murmurs, as shown in FIG. 19.1.A. After determination of whether the murmur is systolic or diastolic, the next step in identification is to note:

When does it start?
When does it stop?
When is it loudest?

Profile

Recognition of all of these characteristics require practice, especially determining the loudest point. When these 3 points have been determined, place three dots corresponding to their location on the diagram as in FIG. 21.A and then connect them by lines, FIG. 21.B. Now look at the resulting shape, which is a small triangle ending before the last ⅓ of systole.

Innocent Murmur

We now know something very important about this murmur. It is present only early in systole hence blood is flowing most rapidly early in systole—when blood flows most rapidly in a normal heart. This may be a heart whose aortic or pulmonic flow tract is slightly smaller in diameter than usual, or this may be an innocent ejection murmur. Alternatively, this may be a normal young person with a hyperdynamic circulation who moves blood more rapidly than most. In this case it is also an innocent ejection murmur.

Physiological Murmur

Any condition which increases cardiac output can also increase peak flow velocity of the level of turbulence, as shown in FIG. 21, so a wide range of conditions such as fever, pregnancy in the third trimester, thyrotoxicosis, etc. may produce a murmur which will disappear when cardiac output is returned to normal, the physiological ejection murmur.

If there is a lesion in the heart which increases diastolic ventricular volume, such as a regurgitant aortic or pulmonic valve of a proximal shunt, the increased ejection flow and velocity may produce a secondary ejection murmur.

While this is a rather daunting list of causes, all ejection murmurs share several characteristics which include:

1) They are early in systole.
2) They end by the final ⅓ of systole leaving an appreciable gap between the end of the murmur and $S_2$.
3) They are relatively quiet, never more than grade II/VI and usually grade II/VI, except in children.
4) They are diamond shaped, and if these crescendo-decrescendo events occur with normal heart, valves and vessels they are innocent murmurs, the most common of all murmurs.

Filling Murmurs

There is an analogous diastolic murmur, the filling murmur. Look at the diagram of the heart in diastole as shown in FIG. 19 and the filling murmur as shown in FIG. 19.B. In a heart in diastole there is an early rapid flow of atrial blood into the ventricles through the mitral and tricuspid valves. Although pressures and velocities are relatively low, these valves have large areas and turbulence may develop during the most rapid phase of filling.

Filling murmurs are best heard in the mitral or tricuspid area with light pressure on the bell of your stethoscope, for they arise from a heart ventricle in diastole and are low-pitched rumbles.

In every murmur always establish the profile on your diagram by noting when it:

starts
stops
is loudest

In the case of a diastolic filling murmur the profile is again triangular and peaks early to mid-systole—when normal flow is a maximum, as shown in FIG. 22. Like the innocent murmur, filling murmurs also stop before the end of the interval, in this case before $S_2$. Both innocent and filling murmurs are frequently called flow murmurs, and while the diastolic filling murmur may be "innocent" itself, it indicates pathophysiology somewhere in the cardiovascular system. Also, such murmurs are not physiologic and do not occur with reversible increases in cardiac output such as fever, pregnancy or thyrotoxicosis. They typically occur when regurgitation of the mitral/tricuspid valves or shunts are present.

Murmurs From Obstructed Flow

When aortic or mitral valves become stenotic, when their area is reduced such that-blood velocities must become very large, as shown in FIG. 23, the classic loud and prominent cardiac murmurs are produced. Vibrations from an aortic stenosis are sometimes intense enough to be felt as a thrill on the right upper chest.

Conversely, as you will find as you progress, when stenotic murmurs are first detected in a patient they are usually virtually indistinguishable from an innocent murmur, but they typically progress with increasing stenosis to the full blown examples you will see and hear here. In the elderly, aortic valve leaflets may become thickened or sclerotic, and the murmur is called a sclerotic ejection murmur. Such murmurs seldom cause functional problems unless the stenosis increases and the murmur changes. In peripheral vessels the murmur (bruit) from an obstruction may be quiet but very significant.

Aortic and Pulmonic Stenosis

Both the profile and clinical manifestation of valvular murmurs with obstruction flow are very different from the ejection and filling murmur. Let's begin this class of murmurs with a classic aortic stenosis as shown FIG. 19.C. The murmur begins early in systole close to $S_1$ and ends late. This prolongation into the last third of systole is a major way of distinguishing stenotic from ejection murmurs. Also this murmur frequently reaches a maximum intensity late in systole and is also usually much louder than the relatively quiet innocent murmur. Stenotic pulmonary murmurs have similar characteristics. Increased pressure load produces a hypertrophied heart which produces its peak flow rate late in systole.

Mitral and Tricuspid Stenosis

Stenoses of a mitral, or much less commonly a tricuspid valve, generates an entirely different profile from two sources of accelerated flow, an initial reduced passive flow and a larger active flow from a hypertrophied atrium, FIG. 19.D. The result is a biphasic murmur which begins early in systole, often following an opening snap and continuing to a broad plateau of low peak, often followed by a shallow valley, which then rises steeply to a peak and often sounds like an extremely loud $S_1$. This is commonly called presystolic accentuation. A second distinctive difference is the pitch and quality of sound from this murmur, which is a low-pitched coarse rumble or grumble. Such low frequencies are indicated in the diagram by the broad bands. Your bell should be used to listen to the murmur itself, but this is a situation where the diaphragm can often be used to advantage to decrease the loud rumble and make the heart sounds, which often include an opening snap, more audible. This profile is the reverse of a normal filling flow pattern in which ⅔ of ventricular filling occurs in the first third of diastole while late diastolic atrial filling accounts for only 18% of the volume.

Peripheral Murmurs

Anywhere in the body where blood flows fast enough to reach the level of turbulence, one may hear what is often called a "bruit." The third trimester of pregnancy is the most common physiological cause of such sounds. Perfectly normal arteries now have to carry greatly increased blood flow to areas of increase demand, especially the uterus and breast. Such murmurs are typically systolic, quiet and crescendo/decrescendo as shown in FIG. 24.

A common source of pathologic peripheral murmurs is the obstruction caused by atherosclerotic plaques. Such murmurs, also usually called bruits, may be heard over any of the larger arteries but are of particular clinical importance when heard over carotid or renal vessels. They must be evaluated by echocardiography for many are benign, but unlike innocent versus stenotic aortic/pulmonic murmurs, there are no good auscultatory indications of harmless versus pathologic bruits. While innocent bruits are more likely to be early, short and quiet, as shown in FIG. 24.A, pathological murmurs are apt to be longer, sometimes louder and sometimes extending into diastole as shown in FIG. 24.B. there is extensive overlap. Heart sounds are usually heard with these murmurs in the carotids, but may not be present in abdominal areas, as shown in FIG. 24.C.

Reverse Flow Murmurs

Reverse Flow Murmurs occur when closed valves allow flow, are regurgitant, or when there are shunts from areas of high to lower pressure, left to right. Such flow is usually in the form of a high velocity turbulent jet produced by high differential pressure. They begin as soon as a pressure difference is established, early in systole or diastole and continue as long as the pressure difference exists.

Mitral, Tricuspid Regurgitant and VSD

FIG. 19 shows the possible reverse pathways in systole; through regurgitant mitral or tricuspid valves or in the left ventricle through a ventricular septal defect (VSD). The sound profile of all these murmurs is similar and characteristic, as shown in FIG. 19.E. They start early in systole and continue with little change throughout (pansystolic), producing the characteristic rectangular profile. Since the ventricles are, must be, under pressure these murmurs have high frequency components and are often loud.

Aortic and Pulmonic Regurgitation

Now look at reversed flow possible in diastole, as shown in FIG. 19, through regurgitant aortic or pulmonic valves. Although the flow is into relaxed ventricles, the sound is best heard in the aortic and pulmonary areas where high frequencies in murmurs are preserved. Again flow and murmurs start early, but now both incoming and reverse flow are rapidly filling the ventricle, raising pressures and reducing flow rate such that the murmur decreases in intensity and often stops before end of diastole and $S_1$, as in FIG. 19.F. This gives regurgitant aortic pulmonic murmurs their characteristic decrescendo and resulting triangular profile.

Two other reversed flow murmurs may be encountered with shunts: a patent ductus arteriosus (PDA) and arteriovenous (A-V) fistulas. Flow in the PDA is continuous from aorta to pulmonary artery but cyclically varies with pressure change producing what is commonly called a machinery like sound. Murmurs are occasionally heard over a connection between artery and vein and again are likely to be continuous.

CAUTION—This is an introduction to the basic heart sounds and murmurs, but do not be surprised when you encounter both variations and combinations of these in real life—but by proceeding as taught here you can detect and identify cardiovascular sounds.

WARNING—Do not think you will be able to do this without additional, continued practice.

Figure 25:
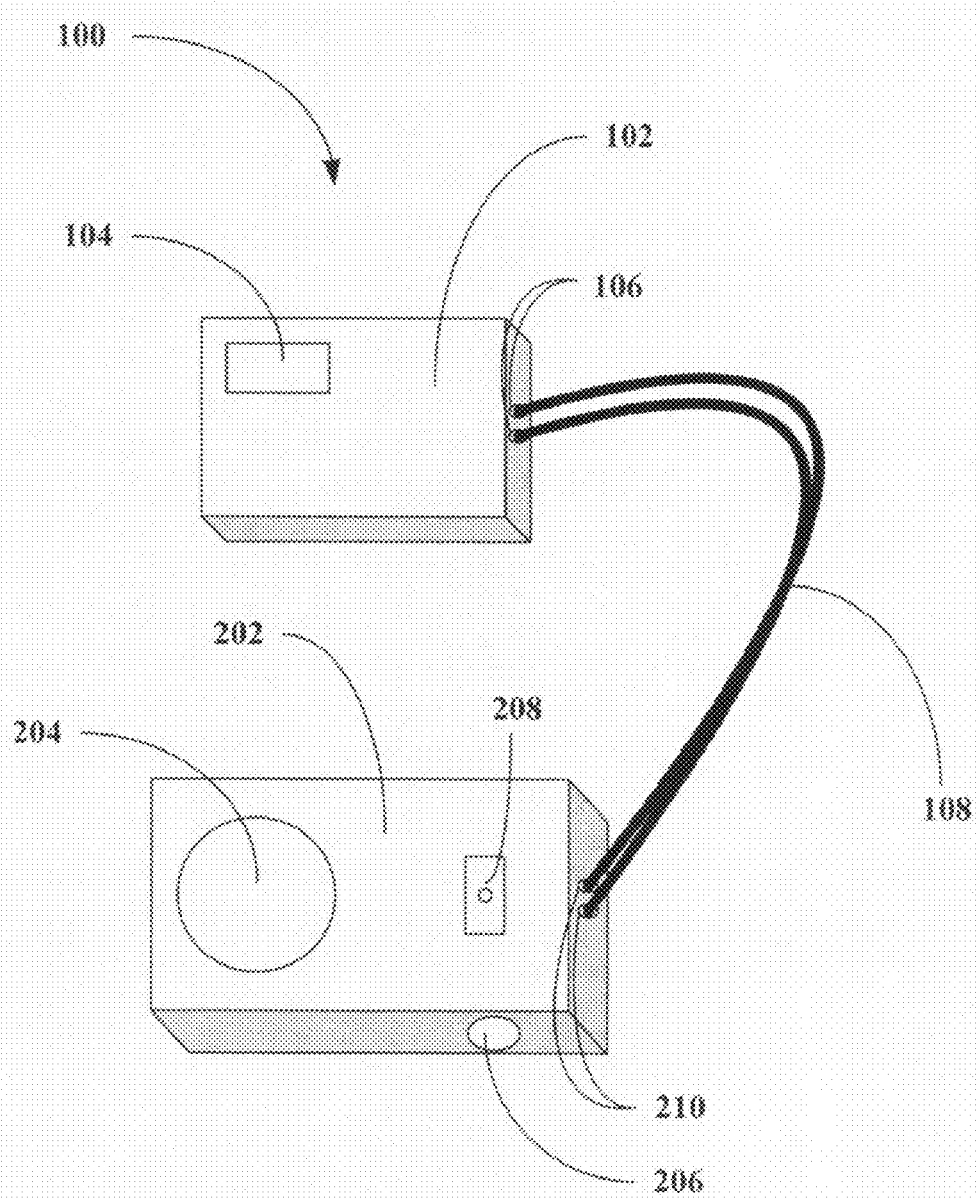
FIG. 25 illustrates a preferred embodiment of the apparatus of the present invention.

Referring now to FIG. 25, a one preferred first embodiment of an apparatus, generally 100, of the present invention is shown to include a recording/playback unit 102 having controls 104, output jacks 106 and electrical cables 108 plugged into the jacks 106 at their first ends. The apparatus 100 further includes a simulation unit 200 including a housing 202 generally made of any structural material preferably plastic, a stethoscope receiving surface 204, a finger receiving surface 206, an ON/OFF switch 208 and jacks 210 into which the second end of cables 108 plug.

Figure 26:
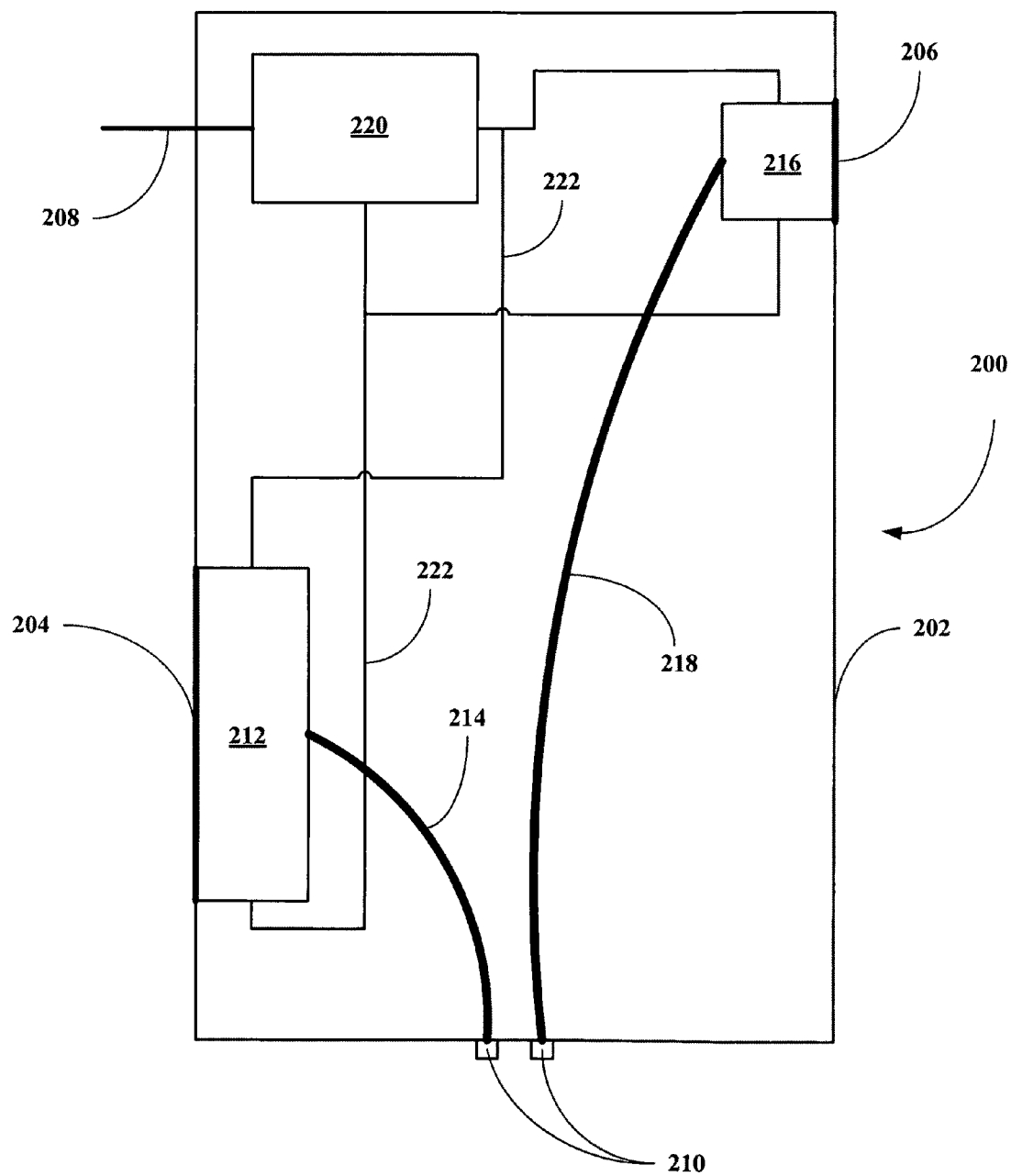
FIG. 26 illustrates an interior of a first embodiment pulse and heart beat simulation unit of the present invention.

As shown in FIG. 26, the surface 204 is associated with an audio device 212 such as a speaker or other audio reproduction device connected to one of the jacks 210 by electrical wire 214. While the surface 206 is associated with a tactile switch 216 connected to the other of the jacks 210 by electrical wire 218. The simulation unit 200 can also include a battery 220 connected to the speaker 212 and the switch 216 by wires 222 to power the devices. Alternatively, the unit 200 can be powered by a transformer plugged into a standard wall socket (not shown).

Figure 27:
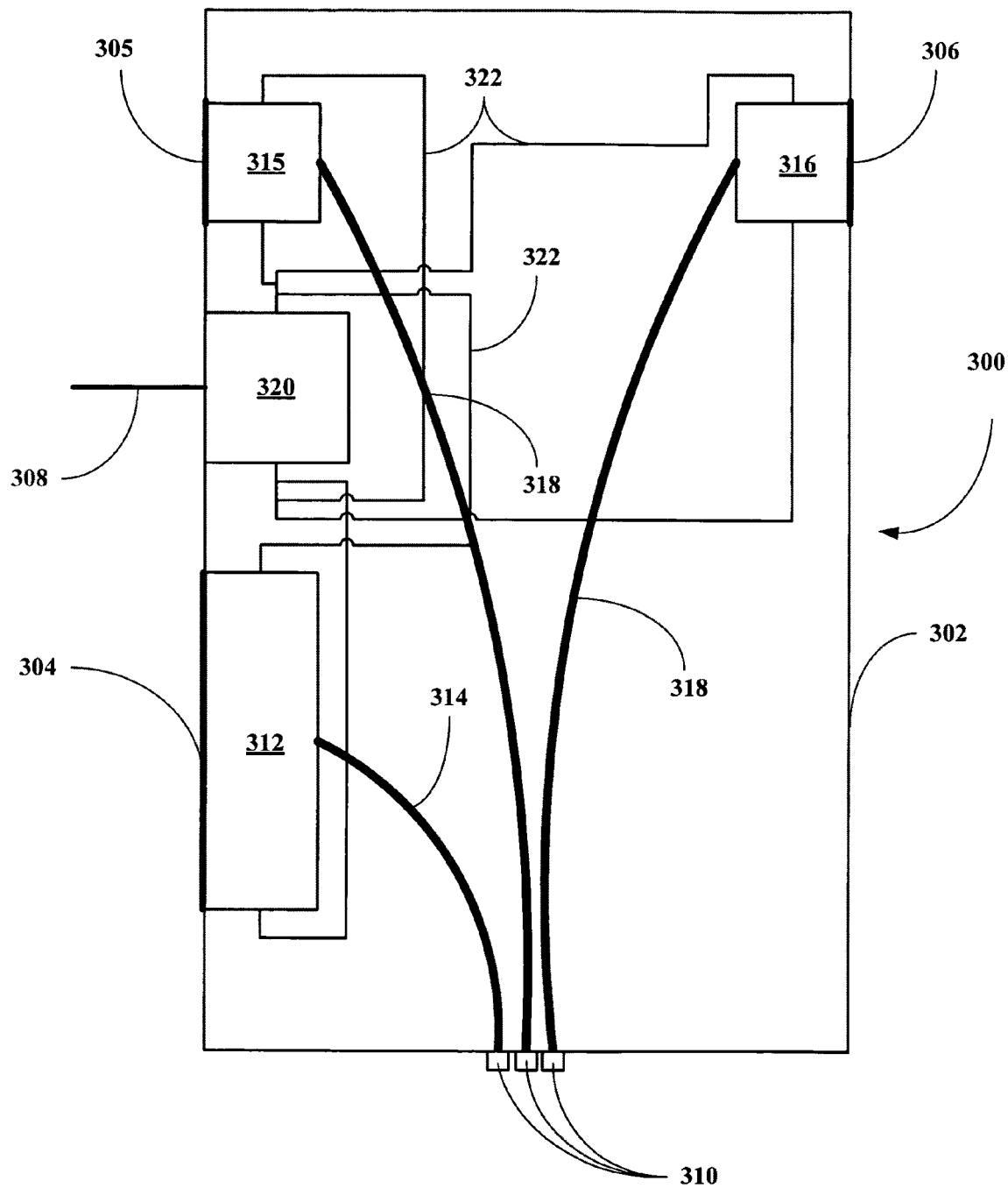
FIG. 27 illustrates an interior of a first embodiment pulse and heart beat simulation unit of the present invention.

Referring now to FIG. 27, another preferred embodiment of a simulation unit, generally 300 is shown to include a housing 302 generally made of any structural material preferably plastic, a stethoscope receiving surface 304, a first finger receiving surface 305, a second finger receiving surface 306, an ON/OFF switch 308 and jacks 310 into which the second end of cables 108 plug.

As shown in FIG. 27, the surface 304 is associated with an audio device 312 such as a speaker or other audio reproduction device connected to one of the jacks 310 by electrical wire 314. While the surfaces 305 and 306 are associated with tactile switches 315 and 316 connected to the other of two jacks 310 by electrical wires 318. The simulation unit 300 can also include a battery 320 connected to the speaker 312 and the switches 315 and 316 by wires 322 to power the devices. Alternatively, the unit 300 can be powered by a transformer plugged into a standard wall socket (not shown).

Although the embodiments shown above are enclosed in a rectangular housing, the tactile pulse simulator can be positioned within an arm, neck, thigh or other site of a manakin or other animal imitation while the heart beat simulator can be positioned within a chest cavity of the manakin. Additionally, devices can be constructed to simulate the internal sounds of other bodily function correlated to either a pulse or a pulse and heart beat pair allowing training of health care providers in the use of a stethoscope in detecting and diagnosis other abnormal, dysfunctional or disease conditions.

Other preferred embodiments of this invention comprise apparatus that perform three basic functions: 1) programs and program commands; 2) a computer including a processing unit, memory, mass storage device including solid state disk drives, disk drives, DVD drives and/or CD drives, a display device, speaker and other peripheral; and 3) a housing including audible, tactile and visual output devices in digital communication with the computer to allow the simulation of cardiovascular conditions correlated with lectures and/or audio-visual exercises corresponding to the simulated conditions.

A typical lecture will be used to describe cardiovascular conditions beginning with programs and program controls including text and word selection lists and question/answer routines with recorded video plus static and animated graphics. The user can interact with the computer via mouse, keyboard and/or voice, thus, allowing the user to interact with the lesson material, including responding to quizzes and simulation identification.

Integral with and temporally correlated with the lecture or lesson, the computer and output subsystems will produce a variety of physical signs initiated by and synchronized with the lesson or requests by the user. For example, a lecture may show and describe cardiac impulses (movement of chest wall) where the chest wall motion can either be displayed on a display device or simulated along with the cardiac sounds and associated pulses on the output subsystem. This allows the student to examine and learn by experiencing the visual, audible and tactile components of each condition and developing the skills to identify and diagnosis the conditions.

Physiological sounds, especially heart sounds, are very low in frequency and require special transducers. These sounds are complex and can be computer generated, but preferably are reproduced using pre-recorded sounds from actual patient.

Motions, often restricted to small areas, are important signs and may range from the chest and abdominal motion of respiration to small, complex impulses produced by the heart. A variety of mechanical, pneumatic, hydraulic and electric mechanisms can be used to reproduce these motions. But electromechanical devices such as a voice coil actuator or proportional solenoid are frequently preferred. They are driven by electric wave forms which can be generated, either stored or reproduced, on command. The rate and time sequence (rhythm) frequently varies and these signals must often be synchronized with signals from other transducers, including video.

In teaching with simulators, as much realism as possible is preferred. Hence, the transducers are preferably incorporated into realistic artificial full bodies or body segments or parts. Preferably, smaller segments or parts are preferred, such as torso, arms, chests with an arm, etc. Simplicity and ease of use are important characteristics, hence a mouse-only program is preferred. Other physical signs are color, mechanical resonance and temperature. All of these may be reproduced by appropriate transducers.

Figure 28:
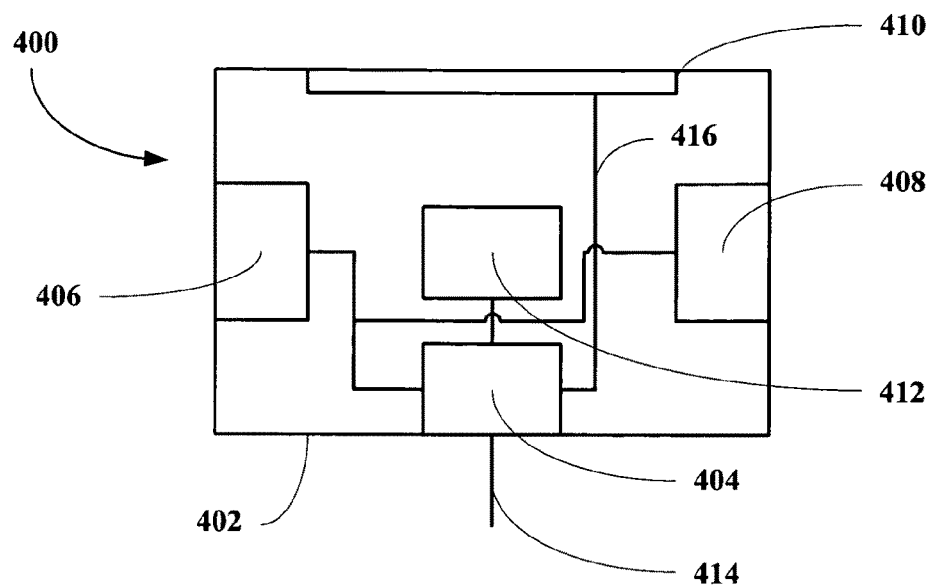
FIG. 28 illustrates another preferred embodiment of the apparatus of the present invention including a computer, a tactile subsystem, a visual subsystem and an audio subsystem in a housing.

Referring now to FIG. 28, another preferred embodiment of a simulation unit, generally 400 is shown to include a housing 402 generally made of any structural material preferably plastic having skin like characteristic as is well known in the art, a computer control unit 404, a first and second tactile output device 406 and 408, a visual output device 410, an audio output device 412 and a connector for power 414, which can be a cable leading to a standard AC power outlet, a cable to a DC power supply or to a battery. The computer control unit 404 is connected to the output devices via communication channels 416 which may be wires, sonic transmitter/receiver units, RF transmitter/receiver units or other transmitter/receiver units paired on the computer and output devices. The unit 400 can be used to simulate heart sounds, visual motion, and pulse feeling in a temporally correlated fashion, i.e., the heart sounds are correlated with the pulse rhythms and the motion. The tactile output devices 406 and 408 are designed to simulate left and right pulse rhythms; the visual output device 410 simulates visual skin coloring and other visual symptoms of a condition including simulated motion; the audio output device 412 simulates heart sounds and other internal body sounds; while the computer 404 controls the data going to the output devices.

Figure 29:
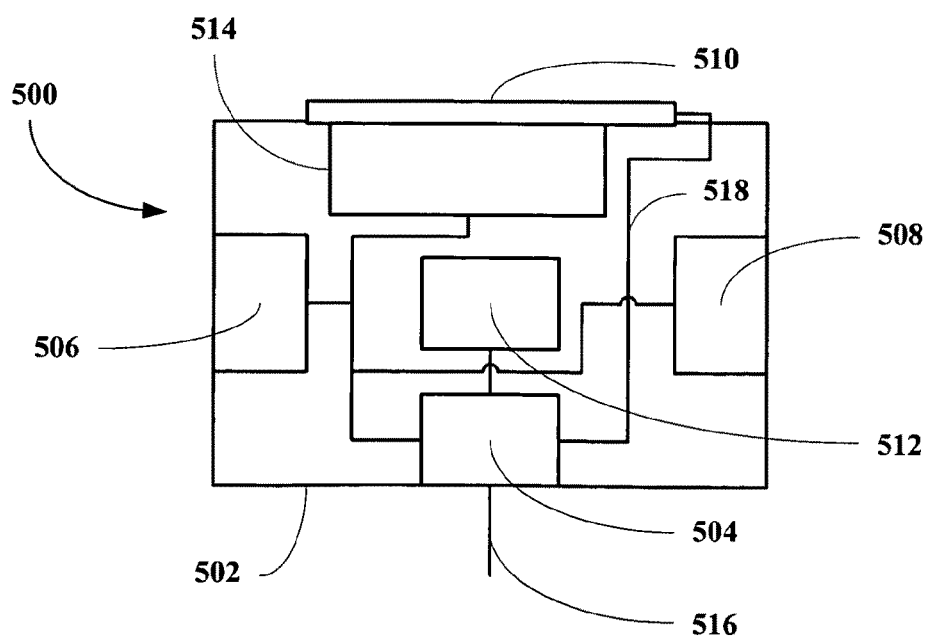
FIG. 29 illustrates another preferred embodiment of the apparatus of the present invention including a computer, a tactile subsystem, a visual subsystem and an audio subsystem in a housing.

Referring now to FIG. 29, another preferred embodiment of a simulation unit, generally 500 is shown to include a housing 502 generally made of any structural material preferably plastic having skin like characteristic as is well known in the art, a computer control unit 504, a first and second tactile output device 506 and 508, a visual output device 510, a audio output device 512, a motion output device 514 and a connector for power 516, which can be a cable leading to a standard AC power outlet, a cable to a DC power supply or to a battery. The computer control unit 504 is connected to the output devices via communication channels 518 which may be wires, sonic transmitter/receiver units, RF transmitter/receiver units or other transmitter/receiver units paired on the computer and output devices. The unit 500 can be used to simulate heart sounds, visual motion, and pulse feeling in a temporally correlated fashion, i.e., the heart sounds are correlated with the pulse rhythms and the motion. The unit 500 can be used to simulate heart sounds, visual motion, and pulse feeling in a temporally correlated fashion, i.e., the heart sounds are correlated with the pulse rhythms and the motion. The tactile output devices 506 and 508 are designed to simulate left and right pulse rhythms; the visual output device 510 simulates visual skin coloring and other visual symptoms of a condition including simulated motion; the audio output device 512 simulates heart sounds and other internal body sounds; the motion output device 514 simulates motion of the housing; while the computer 504 controls the data going to the output devices.

The previously two simulation apparatus are designed to operate according to a pre-programmed instructional lesson. However, the housing can include buttons that allow selection of the simulations or lessons. The simulators also include software for smoothly changing from outputs associated with one condition to outputs associated with another condition to the that the user can develop the skills to differentiation between the symptoms of closely related abnormalities or between a normal condition and an abnormality.

Figure 30:
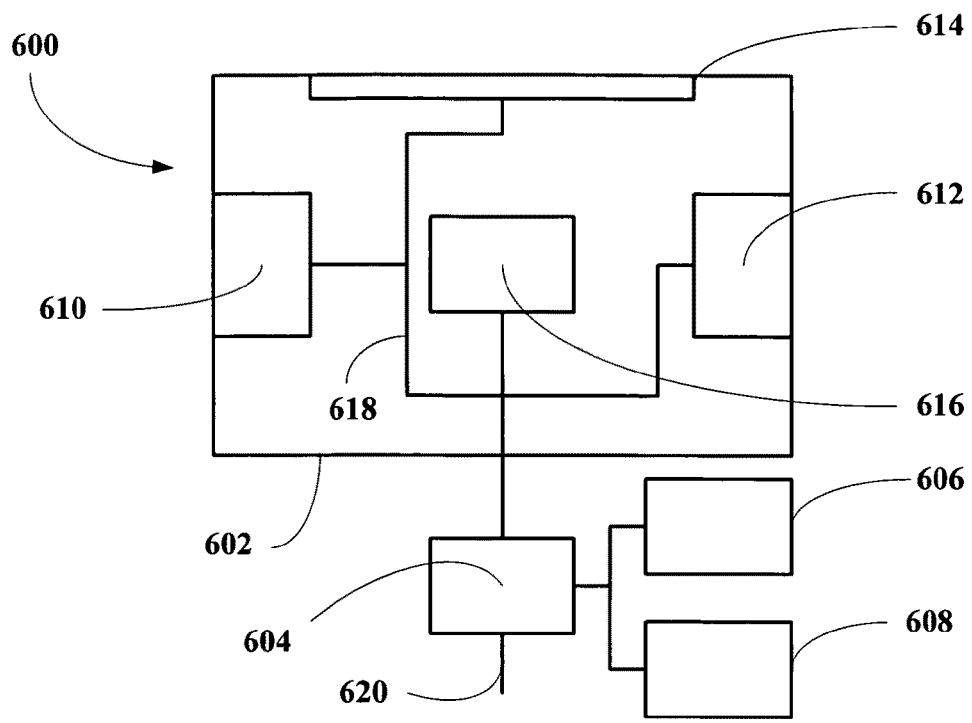
FIG. 30 illustrates another preferred embodiment of the apparatus of the present invention including a computer, a tactile subsystem, a visual subsystem and an audio subsystem in a housing.

Referring now to FIG. 30, another preferred embodiment of a simulation unit, generally 600 is shown to include a housing 602 generally made of any structural material preferably plastic having skin like characteristic as is well known in the art, a computer control unit 604 having an input unit 606, e.g., a mouse and an output unit 608, e.g., a CRT or flat screen, a first and second tactile output device 610 and 612, a visual output device 614, an audio output device 616 and a connector for power 618, which can be a cable leading to a standard AC power outlet, a cable to a DC power supply or to a battery. The computer control unit 604 is connected to the output devices via communication channels 620 which may be wires, sonic transmitter/receiver units, RF transmitter/receiver units or other transmitter/receiver units paired on the computer and output devices. The unit 600 can be used to simulate heart sounds, visual motion, and pulse feeling in a temporally correlated fashion, i.e., the heart sounds are correlated with the pulse rhythms and the motion. The tactile output devices 610 and 612 are designed to simulate left and right pulse rhythms; the visual output device 614 simulates visual skin coloring and other visual symptoms of a condition including simulated motion; the audio output device 616 simulates heart sounds and other internal body sounds; while the computer 604 controls the data going to the output devices and the input unit 606 and the output unit 608 control interaction with the user.

Figure 31:
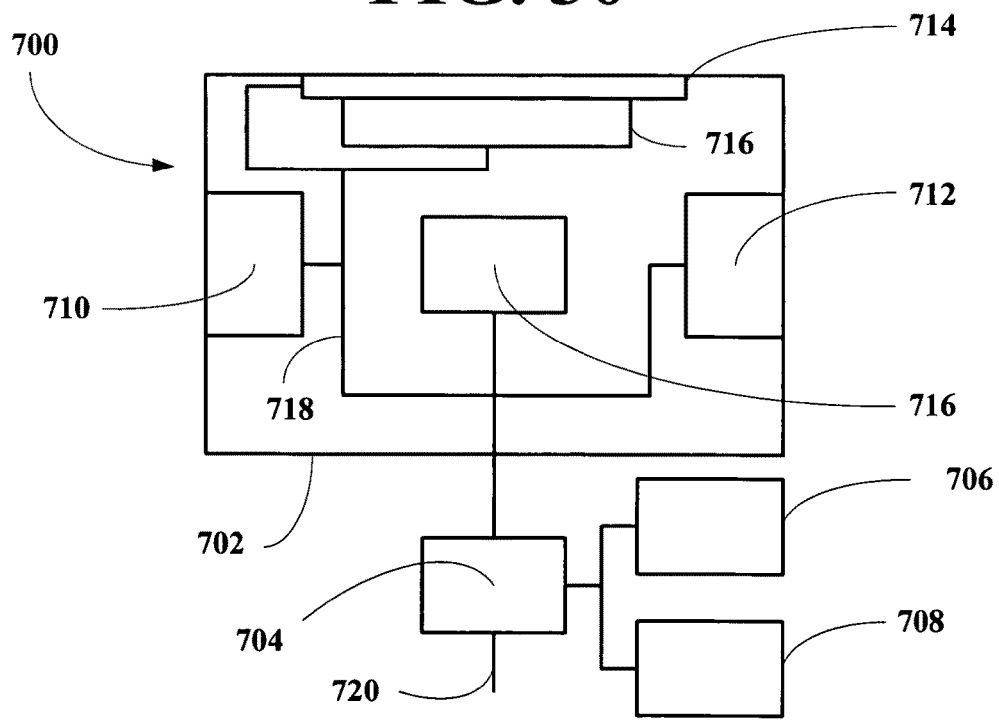
FIG. 31 illustrates another preferred embodiment of the apparatus of the present invention including a computer, a tactile subsystem, a visual subsystem and an audio subsystem in a housing.

Referring now to FIG. 31, another preferred embodiment of a simulation unit, generally 700 is shown to include a housing 702 generally made of any structural material preferably plastic having skin like characteristic as is well known in the art, a computer control unit 704 having an input unit 706, e.g., a mouse and an output unit 708, e.g., a CRT or flat screen, a first and second tactile output device 710 and 712, a visual output device 714, a audio output device 716, a motion output device 718 and a connector for power 720, which can be a cable leading to a standard AC power outlet, a cable to a DC power supply or to a battery. The computer control unit 704 is connected to the output devices via communication channels 722 which may be wires, sonic transmitter/receiver units, RF transmitter/receiver units or other transmitter/receiver units paired on the computer and output devices. The unit 700 can be used to simulate heart sounds, visual motion, and pulse feeling in a temporally correlated fashion, i.e., the heart sounds are correlated with the pulse rhythms and the motion. The unit 700 can be used to simulate heart sounds, visual motion, and pulse feeling in a temporally correlated fashion, i.e., the heart sounds are correlated with the pulse rhythms and the motion. The tactile output devices 706 and 708 are designed to simulate left and right pulse rhythms; the visual output device 710 simulates visual skin coloring and other visual symptoms of a condition including simulated motion; the audio output device 712 simulates heart sounds and other internal body sounds; the motion output device 714 simulates motion of the housing; while the computer 704 controls the data going to the output devices and the input unit 606 and the output unit 608 control interaction with the user.

All reference cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

I claim:

1. An apparatus for simulating a pulse and correlated heart beat of an animal including a human, the apparatus comprising a playback device for generating a first electronic signal corresponding to a pulse and a second electronic signal corresponding to a correlated heart beat; an electronic tactile pulse simulator for receiving the first electronic signal and generating pressure pulses simulating an arterial pulse discernible by touch; and an audio simulator for receiving the correlated heart beat signal and recreating the heart beat to be heard through a standard stethoscope, and wherein the first and second electronic signals are generated from recordings of living animals including humans and wherein the simultaneous generation of correlated heart sounds and touch discernible arterial pulses is sufficient to allow training of medical practitioners to discriminate between normal cardiovascular function and abnormal cardiovascular function.

2. The apparatus of claim 1, wherein the tactile pulse simulator comprises a tactile switch capable of generating pulses simulating the arterial pulse, collapsible tube apparatus or piezoelectric transducer.

3. The apparatus of claim 1, wherein the tactile pulse simulator and the audio simulator are housed within a housing.

4. The apparatus of claim 3, wherein the tactile pulse simulator comprises a resilient cover covering a tactile switch capable of generating pulses simulating the arterial pulse.

5. The apparatus of claim 1, wherein the tactile pulse simulator is within in a first housing and the audio simulator is within a second housing.

6. The apparatus of claim 5, wherein the first housing simulates a human wrist and the tactile pulse simulator comprises a resilient cover covering a tactile switch capable of generating pulses simulating the arterial pulse and is located at a position in the wrist corresponding to a position in a patient where the arterial pulse is adapted to be detected and monitored by a medical professional.

7. An apparatus for simulating a right side pulse and a left side pulse and correlated heart beat of an animal including a human, the apparatus comprising a playback device for generating a first electronic signal corresponding to the right side pulse; a second electronic signal corresponding to the left side pulse and a third electronic signal corresponding to a correlated heart beat; a first tactile pulse simulator for receiving the first electronic signal and generating pressure pulses simulating a right side arterial pulse discernible by touch; a second tactile pulse simulator for receiving the second electronic signal and generating pressure pulses simulating a left side arterial pulse discernible by touch; and an audio simulator for receiving the correlated heart beat signal and recreating the heart beat to be heard through a stethoscope, and wherein the first and second electronic signals are generated from recordings of living animals including humans and wherein the simultaneous generation of correlated heart sounds and touch discernible arterial pulses is sufficient to allow training of medical practitioners to discriminate between normal cardiovascular function and abnormal cardiovascular function.

8. The apparatus of claim 7, wherein the tactile pulse simulators comprise tactile switches capable of generating pulses simulating the arterial pulse, collapsible tube apparatuses or piezoelectric transducers.

9. An apparatus for simulating a right side pulse and a left side pulse and correlated heart beat of a human, the apparatus comprising:
- a playback device for generating a first electronic signal corresponding to the right side pulse, a second electronic signal corresponding to the left side pulse and a third electronic signal corresponding to a correlated heart beat;
- a first housing including a first tactile pulse simulator for receiving the right side arterial pulse signal and generating pressure pulses corresponding to a right arm arterial pulse discernible by touch;
- a second housing including a second tactile pulse simulator for receiving the left side arterial pulse signal and generating pressure pulses corresponding to a left arm arterial pulse discernible by touch; and
- a third housing including an audio simulator for receiving the heart beat signal and generating an audible recreation of the correlated heart beat and designed to be heard through a stethoscope position on a surface of the housing,
- wherein the first and second electronic signals are generated from recordings of living animals including humans and wherein the simultaneous generation of correlated heart sounds and touch discernible arterial pulses is sufficient to allow training of medical practitioners to discriminate between normal cardiovascular function and abnormal cardiovascular function.

10. The apparatus of claim 9, wherein the tactile pulse simulators comprise tactile switches capable of generating pulses simulating the arterial pulses, collapsible tube apparatuses or piezoelectric transducers.

11. The apparatus of claim 9, wherein the tactile pulse simulators comprise a resilient cover covering a tactile switch capable of generating pulses simulating the arterial pulse.

* * * * *